(12) United States Patent
Bernstein et al.

(10) Patent No.: US 12,404,220 B2
(45) Date of Patent: Sep. 2, 2025

(54) SYSTEM AND METHOD FOR RECOMPOSITION OF THE DEAD

(71) Applicant: RECOMPOSE, PBC, Seattle, WA (US)

(72) Inventors: Oren Bernstein, Portland, OR (US); Katrina Spade, Seattle, WA (US)

(73) Assignee: Recompose, PBC, Seattle, WA (US)

( * ) Notice: Subject to any disclaimer, the term of this patent is extended or adjusted under 35 U.S.C. 154(b) by 0 days.

(21) Appl. No.: 16/634,123

(22) PCT Filed: Jul. 25, 2018

(86) PCT No.: PCT/US2018/043691
§ 371 (c)(1),
(2) Date: Jan. 24, 2020

(87) PCT Pub. No.: WO2019/023343
PCT Pub. Date: Jan. 31, 2019

(65) Prior Publication Data
US 2020/0207675 A1    Jul. 2, 2020

Related U.S. Application Data

(60) Provisional application No. 62/536,958, filed on Jul. 25, 2017.

(51) Int. Cl.
*C05F 1/02*    (2006.01)
*A01N 1/00*    (2006.01)
(Continued)

(52) U.S. Cl.
CPC ................. *C05F 1/02* (2013.01); *A01N 1/00* (2013.01); *A61G 17/00* (2013.01); *A61G 17/002* (2013.01);
(Continued)

(58) Field of Classification Search
CPC ....... E04H 13/006; E04H 13/008; A01N 1/00; A61G 17/00; A61G 17/002; A61G 17/044;
(Continued)

(56) References Cited

U.S. PATENT DOCUMENTS 1,096,758 A  *  5/1914  Rogers .................. E04H 13/006
                                                    52/132
1,453,375 A  *  5/1923  Allen .................... E04H 13/006
                                                    52/134

(Continued)

FOREIGN PATENT DOCUMENTS

| FR | 2595395 A1 | 9/1987 |
| KR | 10-2016-0115349 A | 10/2016 |
| WO | 00/37393 A1 | 6/2000 |

OTHER PUBLICATIONS

International Preliminary Report of Patentability for PCT/US2018/043691 mailed Feb. 6, 2020.
(Continued)

*Primary Examiner* — William L Miller
(74) *Attorney, Agent, or Firm* — Honigman LLP

(57) ABSTRACT

Today's funeral practices are unsustainable, toxic, and polluting. Both cremation and the manufacture and transport of caskets, grave liners, and headstones emit greenhouse gas emissions into the atmosphere. In fact, the very last thing that most of us will do on this earth is poison it. As a response, a system and method called recomposition that gently and naturally returns humans to the earth after death.

6 Claims, 70 Drawing Sheets

(51) Int. Cl.
*A61G 17/00* (2006.01)
*B65G 1/16* (2006.01)
*C05F 1/00* (2006.01)
*A61G 17/04* (2006.01)
*A61G 17/06* (2006.01)

(52) U.S. Cl.
CPC ................ B65G 1/16 (2013.01); C05F 1/00 (2013.01); *A61G 17/044* (2016.11); *A61G 17/06* (2013.01)

(58) Field of Classification Search
CPC ...... A61G 17/06; A61G 17/08; A61G 17/004; B65G 1/16; C05F 1/00; C05F 1/02; C05F 17/90; C05F 17/979; C05F 17/00; C05F 17/929; Y02P 20/145; Y02W 30/40; B09B 5/00; F23G 1/00
USPC ........ 435/290.1; 27/1, 35; 211/85.27, 85.16; 52/134, 136
See application file for complete search history.

(56) References Cited

U.S. PATENT DOCUMENTS

| | | | | |
|---|---|---|---|---|
| 3,417,521 | A * | 12/1968 | Welsh | E04H 13/006 52/90.1 |
| 3,529,730 | A * | 9/1970 | Thompson | E04H 13/006 211/85.27 |
| 4,688,359 | A * | 8/1987 | See | A61G 17/007 52/134 |
| 5,332,532 | A | 7/1994 | Kaye et al. | |
| 6,295,705 | B1 * | 10/2001 | Gersten | A61G 17/08 27/1 |
| 6,421,890 | B1 * | 7/2002 | Biggar | A61G 17/08 27/1 |
| 6,634,143 | B1 * | 10/2003 | Yoo | E04H 13/008 211/85.27 |
| 8,931,147 | B2 * | 1/2015 | Sullivan | B09B 3/0075 27/2 |
| 9,051,752 | B1 * | 6/2015 | Muthusami | E04H 13/008 |
| 10,125,514 | B2 * | 11/2018 | Eickhof | A61G 17/08 |
| 10,954,688 | B2 * | 3/2021 | Green | H04W 4/029 |
| 2002/0092247 | A1 * | 7/2002 | Thomas | E04H 13/006 52/136 |
| 2007/0033885 | A1 * | 2/2007 | Freeman | E04H 13/006 52/103 |
| 2010/0139060 | A1 * | 6/2010 | Leeder | E04H 13/008 27/1 |
| 2010/0162639 | A1 * | 7/2010 | Adair | G06Q 30/0601 52/103 |
| 2011/0035956 | A1 | 2/2011 | Morris-Watson et al. | |
| 2011/0126480 | A1 * | 6/2011 | Tsao | B44C 5/04 52/133 |
| 2013/0026760 | A1 | 1/2013 | Lee et al. | |
| 2018/0023313 | A1 * | 1/2018 | Power | E04H 13/008 52/128 |
| 2018/0283035 | A1 * | 10/2018 | Mercer | E04H 13/006 |
| 2019/0010724 | A1 * | 1/2019 | Jaeger | E04H 9/024 |
| 2020/0263447 | A1 * | 8/2020 | Green | H04W 4/029 |
| 2025/0002424 | A1 * | 1/2025 | Lübke | C05F 17/993 |

OTHER PUBLICATIONS

Extended European Search Report issued on Apr. 26, 2021 in European Application No. 18839151.0.
International Search Report and Written Opinion for PCT/US2018/043691 mailed Dec. 3, 2018.
Robyn Ross Inside the Machine that Will Turn Your Corpse into Compost,—Wired, published on Oct. 25, 2016 (Oct. 25, 2016), retrieved on Sep. 21, 2018 (Sep. 21, 2018), accessed at <https://www.wired.com/2016/10/inside-machine-will-turn-corpse-compost/>, entire document. especially p. 2-3.
TEDx Talks "Let's talk about human composting—Katrina Spade—TEDxOrcasIsland" YouTube, published on Jun. 16, 2016 (Jun. 16, 2016), retrieved on Sep. 21, 2018 (Sep. 21, 2018), accessed at <https://youtu.be/PRsopS7yTG8>, entire document.
"Urban Death Project" www.urbandeathproject.org, published on Jun. 27, 2017 (Jun. 27, 2017), retrieved on Sep. 21, 2018 (Sep. 21, 2018), accessed at <https://web.archive.org/web/20170627123256/http:/www.urbandeathproject.org:80/faq-may>, entire document.
Catrin Einhorn "A Project to Turn Corpses into Compost." The New York Times, published on Apr. 13, 2015 (Apr. 13, 2015), retrieved on Sep. 21, 2018 (Sep. 21, 2018), accessed at <https://www.nytimes.com/2015/04/14/science/a-projecl-to-turn-corpses-Into-compost.hml>, entire document.

* cited by examiner

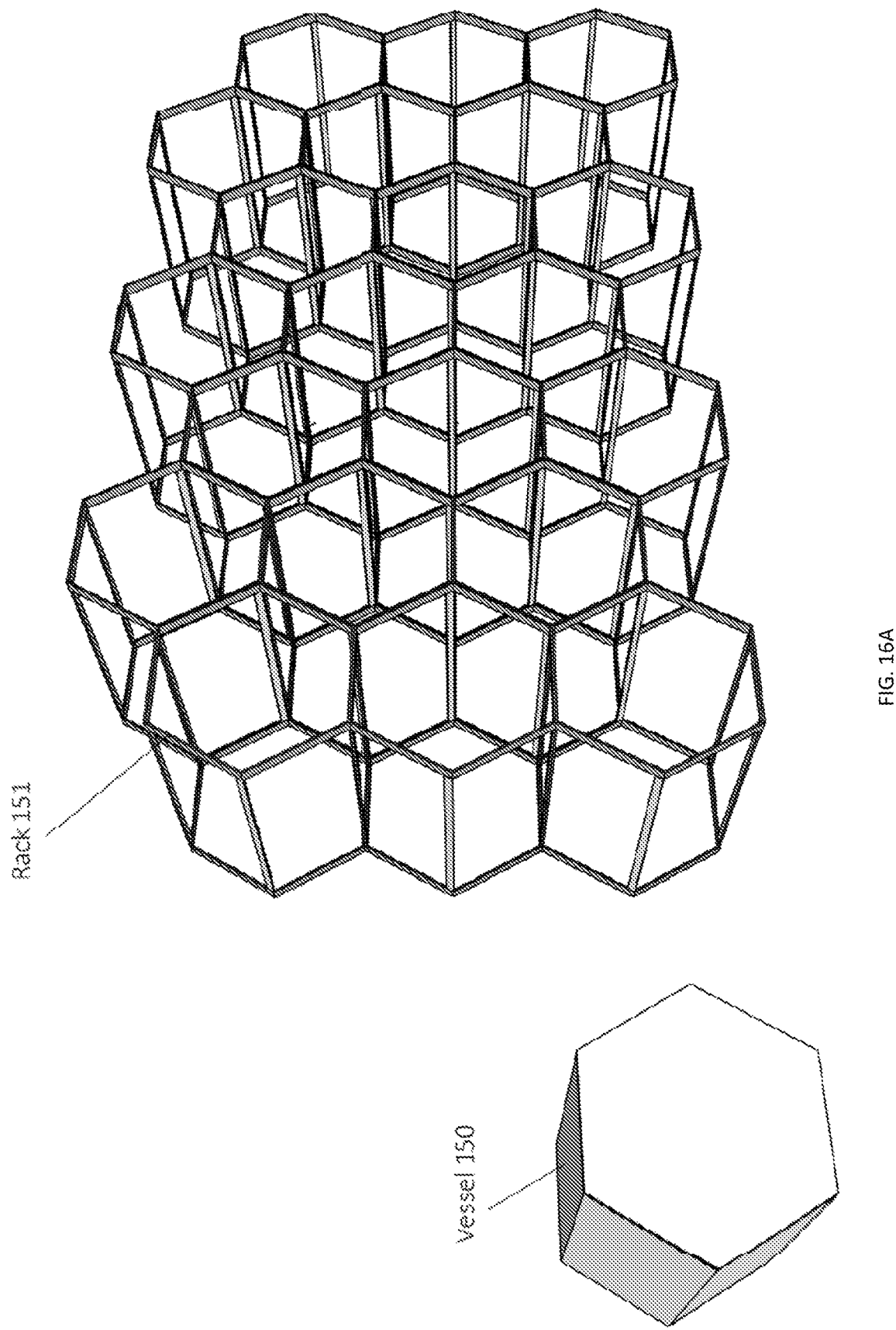

Square Rack, Square Vessel

Square Rack, Cylindrical Vessel

Hexagonal Rack, Hexagonal Vessel

Large "Hive"

Long Row

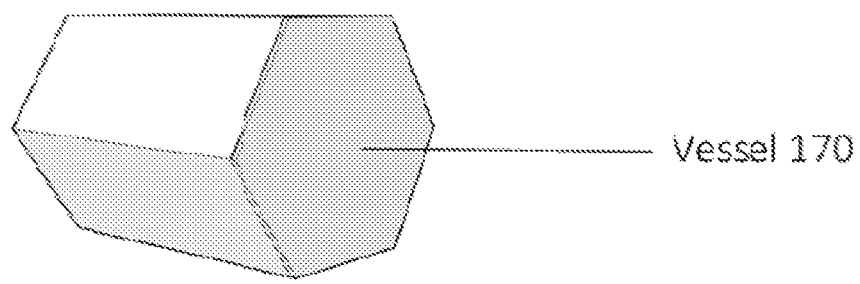
FIG. 20A
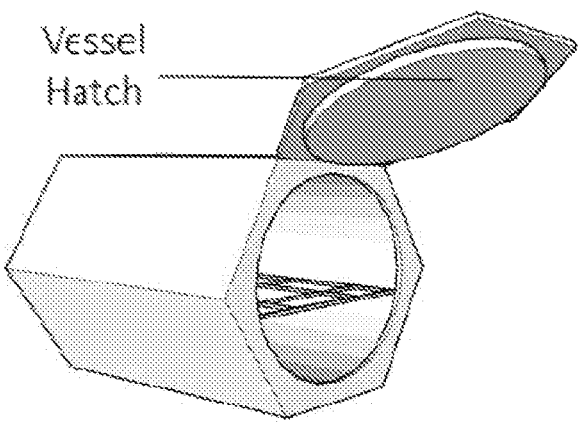
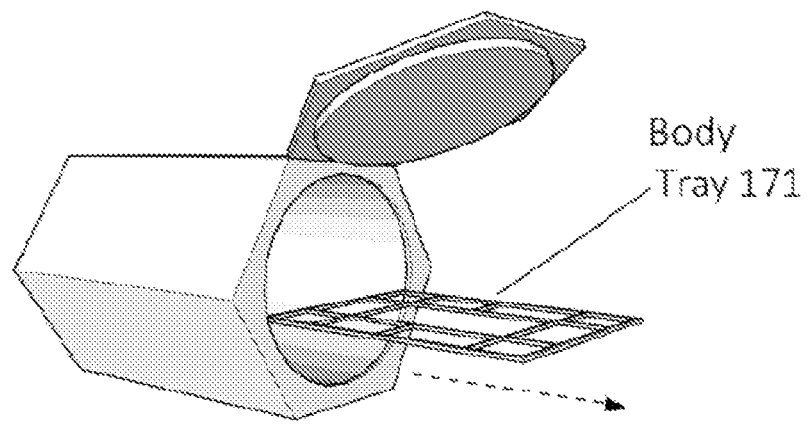
FIG. 20C

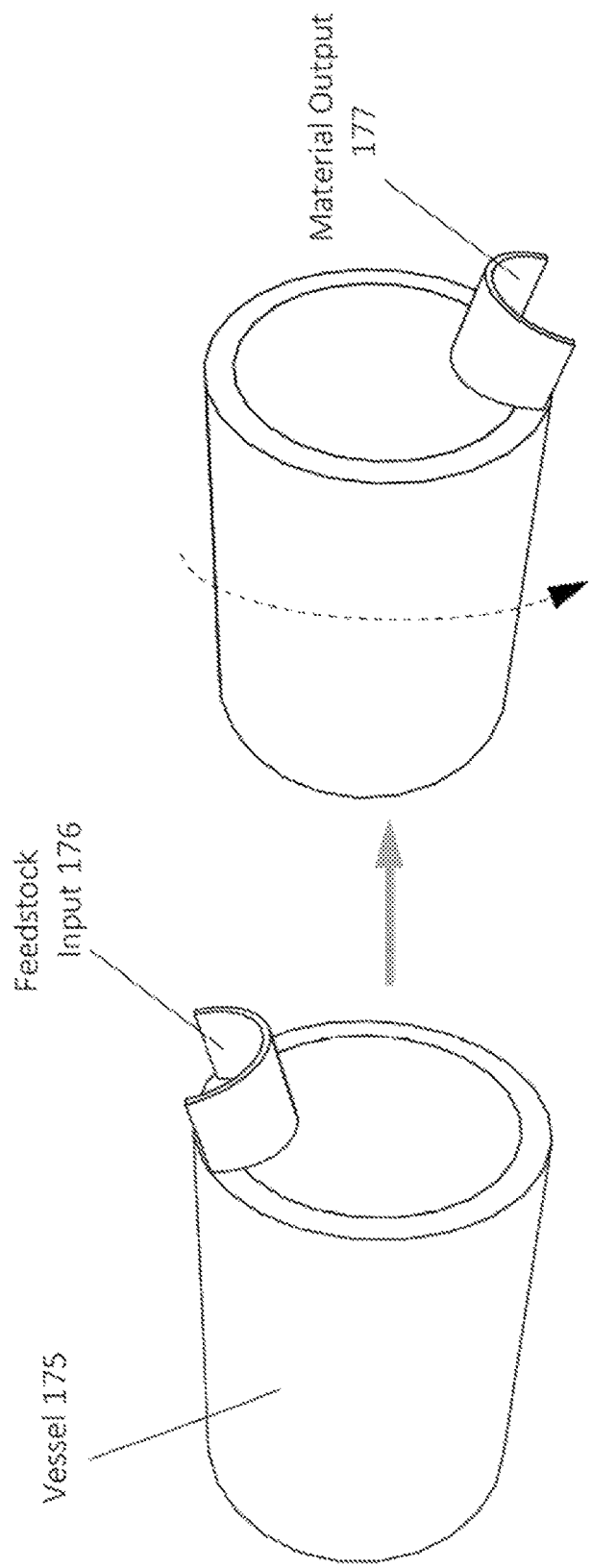
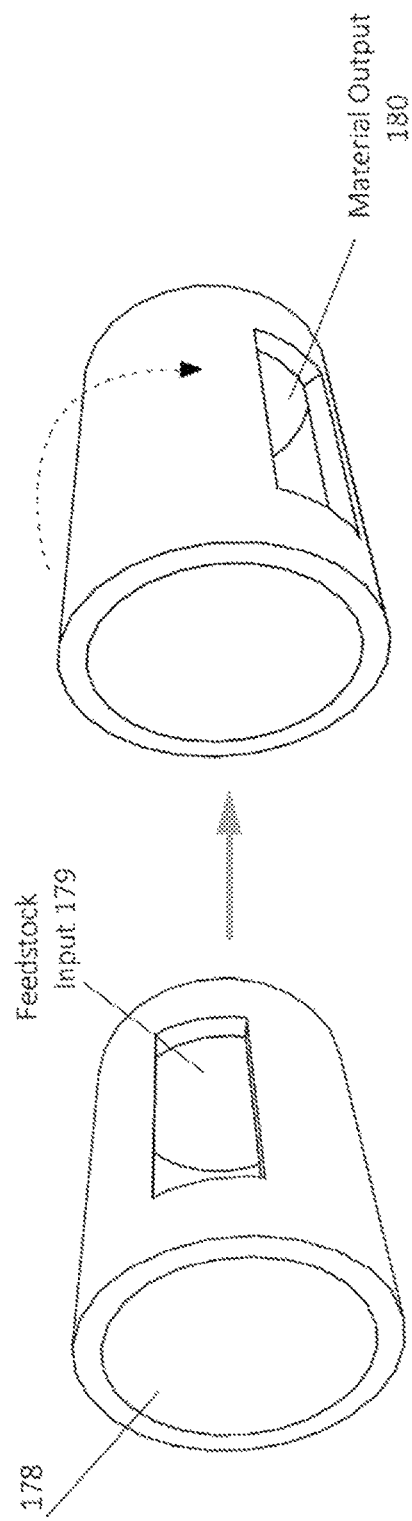
FIG. 22A
FIG. 22B

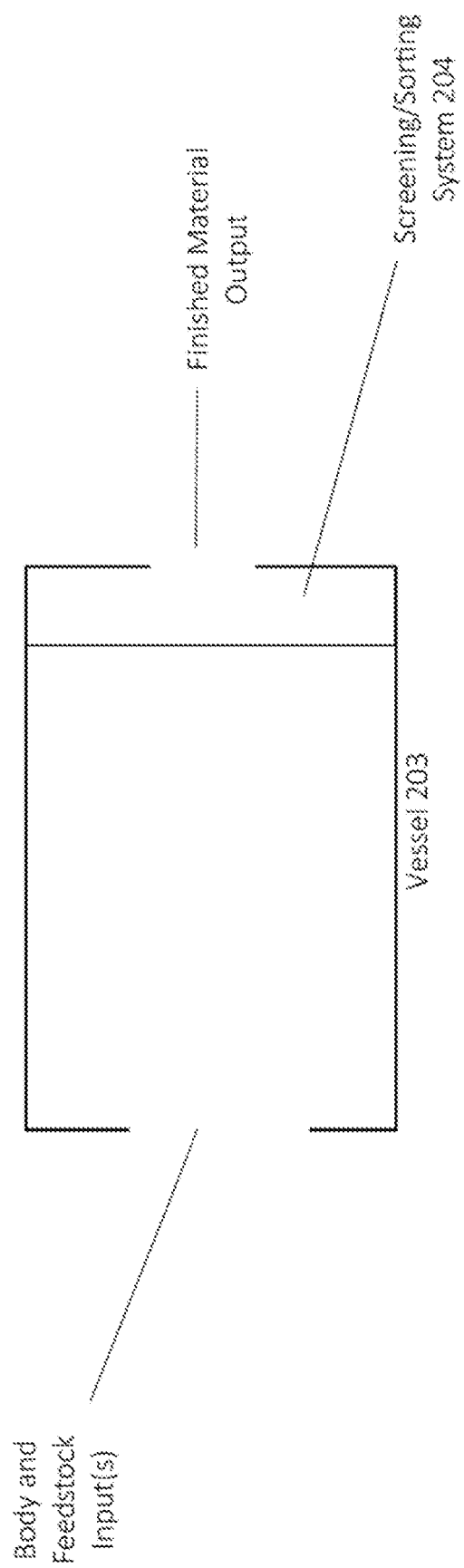
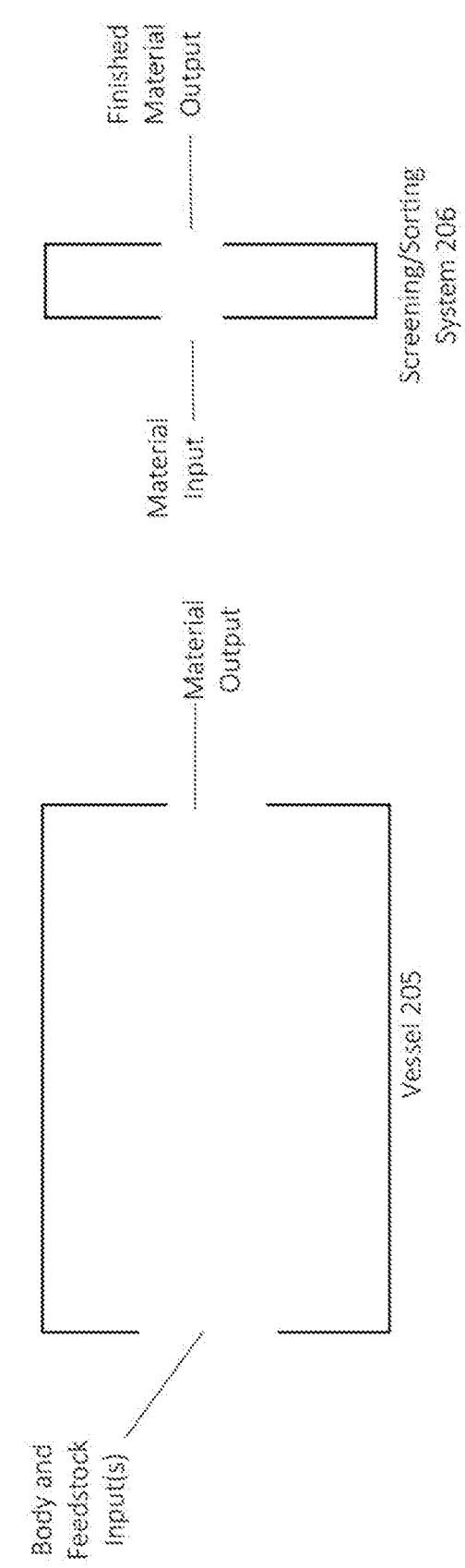
FIG. 25A
FIG. 25B

Top View

Front of vessel: door latch, bone grinding auger, body tray rails.

Front of vessel: door latch, bone grinding auger, auger panel (shown transparent,) and auger stablizer.

Bottom of vessel: built in drip pan

Back of Vessel: Half Moon Access Door, Round Port, Motor, Material Output Funnel Detail of Roller: Drive belt, Vessel Stabilizer Rollers Detail of Vessel Stabilizer Rollers Vessel from Front
(Door Closed, Hexagonal Frame Shown)

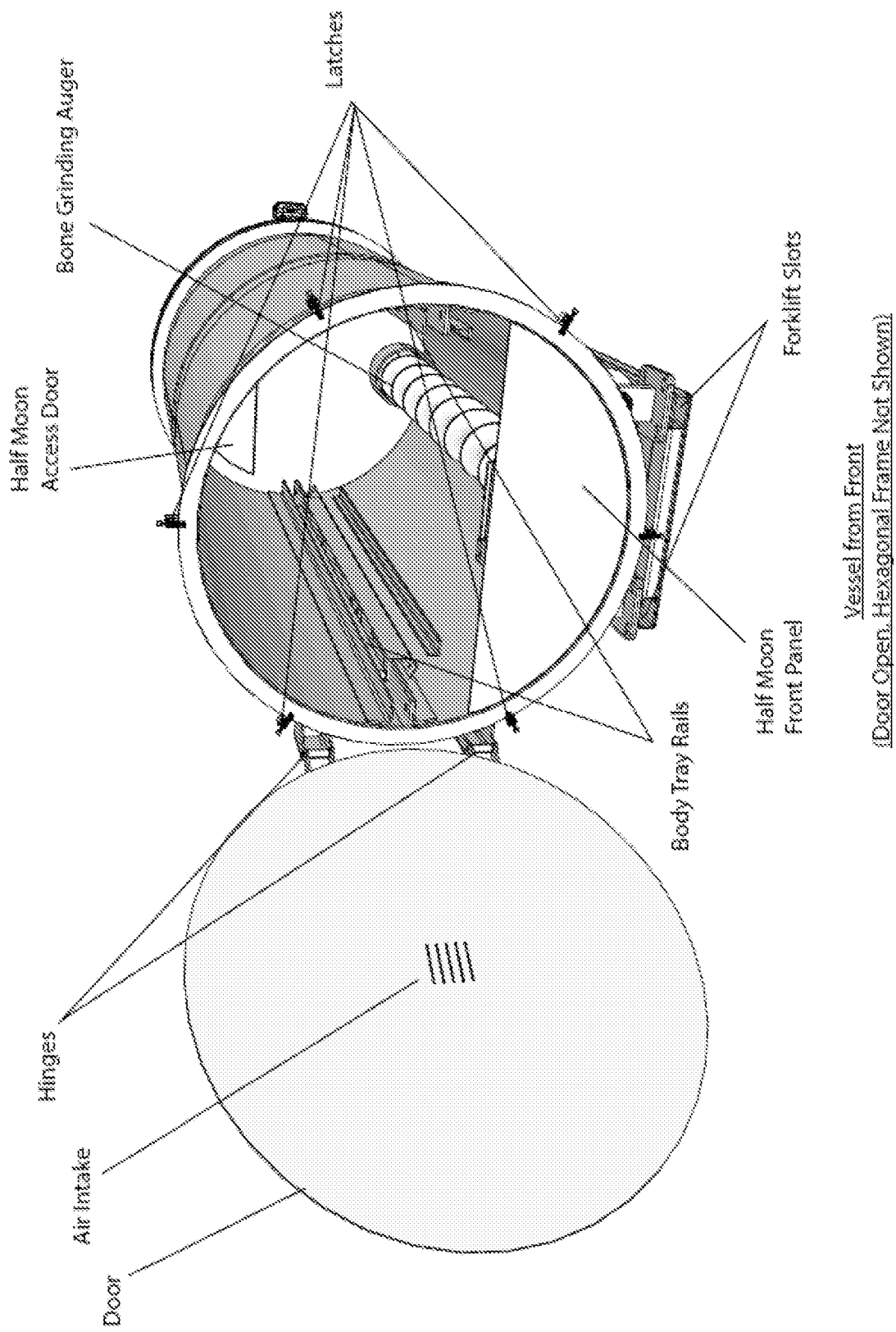

Vessel from Front
(Hexagonal Frame Shown)

From front, auger panel not shown

From top, section cut

Body tray and box frame

SYSTEM AND METHOD FOR RECOMPOSITION OF THE DEAD

CLAIM OF PRIORITY

This application claims the benefit under 35 USC 371 to International Application No. PCT/US2018/43691, filed Jul. 25, 2018, which claims priority to U.S. Provisional Patent Application No. 62/536,958, filed Jul. 25, 2017, each of which is incorporated by reference in its entirety.

FIELD OF THE INVENTION

The exemplary embodiments of the system relate generally to a system for the disposition of the dead.

BACKGROUND

Burial methods and traditions have remained unchanged for several years. A system and method that is an alternative to burial and cremation can offer social and environmental advantages.

SUMMARY

Recomposition is a replicable, scalable system. It is designed for the urban setting and recognizes that the end-of-life deserves a venerated role within the human experience. Truly sustainable, recomposition is a way to honor both our loved ones and the planet after we die.

Recomposition is the term for human mortality composting, which is based on the principles of livestock mortality composting. To recompose means to completely convert human remain into soil amendment via an aerobic process in a contained, accelerated manner. Recomposition can include eliminating inorganic, such as metal, materials from the compost.

The Recomposition System is designed to achieve the contained, accelerated, conversion of human remains to soil amendment.

In general, some important features of a method of recomposing a body can include:
1) A vessel is partially filled with feedstock or left empty.
2) A body is placed into a vessel.
3) Additional feedstock is added to a vessel or the entire amount of feedstock is added to a vessel.
4) A body and materials inside a vessel are aerated for a span of between 1-90 days.
5) A body and materials might be rotated during the 1-90 day span.
6) A soil amendment is screened for non-organics.

The drawings for the Recomposition System fall into six "themes" or concepts:
A. Mechanism/Action of Loading
B. Support of a Body in a Vessel
C. Opening a Vessel
D. Stacking/Racking of Multiple Vessels
E. Hexagonal Vessel Design
F. Extracting Material
G. Additional Drawings Recomposition Systems are designed with people in mind. The process of recomposition is different from the process of livestock mortality composting, because humans have cultural, emotional, and ritual needs that differ from other animals.

In one aspect, a method of recomposing a body can include:

Placing a body into a vessel;
Adding feedstock to the vessel;
Aerating the body and feedstock inside the vessel, for example, for a span of between 1-90 days;
Optionally, rotating the vessel containing the body and the feedstock, for example, during the 1-90 day span; and
Screening a soil amendment created from the body and the feedstock for non-organics. The method can include grinding bone fragments.

In some embodiments, a portion of feedstock can be placed into the vessel prior to placing the body into the vessel.

In another aspect, a vessel for the placement of human remains can include a housing having an opening and configuration that is large enough to accept human remains without constraining the human remains and a loader configured to move into and out of the vessel and place shrouded human remains within the housing and allows for controlled placement of the shrouded human remains in a specific location within the vessel without constraining the human remains.

In certain circumstances, without constraining the human remains can include avoiding dropping, dumping, or folding the human remains.

In another aspect, a human remains processing center can include a plurality of vessels;
and an interconnected resource element that connects the vessels when assembled in the processing center.

In certain circumstances, the plurality of vessels can include 3 to 500 vessels. For example, a center can include 3-20 vessels, making it a "mini" center or facility; alternatively, a center can include 21-100 vessels, making it a "medium" center or facility; and as another alternative, a center can include 101-500 making it a "mega" center or facility.

In certain circumstances, the human remains processing center can include a rack structure configured to pack the plurality of vessels in an interior space of a building while providing access to the interconnected resource element. The rack structure can be configured to removably pack a portion of the plurality of vessels in a vertical dimension. In certain circumstances, the rack structure can be configured to removably pack a portion of the plurality of vessels in a hexagonal structure.

In certain circumstances, the interconnected resource element can provide one or more of the following resource features to the plurality of vessels: aeration, thermal management, hydration control, material feed and extraction, or condition measurement (e.g., temperature, moisture, pH). Recomposition can be complete when the content of the vessel reaches 131 degrees F. for three days, consecutively.

In certain circumstances, the human remains processing center can include a modular system that packs a desired configuration of the plurality of vessels in an interior space of a building while providing access to the interconnected resource element.

In another aspect, a vessel for the processing biological material can include a housing having an air intake port, a grinding auger, an access panel, and an exhaust port, and a rotation system to rotate the housing during a processing phase.

In certain circumstances, the rotation system can include rollers contacting the housing and a drive system that powers rotation of the housing.

In certain circumstances, the housing and rotation system can be contained within a frame.

In certain circumstances, the vessel can include a condition monitoring system that monitors one or more of time, temperature and moisture conditions within the housing, and, optionally, an energy management system.

In certain circumstances, the vessel can include a loader configured to move into and out of the housing and place shrouded human remains within the housing and allows for controlled placement of the shrouded human remains in a specific location within the vessel without constraining the human remains.

Other aspects, embodiments, and features will be apparent from the following description, the drawings, and the claims.

BRIEF DESCRIPTION OF THE DRAWINGS

FIG. 16A depicts a vessel and an empty vessel rack.

FIG. 20A depicts a hexagonal vessel.

FIG. 20B depicts the vessel hatch in open position.

FIG. 20C depicts the body tray coming out of the vessel.

FIG. 22A depicts a vessel with feedstock input mechanism.

FIG. 22B depicts the same vessel rotated 180 degrees and the mechanism used for material output.

FIG. 25A depicts a vessel with an interior grinding/screening/sorting system. It depicts input(s) for body and feedstock, and output for finished material.

FIG. 25B depicts a vessel with an exterior screening sorting system. It depicts vessel input(s) for body and feedstock, and a vessel output for unsorted/unscreened material. It also depicts screening/sorting system input for material and screening/sorting system output for finished material.

FIGS. 27A-27M depict additional features of a vessel.

DETAILED DESCRIPTION

In general, the descriptions herein address systems and methods for the contained, accelerated, and complete conversion of human remains to soil or soil amendment.

Figure 1:
FIG. 1 depicts a system in a working environment.

Referring to FIG. 1, a recomposition system can be part of a serene and tranquil setting of a facility that provides a comforting environment to visitors to the facility.

Important features of a systems and methods include
1) Placing a body into a vessel;
2) Adding feedstock to the vessel;
3) Aerating the body and feedstock inside the vessel for a span of between 1-90 days;
4) Optionally, rotating the vessel containing the body and the feedstock during the 1-90 day span;
5) Grinding bone fragments; and
6) Screening a soil amendment created from the body and the feedstock for non-organics.

As described in more detail below, a vessel can be specially configured to allow for the ceremonial/formal/dignified placement of human remains. There are other mammal composters on the market, but none are focused on configurations that address the human emotional aspect of managing human remains.

Some important issues to be considered when designing a vessel for the systems and methods described herein include:
1) Vessel geometry allows for the placement of a shrouded, otherwise clothed or unclothed human body, by 1-12 assistants without use of mechanized assistance.
2) Vessel opening and configuration are large enough to feel not claustrophobic/awkward/undignified)
3) Allows for the controlled/dignified placement of the body in a specific location within the vessel (i.e. without dropping, dumping, or folding)

As described in more detail below, a human remains processing center that has collections of vessels can have interconnected/shared elements—aeration, thermal management, hydration control, material feed and extraction, measurement (temperature, moisture, pH). Livestock composters are typically on farms. They are generally used outdoors and there are rarely more than 3 on any one site. As a result, space management considerations are not highly relevant and so these vessels are not designed to be stacked or arranged in a space-efficient manner. When placed in a building, efficient use of space needs to be accommodated, resulting in the racking and stacking approaches described below.

Some important issues to be considered when designing a center for the systems and methods described herein include:
1) Vessel or vessel components may be removable from a larger superstructure.
2) Vessel or vessel components may be contained within a hexagonal structure.
3) Between 3 and 500 vessels may be stacked together in many sorts of configurations.

It is also important that the after recomposition is complete, the resultant soil or soil amendment must be in a condition that it can be returned to a non-expert family. In other words, the product must contain no unprocessed bones and not human-generated inorganic material (implants, drug remnants, etc.). Typically, farmers use resultant soil amendment on fields, so if there are some chunks of bone or other non-compostable material, there are no significant consequences. Also, farmers don't always use the same "recipe" to compost, they might toss in whatever they have on hand. If the stuff isn't "done" when they open the vessel up, they can just close it up and have it cook some more. The systems and methods described herein require that all of the resultant material be completely recomposed (i.e. composted) and screened for non-organics and given back to families after it's done.

The system is unique in a number of unexpected aspects. In particular, it is different than prior art related to the composting of animal remains, especially in the context of careful, thoughtful, meaningful, and respectful handling and celebration of the human remains.

The system is very distinct from existing human remains management systems (cremation and casket burial) and as such requires novel design elements that are specific to the recomposition process. Key features include:

The "Cradle". During the continuing design development we realized there is a lot of value to having an element we call the "Cradle." This is a sub-component of the vessel that could be detachable. Family/friend participation and respect for the body are important to the process. In a preferred embodiment, the body can be placed into the cradle outside of the vessel (allowing family to be involved in the placement of the body without having to interact with all of the mechanical requirements and size of the full vessel.) The body may be covered with material outside of the vessel, for example, allowing family to be involved in the placement of material without having to interact with all of the mechanical complexity and size of the full vessel. The cradle can then be placed into the vessel elegantly and with respect. Because the cradle can be smaller/lighter and does not contain all the material to be used in the recomposition process, it is easier to move it around elegantly—e.g. with more minimal or limited mechanical assistance. The cradle helps position the body near the center of the vessel and away from the walls to facilitate the process of recomposition. The cradle can have a non-biodegradable frame (e.g. stainless steel) and a biodegradable support element (e.g. textile) on which the body and material rest. (See "biodegradable support element" below.) The cradle is also referred to as a "body tray" in some embodiments.

The "Biodegradable Support Element" This element is part of the "cradle," a textile or otherwise biodegradable piece that clips into or otherwise attaches to the non-biodegradable frame. During the first duration of recomposition, this element supports the body in the center of the vessel and prevents "dead zones," i.e. areas where the body is not covered with feedstock material and does not recompose effectively. The biodegradable support element initially positions the body in the vessel and over time it breaks down and lets all material move freely in the vessel. This can be especially helpful as the material gets compacted and takes up less volume (in an extreme example, one could envision part of a body getting stuck on a non-biodegradable 'cradle' and being held in the center of the vessel while compacted material that is less than 50% of the vessel volume rotates and remains out of contact with the body.

The Concept of "Breaking Bones Down to Accelerate Recomposition." In animal composting, having bones that are not fully broken down at the end is not a big issue. However, in human recomposition it is desirable to have the bones recomposed fully. This will likely necessitate the use of a method or system for bone break down. It will likely be a mechanical process such as milling or grinding. For example, the screw auger design for the bottom of the vessel can assist in this regard. This could also be a chemical process, e.g. a method where left over bones would be placed in a bath, chemical/acid, to facilitate their breakdown.

The Concept of "Modular Units" The provisional patent already discusses how the system can be any size or orientation but may not capture that by having each vessel have its own support structure (hexagon frame) that can modularly connect to any other vessel the whole system can be scaled on an as needed basis. For example, centers could start small and scale up by adding an additional vessel as demand or funding allowed. In one embodiment, a human remains processing center where the vessels or vessels and superstructure consist of modular units that can be added or removed on an as needed basis.

Another embodiment can include structures in which where there are ports in the vessel that allow for the addition/removal of material, sampling, cleaning, measurement, humidity control etc.

In another embodiment, a vessel can be one in which access to the vessel can be achieved through doors or ports on the front and on the back, for example, front to allow placement of the body in sight of friends and family, back to allow staff to sample, add/remove material, measurement, cleaning, etc.

In another embodiment, air intake can occur at the front center of a cylindrical face, but the intake is hidden from view and air exits the vessel at the back end of the center of the cylindrical vessel, which can allow aeration and possible humidification of the content.

In another embodiment, the humidification can be fully or in part achieved through the control incoming air humidity.

In another embodiment, the vessel system includes a heat or humidity exchanging system, for example, where incoming air can be preheated or humidified by outgoing air.

In certain embodiments, the process of filling the vessel can occur in the following order:
  a. Material is placed in the lower part of the vessel.
  b. Cradle (or tray) is filled with body and material outside the vessel then put into the vessel.
  c. Additional material is placed over the cradle and initial material (potentially including water) is added through ports to fill the rest of the vessel.

In certain embodiments, the heat generated by the process is used to positive effect (for example, power lights, heat buildings or spaces, power or heat artistic or aesthetic elements).

In certain embodiments, the temperature of each vessel can be visibly indicated in such a way that it can be seen by non-staff members. This may consist of a numerical display of the actual temperature, colored lights representing the temperatures, light brightness or intensity is used to represent temperature. This can allow people visiting or observing the center to have a sense for what stage each of the vessels is at in the process.

In certain embodiments, the center can have a publicly visible and accessible wall of tools laid out for family, staff, associates or friends to use in preparing the cradle or vessel for the body or adding material.

In certain embodiments, there can be an allocated space near a vessel or vessel superstructure that would indicate the identity of the person being recomposed. This may consist of a shelf for pictures, a display of a name, or other identifying feature.

The recompose vessel is designed to transform human remains into soil. The process is aerobic.

In certain circumstances, the recompose vessel, and especially the interior drum, must be able to withstand:
  Maximum weight of 8000 lbs material
  Material temperatures 60 and 175 degrees F.
  Material moisture level 25-75%

The recompose drum will be rotated between 0 and 25 times per day. One rotation takes approximately 15 minutes The process for loading a body can include the following steps:
  1. Layer of wood chips added to body tray.

2. Body is laid onto body tray, which is held to box frame by shelf.
3. More wood chips added onto body (filling box frame).
4. Body tray and frame loaded into vessel.
5. Body tray removed from vessel. Box frame (and body and wood chips) held in vessel by auger panel.

Additional detailed description follows.

Mechanism/Action of Loading Concept

Figure 2A:
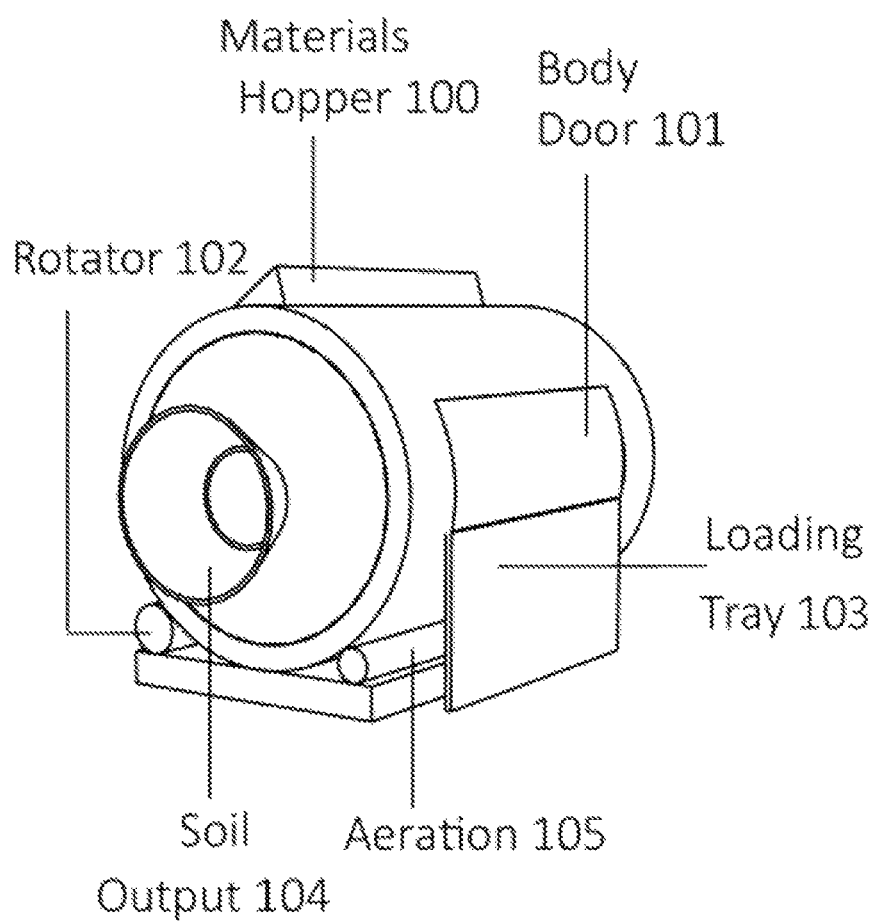
FIG. 2A depicts a vessel system for the contained, accelerated, and complete conversion of a body to soil via decomposition, including materials hopper, body door, rotator, loading tray, aeration, and soil output.
Figure 2B:
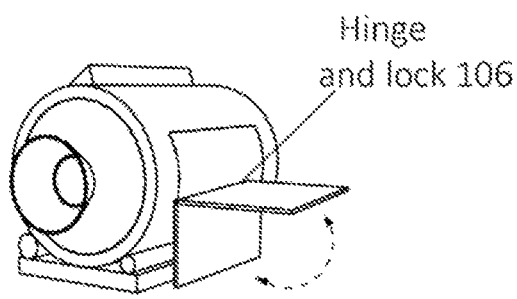
FIG. 2B depicts a pivoting loading tray with a hinge and lock system.
Figure 2C:
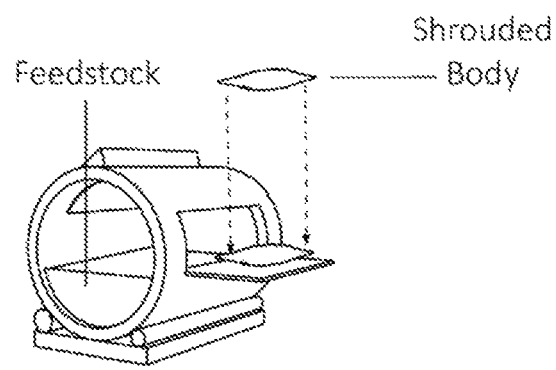
FIG. 2C depicts a cut-away view of the feedstock and shrouded body lying on the loading tray.
Figure 2D:
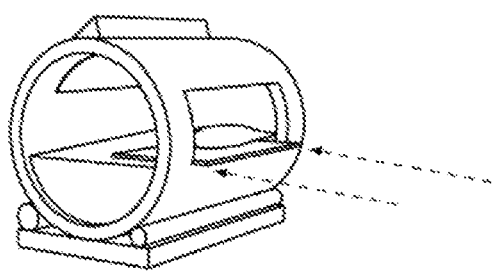
FIG. 2D depicts the loading tray with the shrouded body being pushed into the vessel.
Figure 2E:
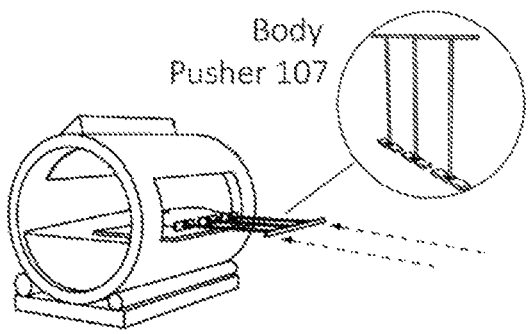
FIG. 2E depicts the body pusher.
Figure 2F:
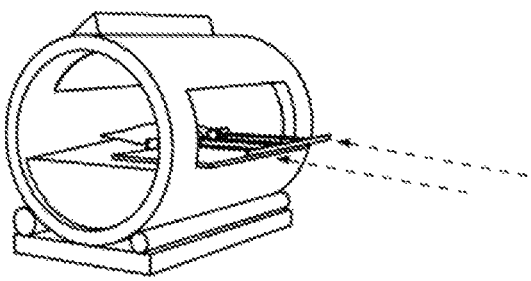
FIG. 2F depicts the body pusher pushing the body off the loading tray onto the feedstock in the vessel.
Figure 2G:
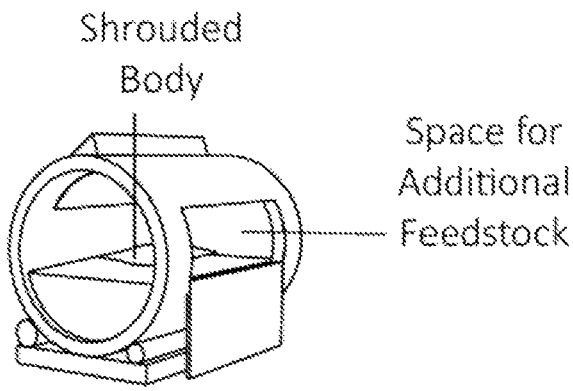
FIG. 2G depicts the space for the remaining ½ of the feedstock to be put into the vessel on top of the shrouded body.

Referring to FIG. 2A, a body can be put onto a loading tray 103 through a body door 101. Feedstock can be put into a materials hopper 100. The body and the feedstock can be rotated with a rotator 102 and aerated with an aerator 105. At the end of the recomposing, the soil amendment can be output through a soil output 104.

Referring to FIG. 2B-2G, a loading tray and a body pusher can be used to load the body into the vessel. A loading tray can be locked into place with hinge and lock 106. A shrouded body or otherwise clothed or unclothed body can be laid on the loading tray, and a loading tray may be pushed into a vessel. The body can be pushed off of the body tray and into the vessel with a body pusher 107.

Figures 3A, 3B:
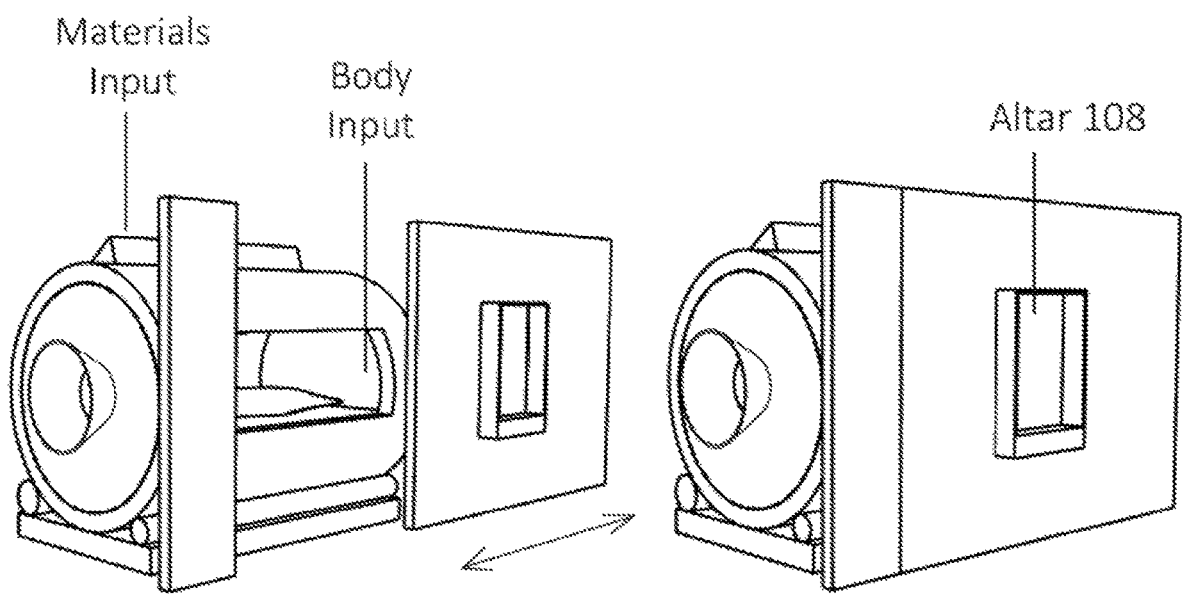
FIG. 3A depicts the altar wall in open position, providing access to the vessel. It depicts the fixed part of the altar wall, and the sliding part of the alter wall.
FIGS. 3B and 3C depict the altar wall in closed position.
Figure 3C:
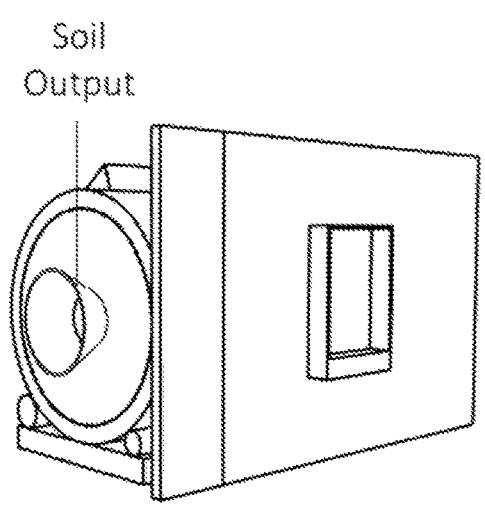
Figure 4A:
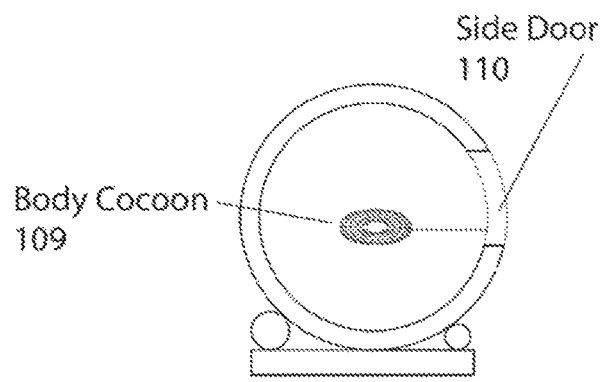
FIG. 4A depicts a section cut view of body "cocoon" in side loading vessel.
Figure 4B:
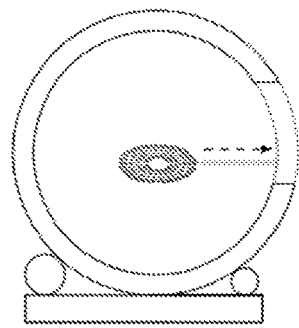
FIG. 4B depicts with direction of movement of body cocoon.
Figure 4C:
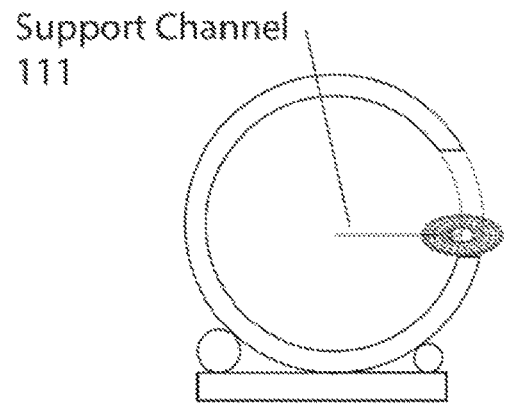
FIG. 4C depicts the vessel, body cocoon, and support channel.
Figure 4D:
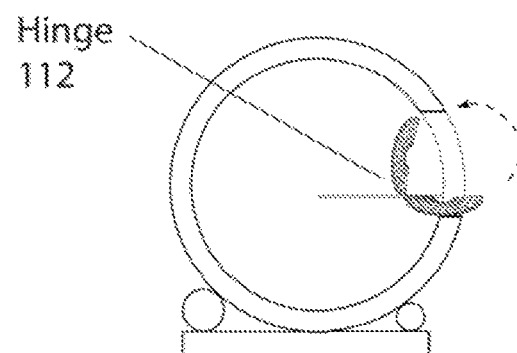
FIG. 4D depicts the hinged body cocoon opening.
Figure 4E:
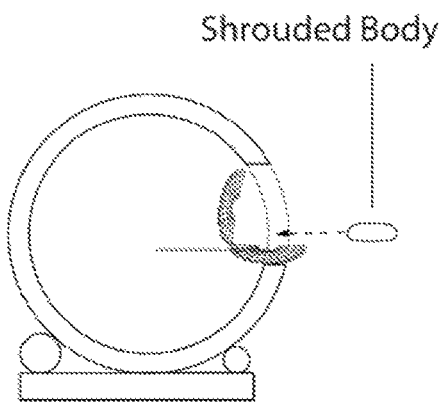
FIG. 4E depicts a shrouded body being loaded onto the body cocoon.
Figure 4F:
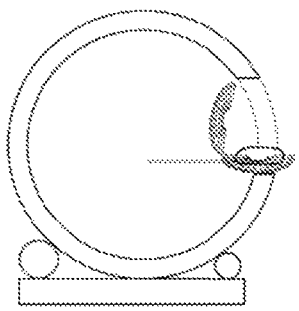
FIG. 4F depicts the shrouded body in the body cocoon.
Figure 4G:
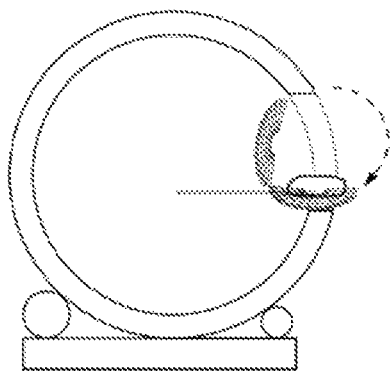
FIG. 4G depicts the body cocoon with clasp and lock closing over the shrouded body.
Figure 4H:
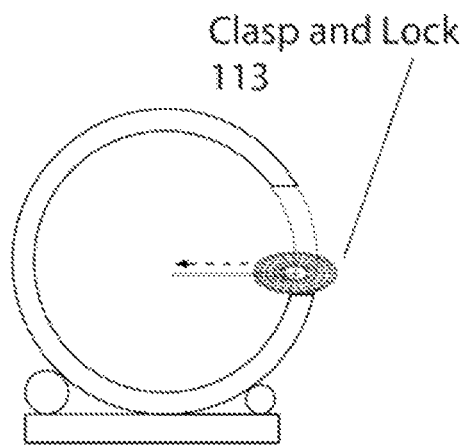
FIG. 4H depicts the closed body cocoon with direction of movement.
Figure 4I:
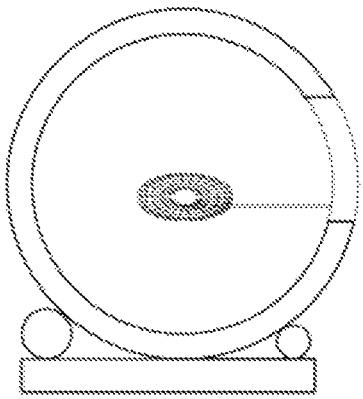
FIG. 4I depicts the closed body cocoon with shrouded body inside of center of vessel.
Figure 4J:
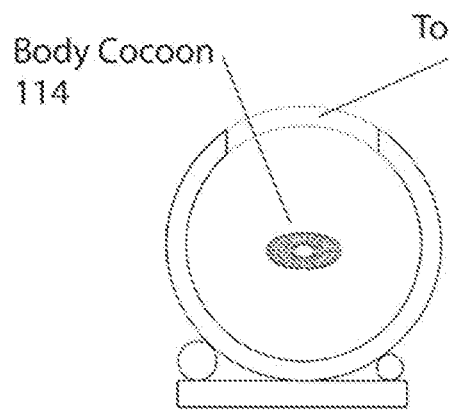
FIG. 4J depicts a section cut view of body cocoon in top loading vessel.
Figure 4K:
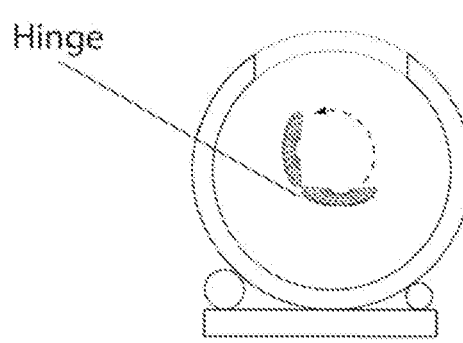
FIG. 4K depicts the body cocoon and hinged opening.
Figure 4L:
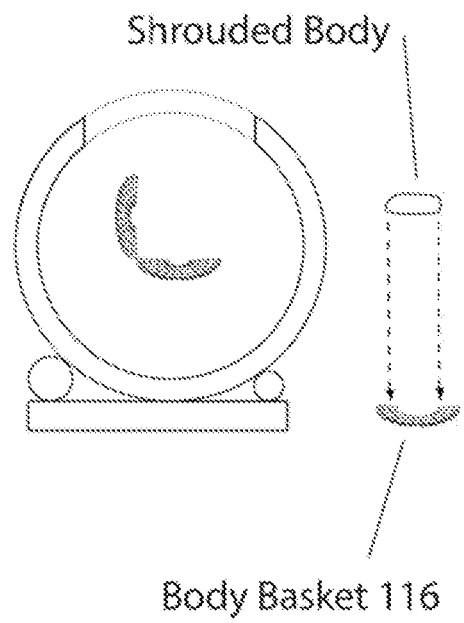
FIG. 4L depicts a shrouded body being placed into the body basket.
Figure 4M:
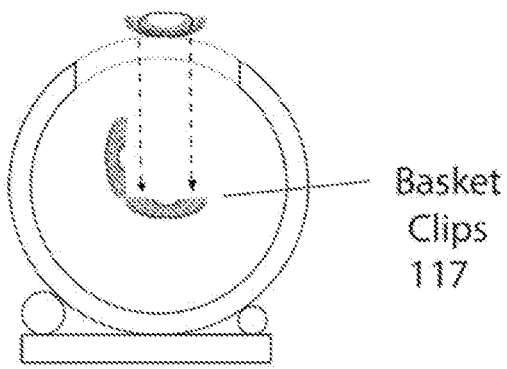
FIG. 4M depicts the body basket being lowered into the vessel and clipped into the cocoon.
Figure 4N:
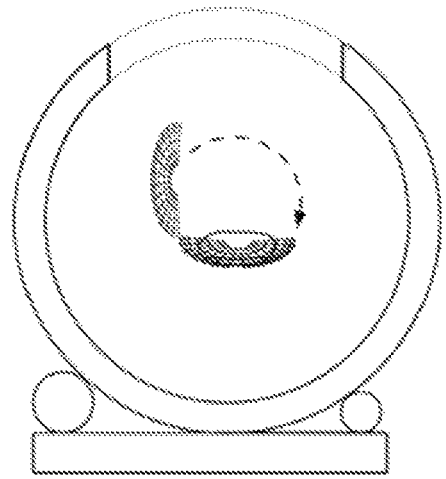
FIG. 4N depicts the body cocoon closing over the shrouded body in the basket.
Figure 4O:
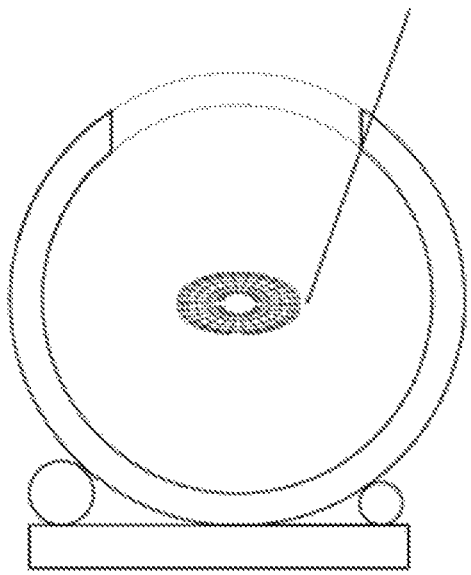
FIG. 4O depicts the closed body cocoon in the center of the vessel with clasp and lock.

Referring to FIGS. 3A-3C, an altar 108 can let grieving families memorialize the deceased. The alter can be temporary.

Referring to FIG. 4A-4I, the vessel can be a side-loading vessel. A body cocoon 109 can slide from inside a vessel to a side door 110 on a support channel 111. A body cocoon 109 can open at a hinge 112 and a shrouded or otherwise clothed or unclothed body may be put into it. A body cocoon 109 can close over a body and be secured by a clasp and lock 113.

Referring to FIG. 4J-4O, the vessel can be a top-loading vessel. A shrouded or otherwise clothed or unclothed body can be put into a body basket 116, and then lowered through a top door 115 onto a body cocoon 114. A body basket 116 can be secured to a body cocoon 114 by basket clips 117. A body cocoon 114 can be closed over a body and be secured by a clasp and lock 118.

Figure 5A:
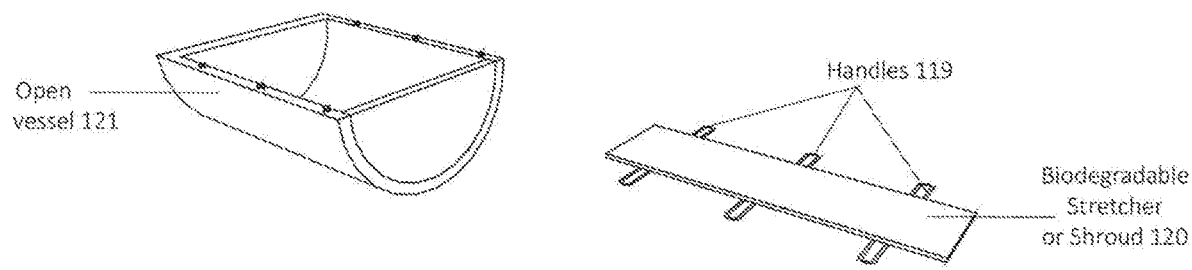
FIG. 5A depicts the lower half of a vessel, in open position. It depicts a decomposable stretcher or shroud with handles.
Figure 5B:
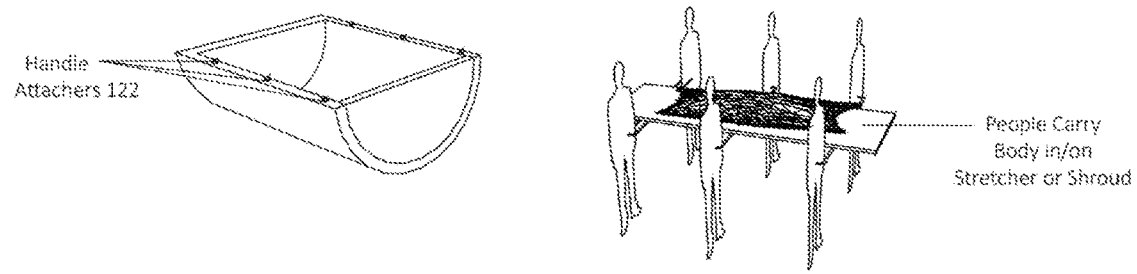
FIG. 5B depicts a shrouded body on the stretcher or shroud with handles, and six people carrying it. It depicts handle attachers on the vessel half.
Figure 5C:
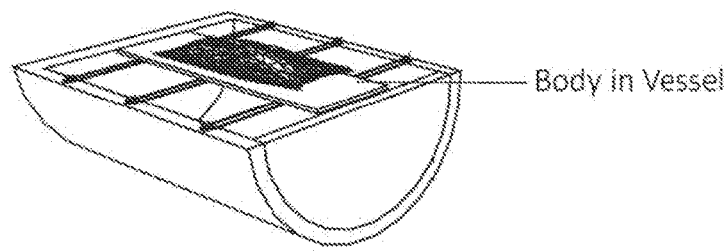
FIG. 5C depicts the shrouded body on top of the stretcher or shroud with handles attached to the handle attachers.

Referring to FIG. 5A-5C, a biodegradable stretcher or shroud 120 can have handles 119. Handles 119 can attach to handle attachers 122, so that the biodegradable stretcher or shroud 120 can be affixed to an open vessel 121.

Figure 6:
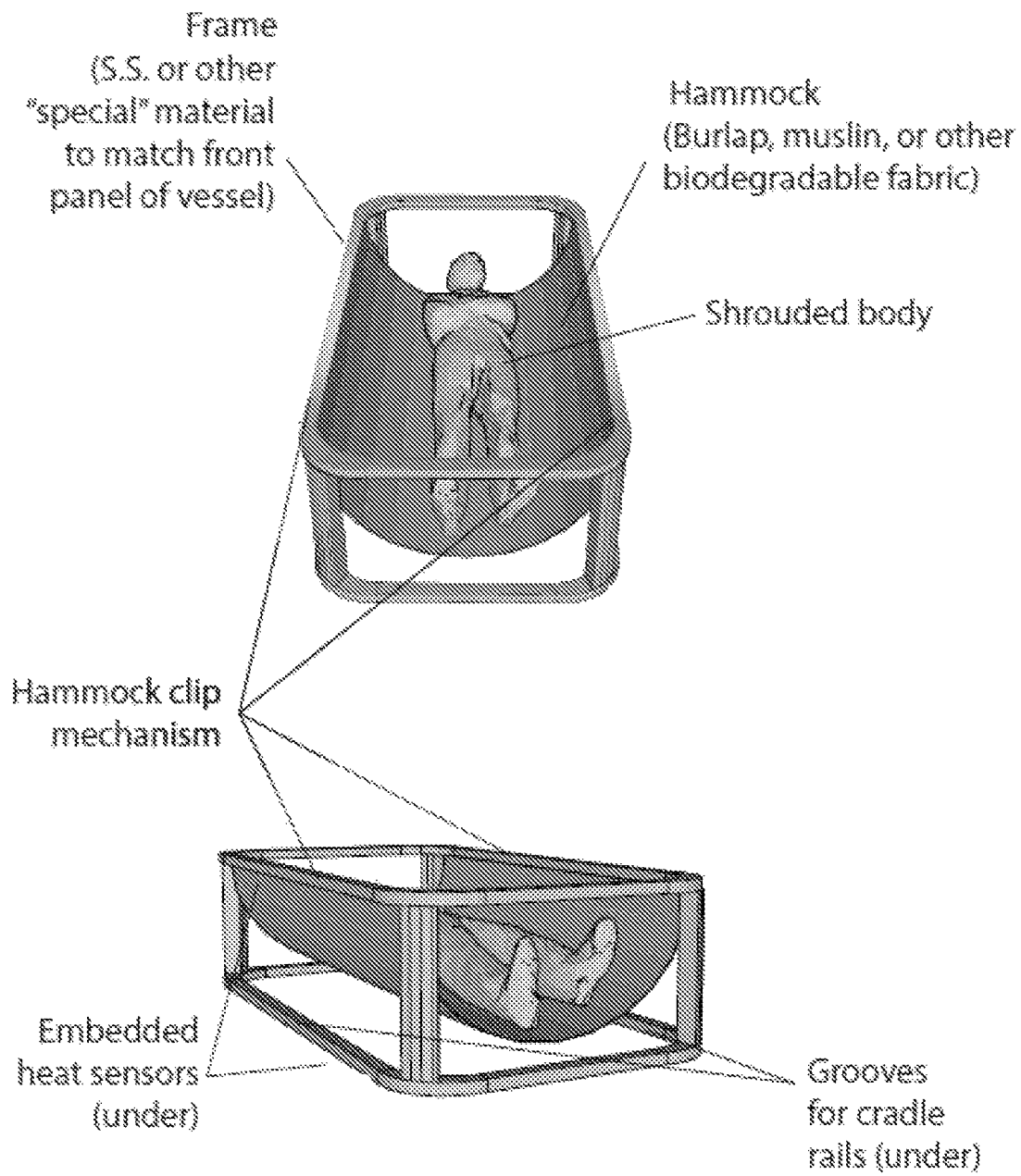
FIG. 6 depicts a cradle.
Figures 7A, 7B:
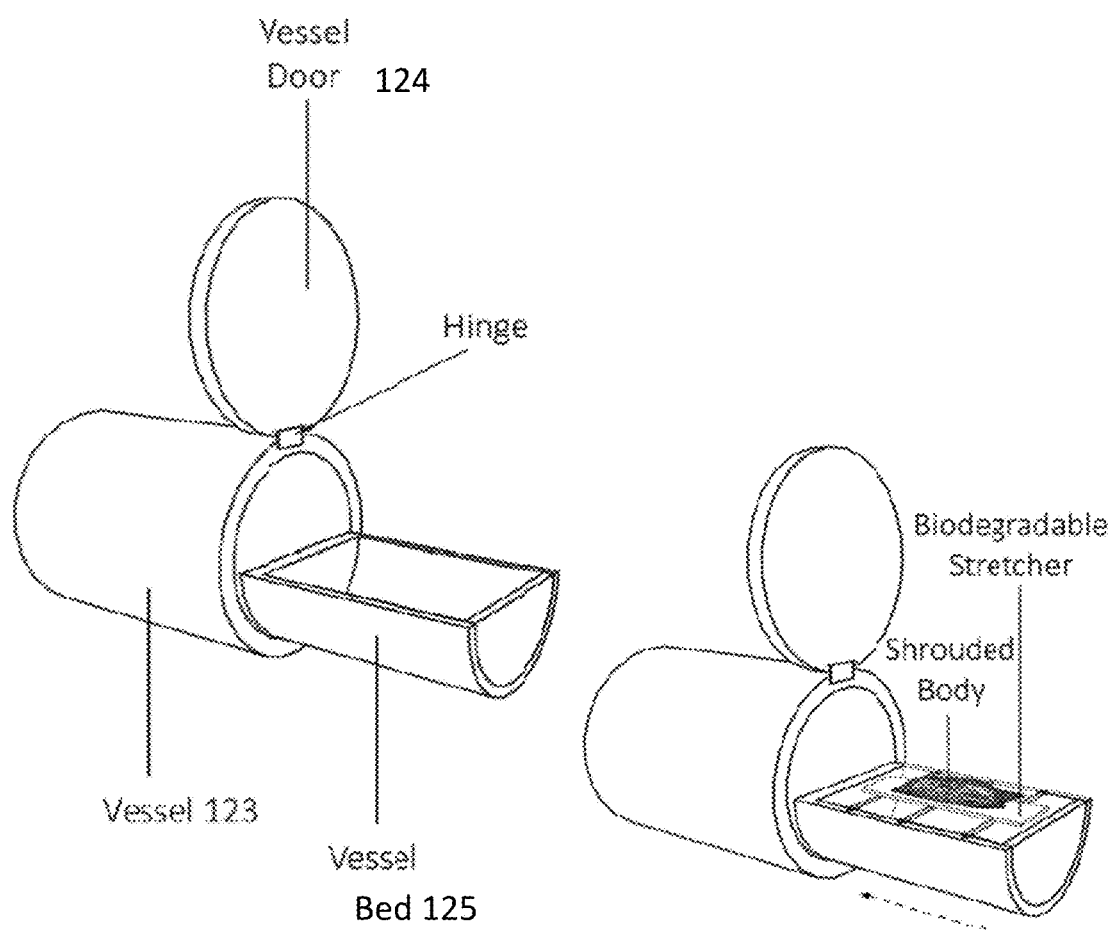
FIG. 7A depicts a vessel with a hinged door and a vessel bed that slides out for loading a body.
FIGS. 7B-7C depict a vessel bed with a shrouded body on top of a biodegradable stretcher, and a vessel bed with a shrouded body on top of a biodegradable platform.
Figures 7C, 7D:
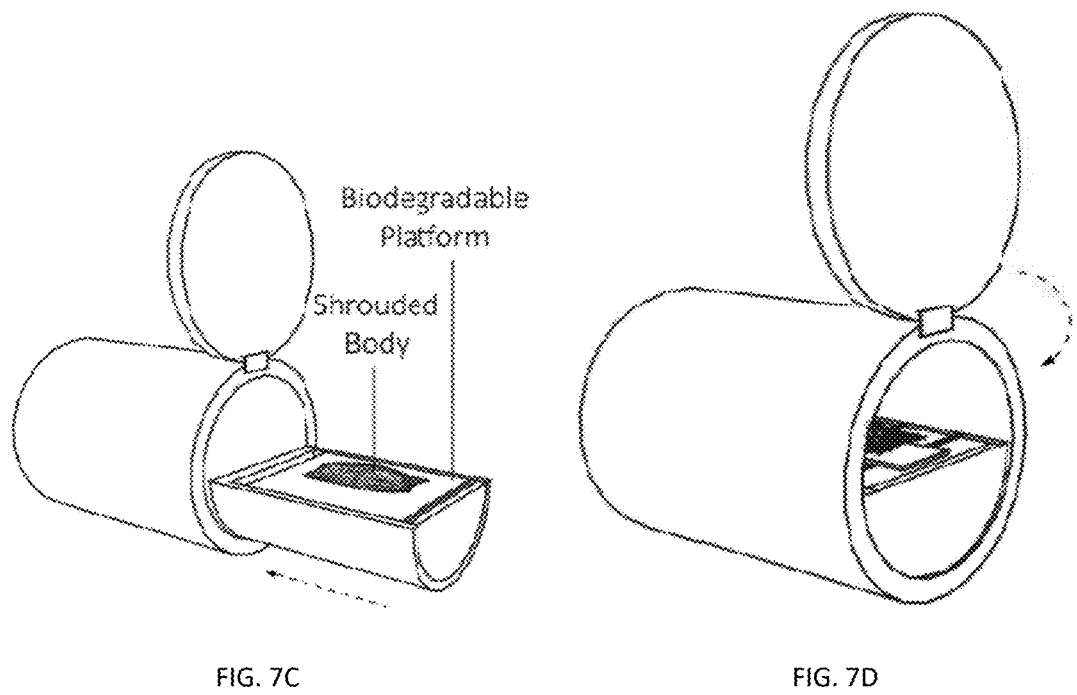
FIG. 7D depicts the vessel bed inside the vessel.

Referring to FIG. 6, a cradle can include a frame that holds a hammock. The frame can be stainless steel or another material compatible with the vessel and conditions within the vessel. The hammock can be a biodegradable fabric, such as burlap, muslin or other material. The shrouded body can be placed on the hammock. The frame can include heat sensors and/or other environmental sensors (humidity, for example) to monitor conditions inside the vessel. The frame can include grooves or rails that slide into mating members within the vessel to hold the frame within the vessel.

Referring to FIG. 7A-7D, the vessel can include a half-cylinder bed. In this configuration, a vessel bed 125 can slide into a vessel 123. Vessel door 124 can be attached by a hinge to close the vessel when the bed has been inserted. The shrouded body can be placed on a biodegradable stretcher or platform.

Figure 8A:
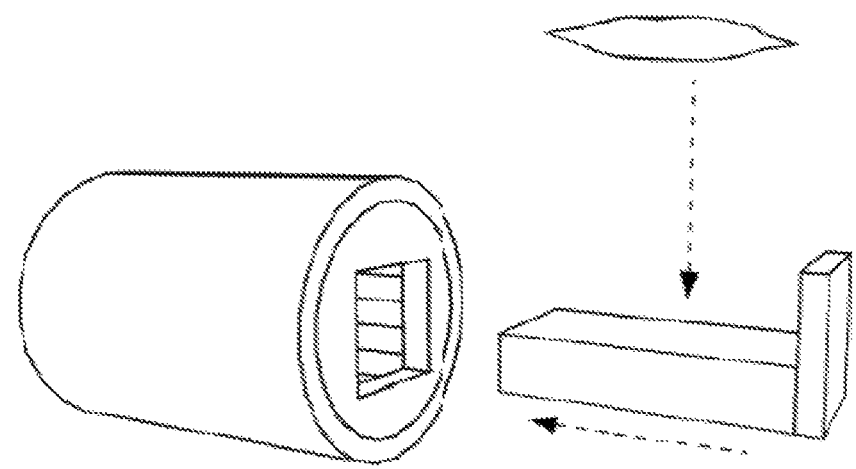
FIGS. 8A-8C depict three variations of a loading action with a loading tray and a body pusher.
Figure 8B:
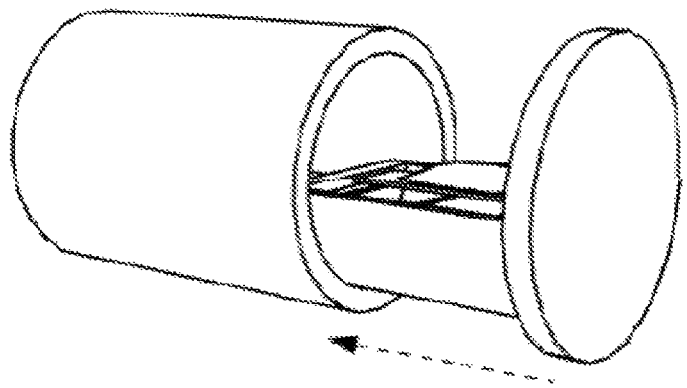
Figure 8C:
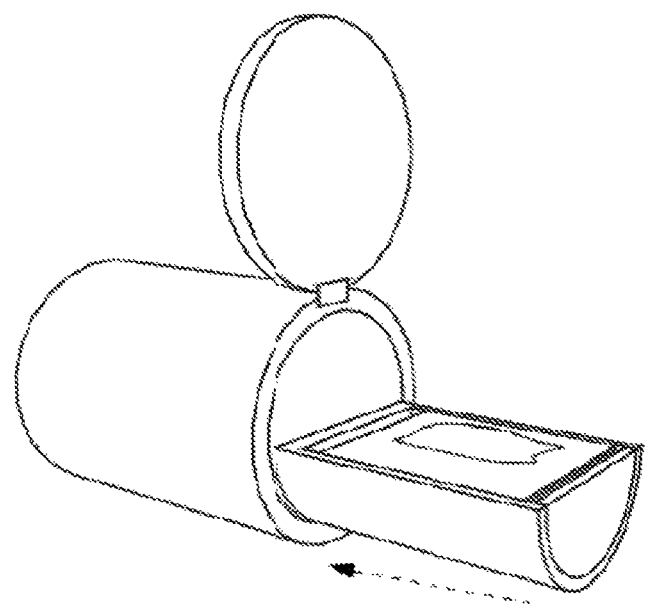

FIGS. 8A-8C depict three variations on the "tin can" loading action. In FIG. 8A, the shrouded body is placed onto a rectilinear "bed," which is then inserted into the vessel's rectilinear hole. In FIG. 8B, the shrouded body is placed onto a bed that slides along the interior bottom half of the vessel, the end of this bed is the "cap" of the vessel. In FIG. 8C, the shrouded body is placed onto a bed that slides along the interior bottom half of the vessel. A hinged door then closes the vessel.

The body may be placed anywhere in the vessel. It may be placed on top of feedstock, it may be placed on a stretcher or a "body nest" of sorts, or it may be placed directly onto the bottom of the vessel itself.

The body may be pushed into the vessel using a "body pusher", a rake, or a shovel, or another sort of pushing apparatus.

The body may be clothed or it may be shrouded or it may have nothing on it.

Feedstock will also be loaded into the vessel. This may be manual or mechanical. It may happen via the same opening that the body is loaded from, or it may be loaded from a separate opening.

The loading of the body may be manual or mechanical.

Figure 9A:
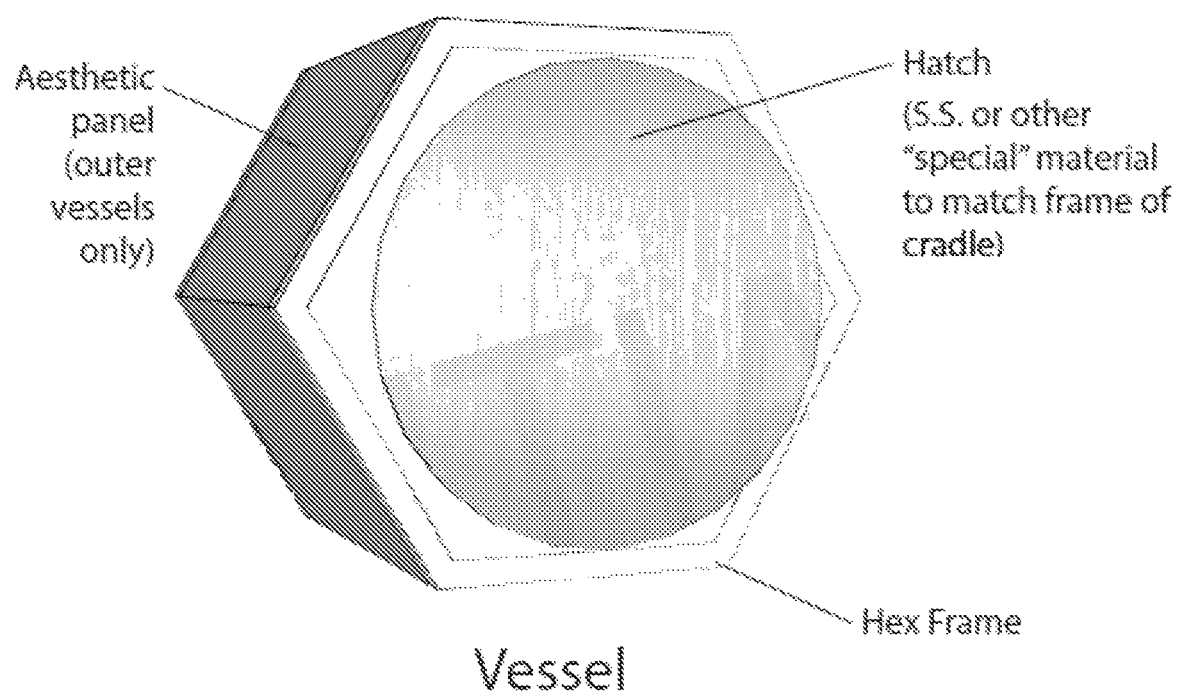
FIGS. 9A-9C depict a vessel and ceremonial environment.
Figure 9B:
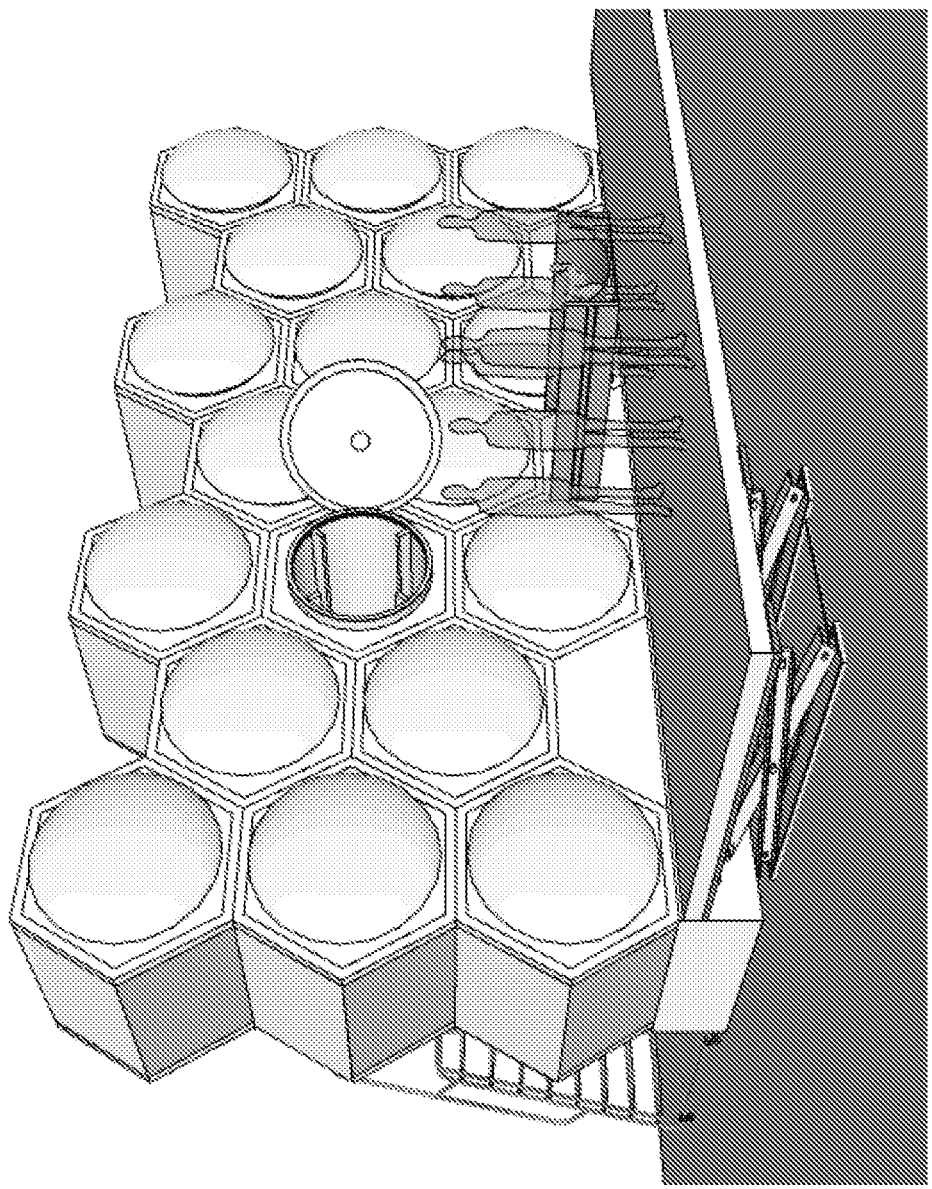
Figure 9C:
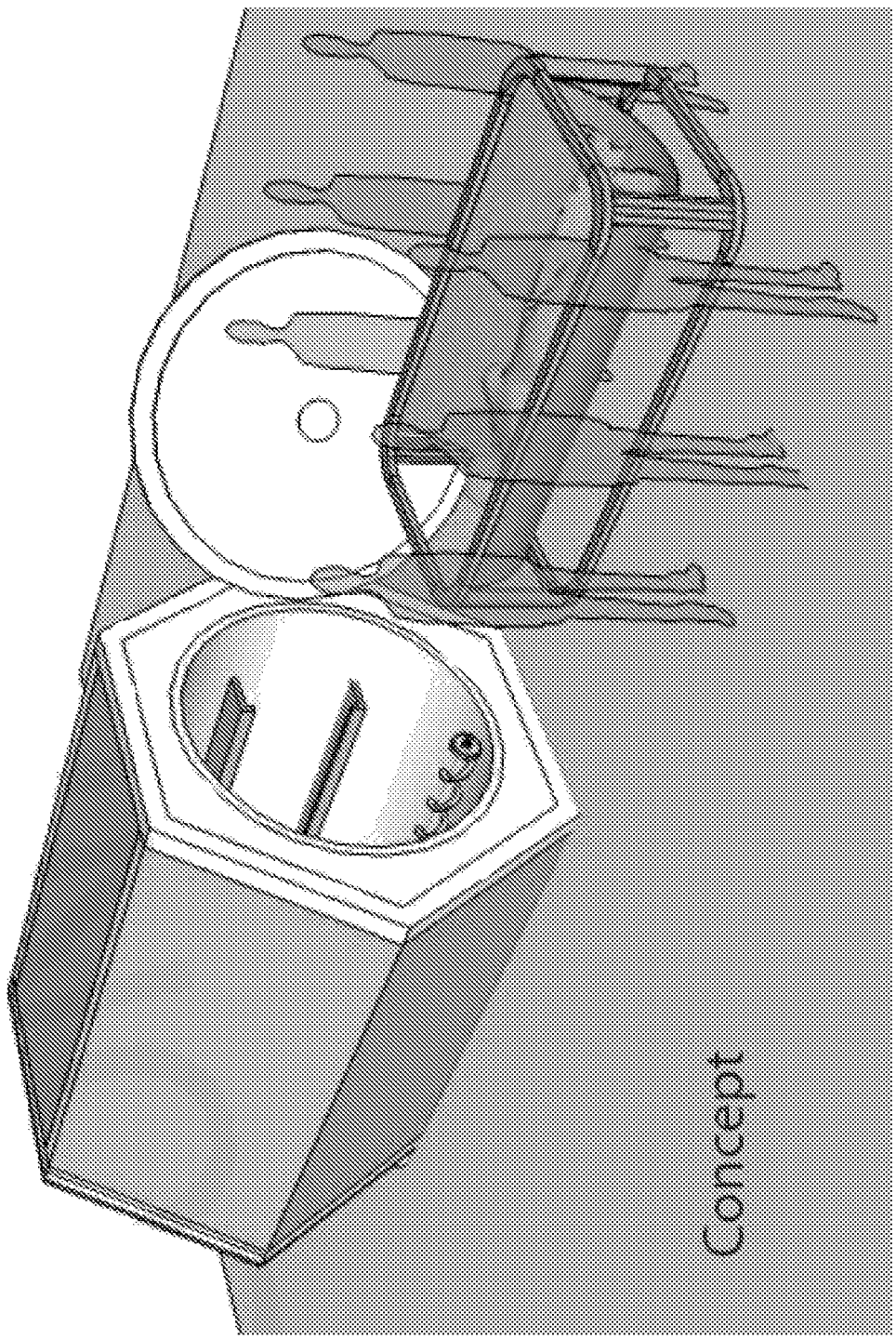

Referring to FIG. 9A, a vessel can include a frame, for example, a hexagonal frame, that can be used to assemble a system. The vessel can include a hatch made of stainless steel or another material to match the cradle in the vessel. The hexagonal frame can include one or more aesthetic panels, so that when assembled as a system, an example of which is shown in FIG. 9B, the external portions of the system are closed. The system can include a scissor lift and platform for accessing the vessels of the system for delivering the body to the vessel. Referring to FIG. 9C, the cradle can be delivered into the open vessel using a scissor lift and platform.

Additional Description for Mechanism/Action of Loading Concept

The body may be placed anywhere in a vessel. It may be placed on top of feedstock, it may be placed on a stretcher or a "body nest" of sorts, it may be placed directly onto the bottom of a vessel itself.

The body may be pushed into a vessel using a "body pusher", a rake, or a shovel, or another sort of pushing apparatus.

The body may be clothed or it may be shrouded or it may have nothing on it.

Feedstock will also be loaded into a vessel. This may be manual or mechanical. It may happen via the same opening that a body is loaded from, or it may be loaded from a separate opening.

The loading of a body may be manual or mechanical.

Supporting a Body in a Vessel Concept

Figure 10:
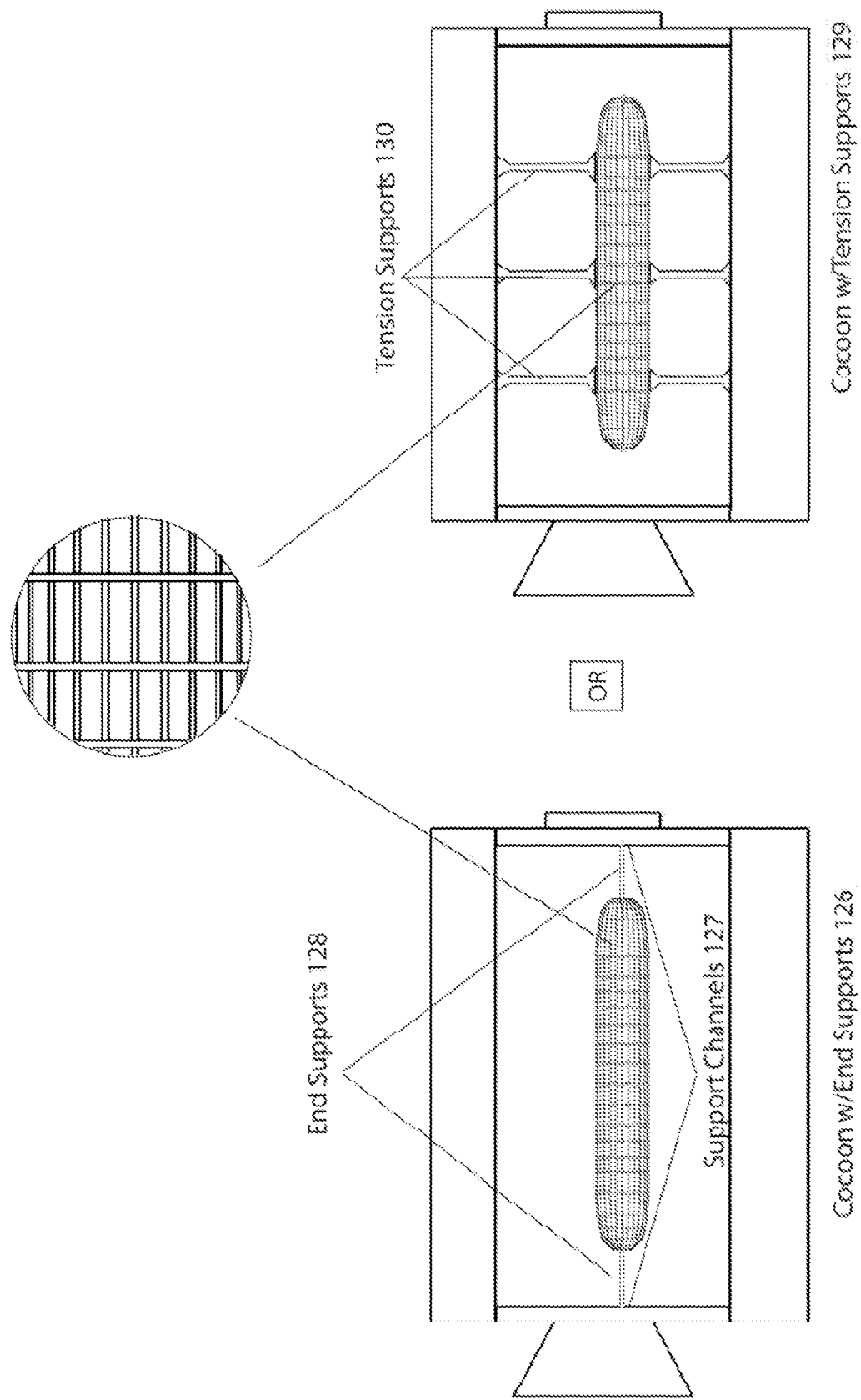
FIG. 10 depicts a section cut view of a vessel with body "cocoon," including a detail of the body cocoon wire frame. B1 depicts the end support version and B2 depicts the tension support version.

Referring to FIG. 10, a vessel can have a cocoon with end supports 126 with end supports 128 and support channels 127. A vessel can also have a cocoon with tension supports 129 with tension supports 130.

Figure 11A:
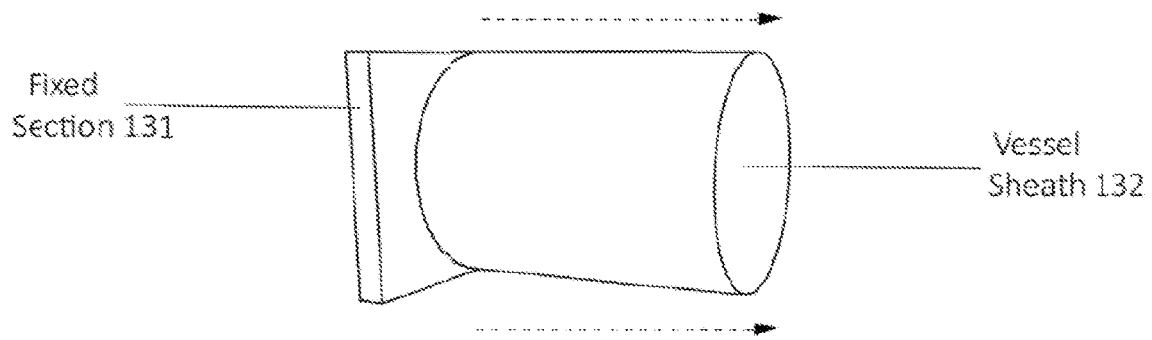
FIG. 11A depicts a fixed section with a rotating vessel sheath affixed. This vessel sheath is removable from the fixed section.
Figure 11B:
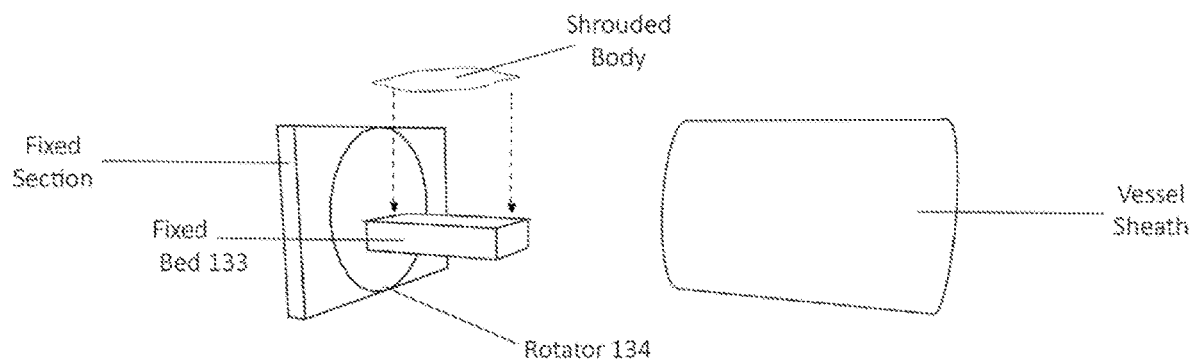
FIG. 11B depicts the vessel sheath removed from the fixed section. A fixed bed protrudes from the fixed section, and a shrouded body is being laid on the fixed bed. The vessel sheath rotator is also depicted.
Figure 11C:
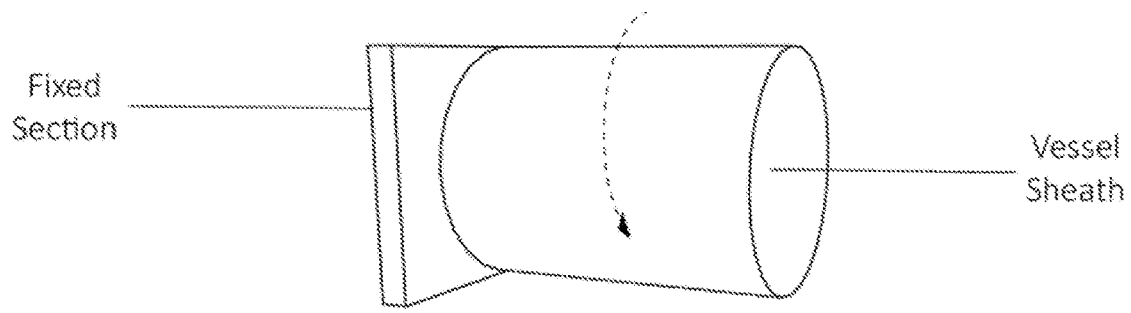
FIG. 11C depicts the vessel sheath rotating around the fixed bed.

Referring to FIGS. 11A-11C, a fixed section 131 can have a vessel sheath 132 that fits over it. Underneath the vessel sheath 132 there can be a fixed bed 133 that a body is laid upon. The fixed section 131 can also have a rotator 134.

Figure 12A:
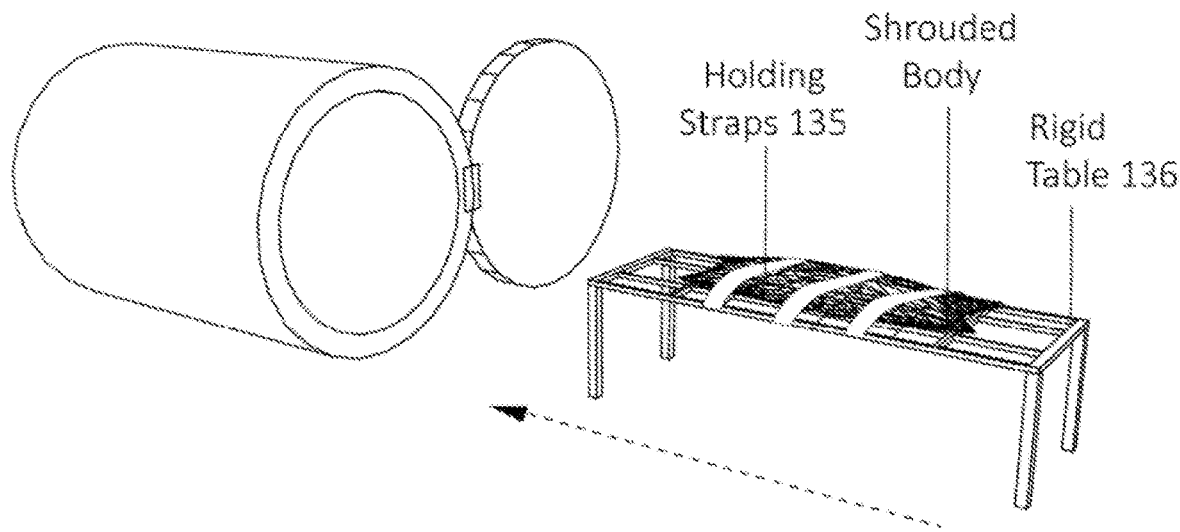
FIG. 12A depicts an open vessel and a rigid table with a shrouded body secured with holding straps.
Figure 12B:
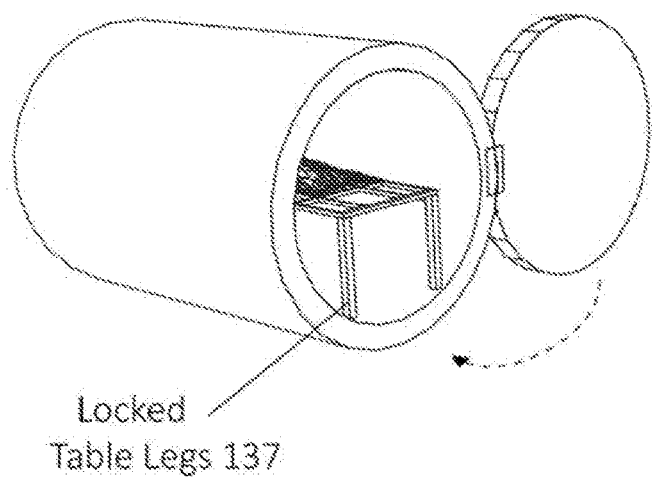
FIG. 12B depicts the rigid table inside the vessel and secured to the vessel.
Figure 12C:
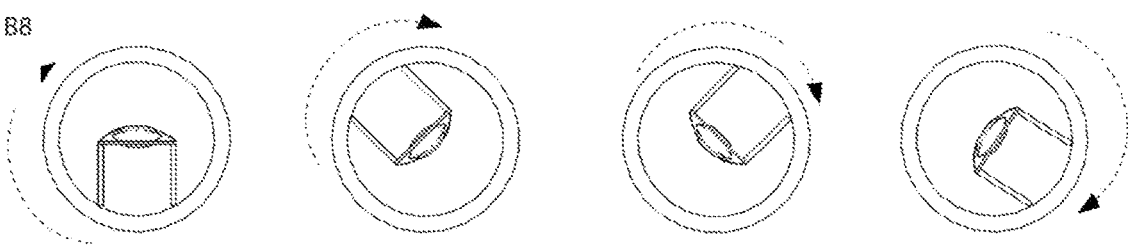
FIG. 12C depicts a section view of the vessel rotating with the table and the shrouded body secured.

Referring to FIGS. 12A-12C, a rigid table 136 may have holding straps 135 for holding a body in place. A rigid table 136 may be placed inside a vessel and have locked table legs 137, allowing the rotation of a vessel with a body held in place.

Additional Description for Supporting a Body in a Vessel Concept

A body may be supported in the vessel or it may not be supported. It may be "free floating" in the vessel.

If a body is supported, it may be supported by a biodegradable supporter or by a non-biodegradable supporter.

If a body is supported, the supporter may rotate or it may not rotate.

Vessel Opening Concept

Referring to FIGS. 13A-13D, there can be a vessel 138 that is opened generally like a tin can, either by a vessel bed 139 sliding in and out, or by a hinge 140 opening outwards, or by a hinge 141 opening upwards.

Figure 13A:
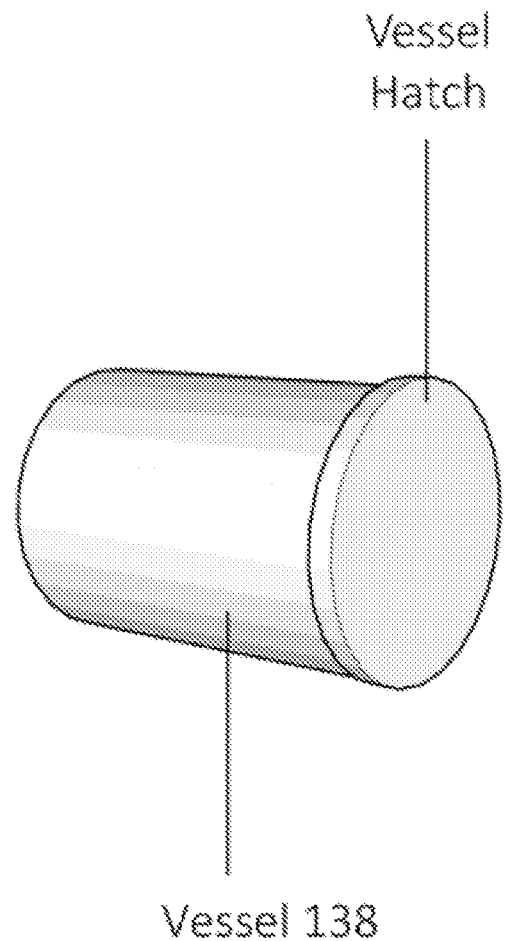
FIGS. 13A-13D depict a vessel.
Figure 13B:
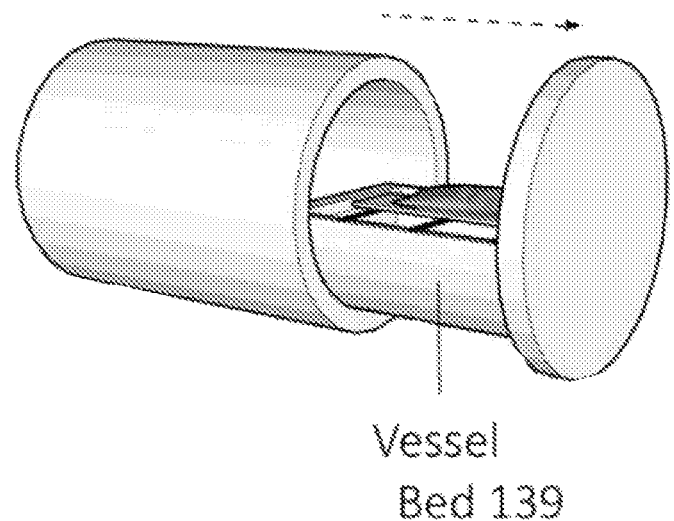
Figure 13C:
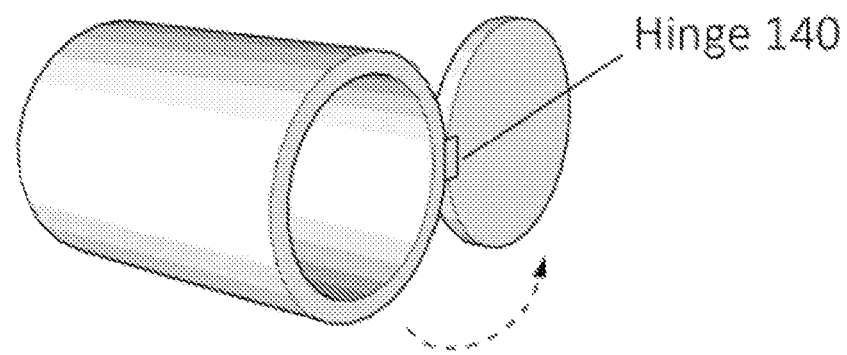
Figure 13D:
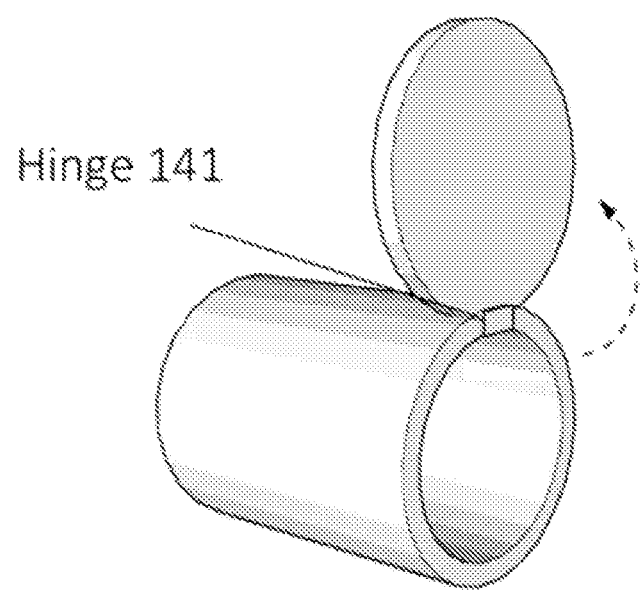

Referring to FIGS. 13B-13D, the vessel hatch can open in three ways:
a. Sliding out (FIG. 13B).
b. Swinging open to the side via hinge 140 (FIG. 13C).
c. Swinging open to the top via hinge 141 (FIG. 13D).

FIGS. 14A-14D depict a vessel 142 with a top vessel hatch 143.

Figure 14A:
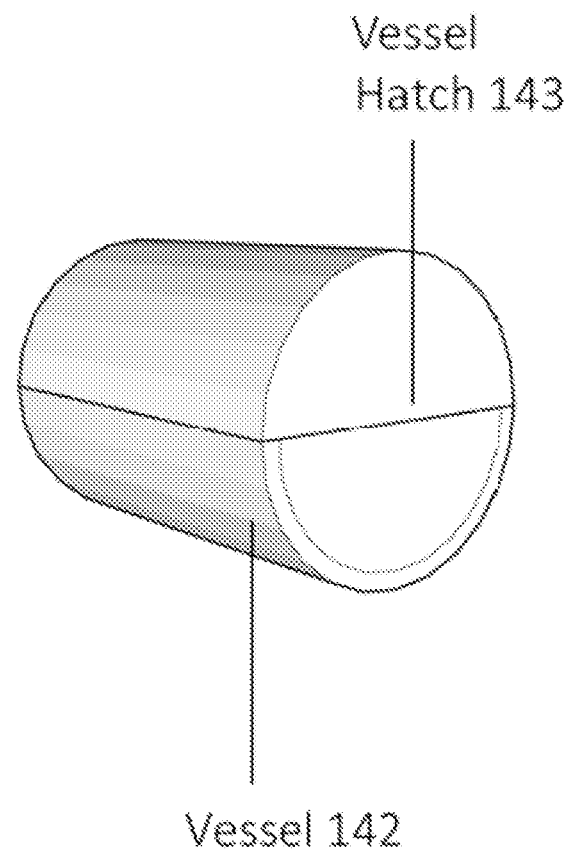
FIGS. 14A-14D depict an alternative embodiment of a vessel.
Figure 14B:
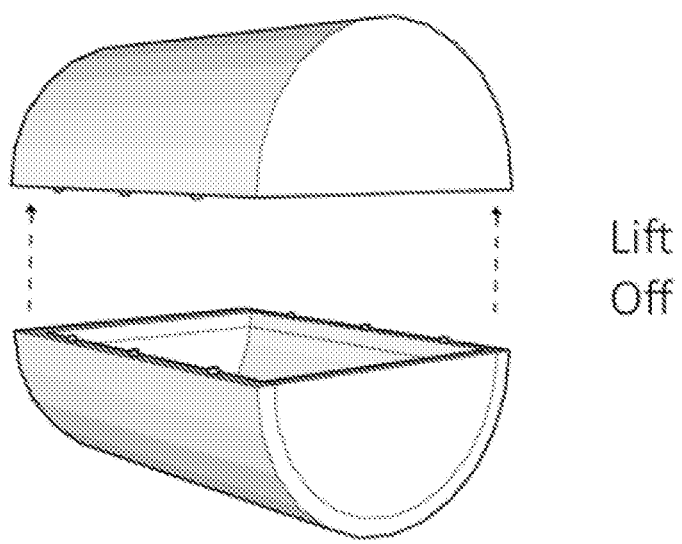
Figure 14C:
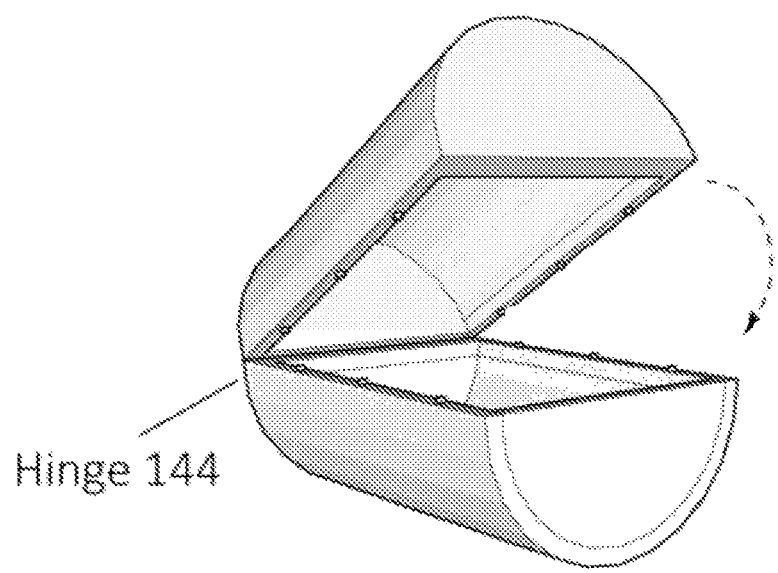
Figure 14D:
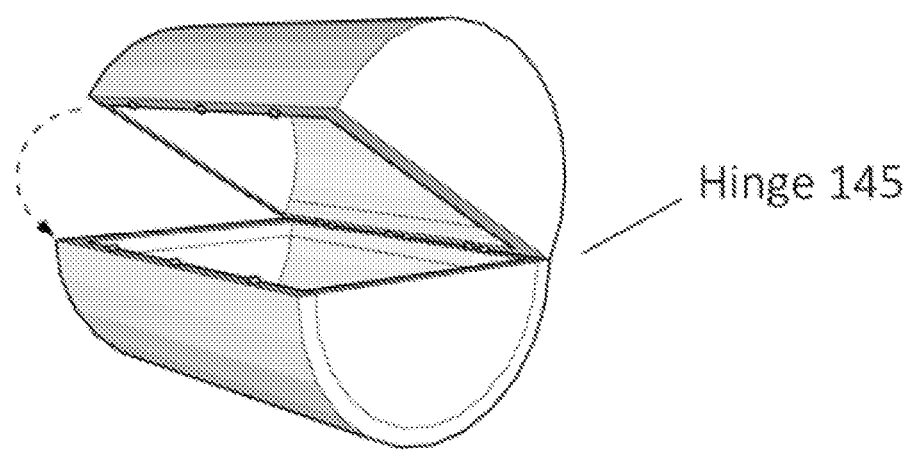

FIGS. 14B-14D depict the vessel hatch opening in three ways:
a. Lifted off (FIG. 14B).
b. Opening upwards with the hinge 144 on one end (FIG. 14C).
c. Opening upwards with hinge 145 on one side (FIG. 14D).

Referring to FIGS. 14A-14D, there can be a vessel 142 with a vessel hatch 143 that is opened generally like a clamshell, either by the top half lifting off, or by a hinge 144 at the short end, or by a hinge 145 at the long end.

Figure 15A:
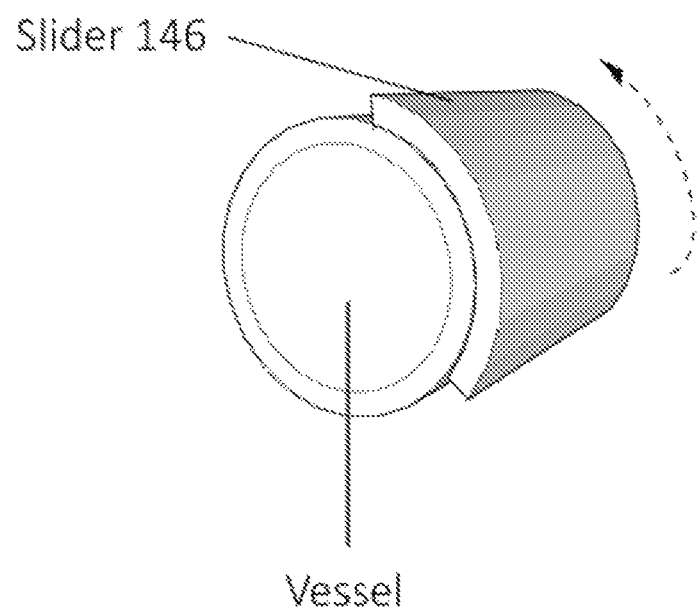
FIG. 15A depicts a vessel with a rounded slider door in closed position.
Figure 15B:
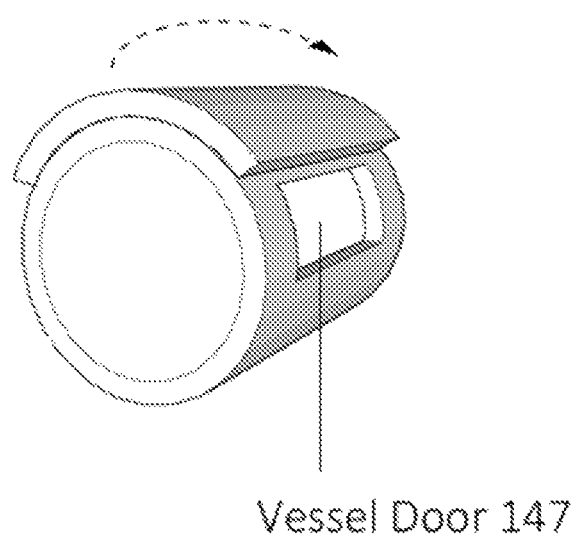
FIG. 15B depicts a vessel with a rounded slider door in open position.

Referring to FIGS. 15A and 15B, a vessel can be opened by a slider 146, which acts as a door and slides back to reveal a vessel door 147.

Figure 15C:
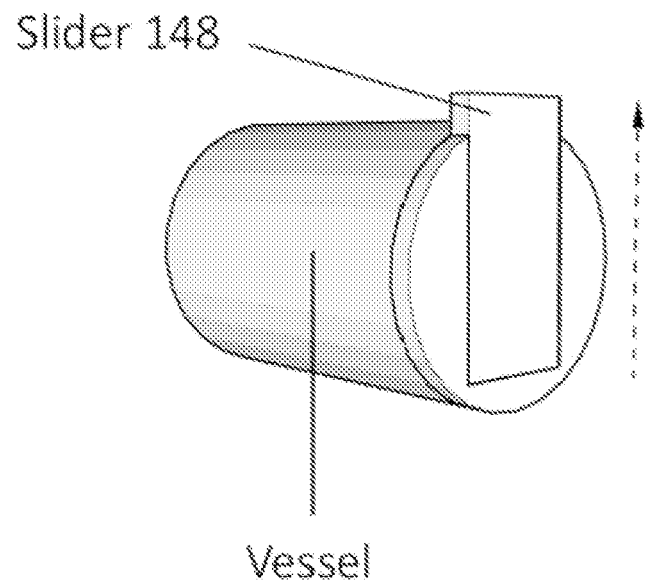
FIG. 15C depicts a vessel with a flat slider door in closed position.
Figure 15D:
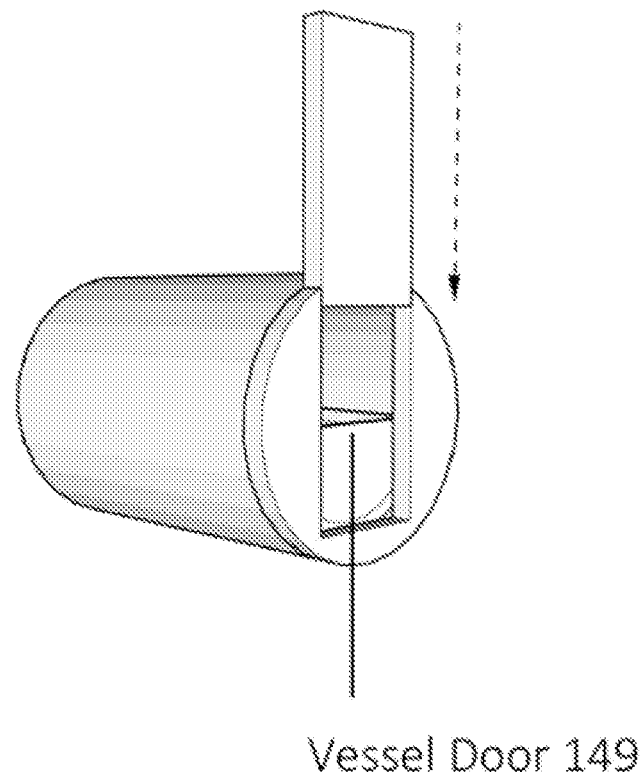
FIG. 15D depicts a vessel with a flat slider door in open position.

Referring to FIGS. 15C and 15D, a vessel can be opened by a slider 148, which acts as a door and slides up to reveal a vessel door 149.

Additional Description for Vessel Opening Concept

The vessel may open from the side, the top, or either of the ends.

The vessel opening may be hinged, it may slide, it may be slotted, it may lift off, or it may be opened in another manner.

The vessel may have an interior portion that is removed, or it may not.

Stacking and Racking Concept

Referring to FIG. 16A, a vessel 150 can be stacked in a rack 151.

Figure 16B:
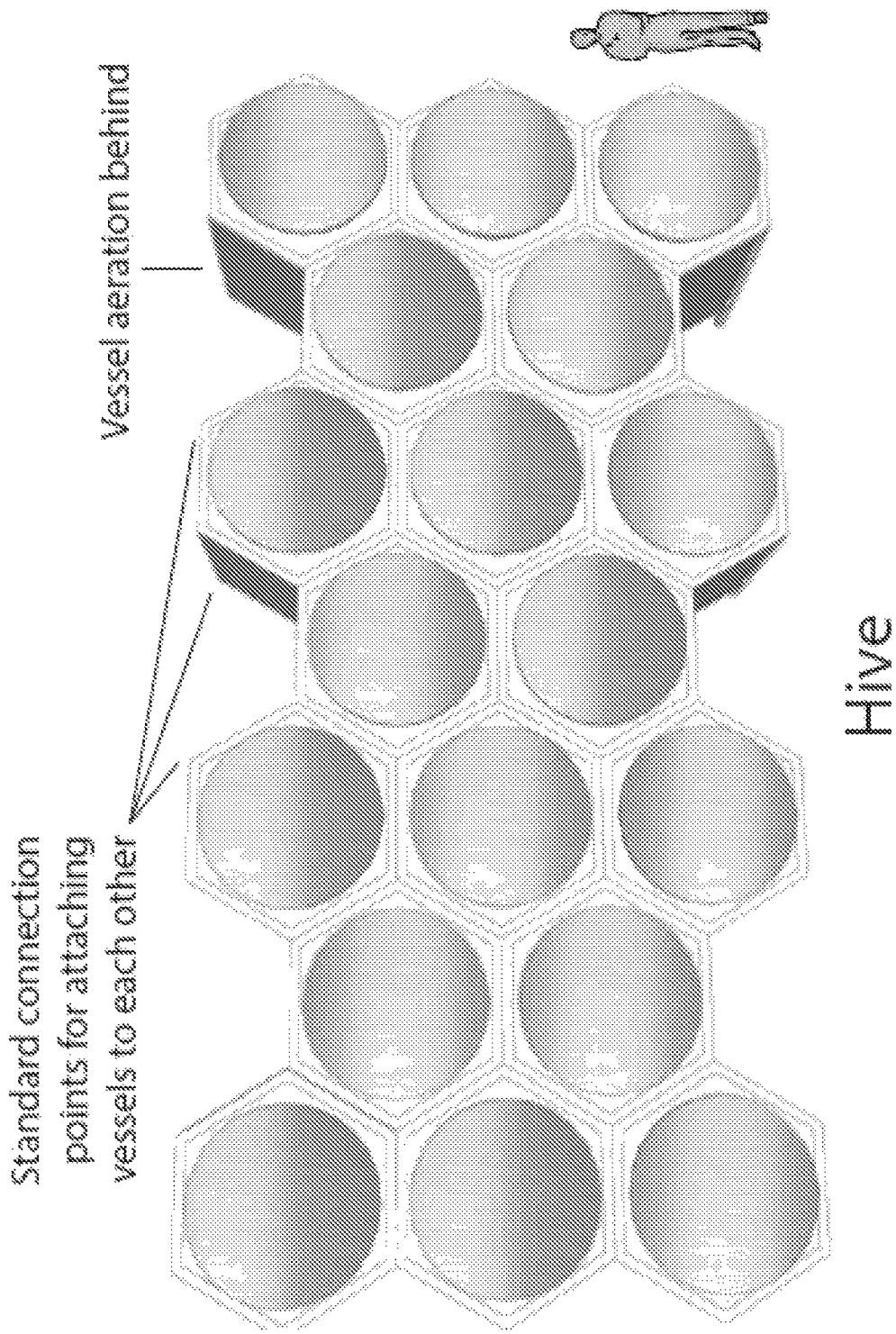
FIG. 16B depicts a hive.

Referring to FIG. 16B, a plurality of vessels can be connected to form a hive. The hive includes standard connection points for attaching adjacent vessels to each other. Vessel aeration can be accessed behind the hive.

Figure 16C:
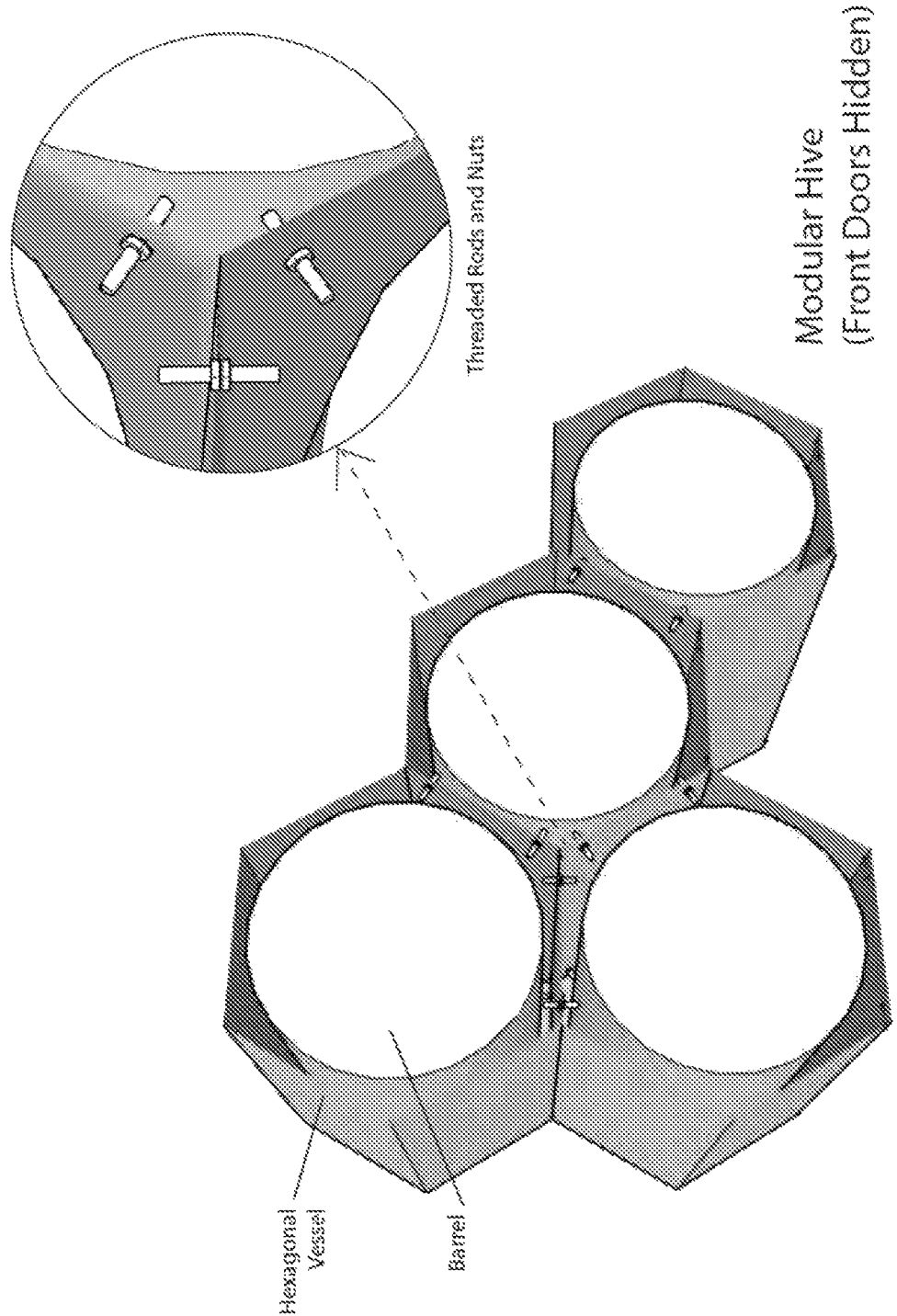
FIG. 16C depicts a connection system in a hive.

Referring to FIG. 16C, a plurality of hexagonally shaped vessels forming the hive can be connected at adjoining vertices, for example, using threaded rods and nuts.

Figure 16D:
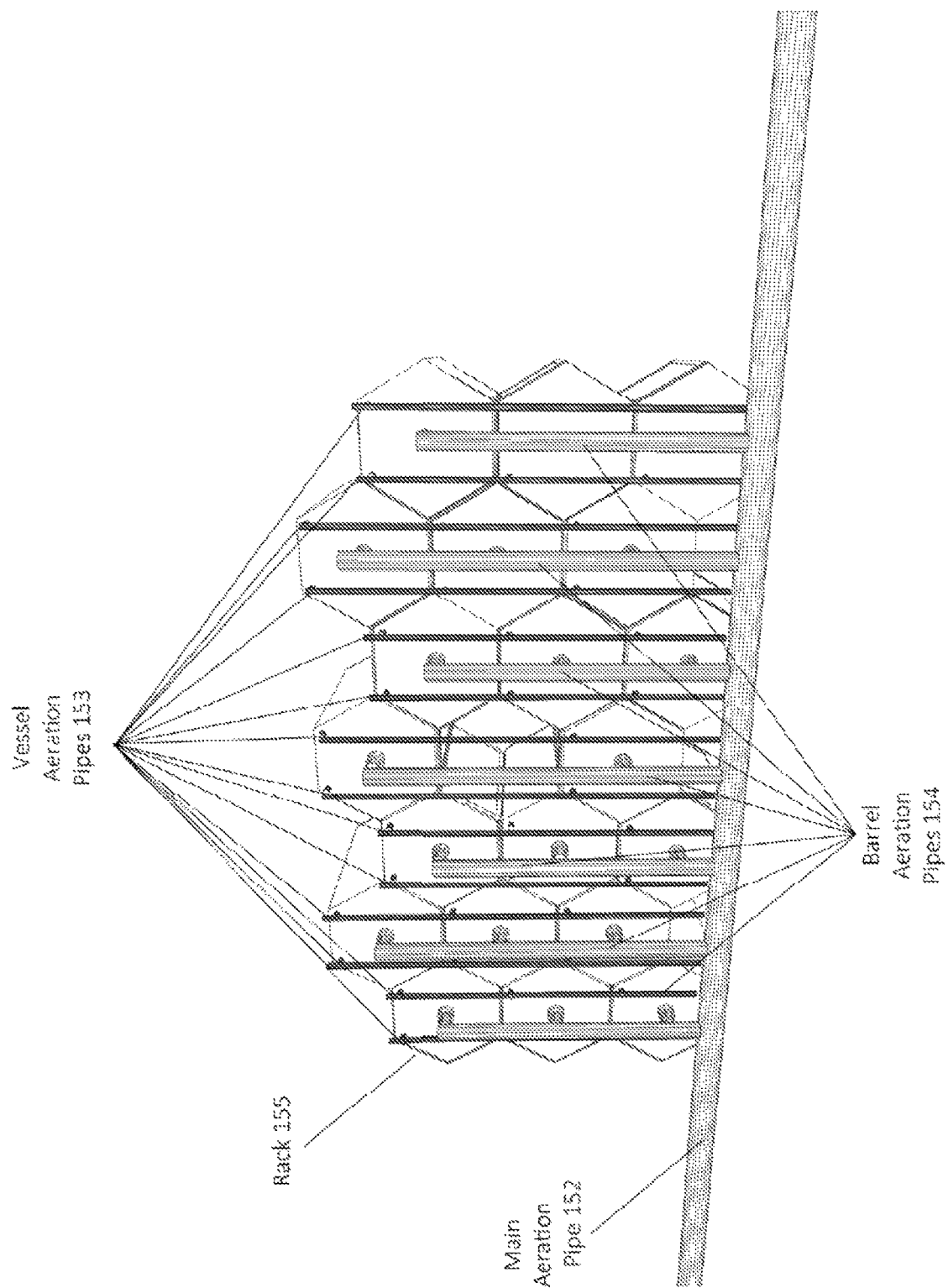
FIG. 16D depicts the back of a rack of vessel, with aeration pipe, vessel aeration, and barrel aeration.
Figure 17A:
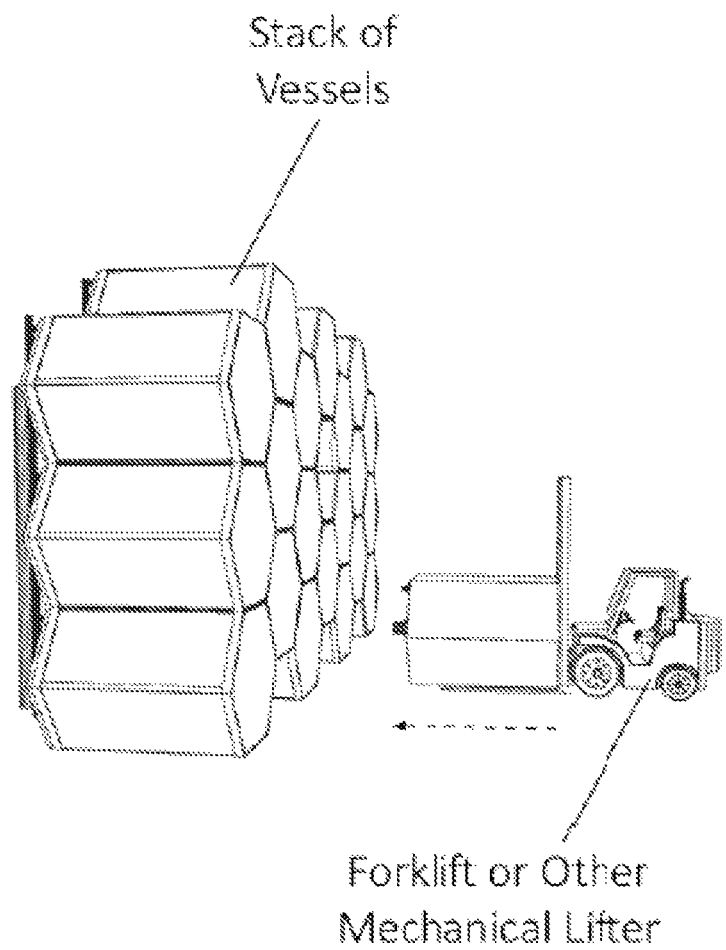
FIG. 17A depicts a rack of vessels and a forklift or other mechanical lifter.
Figure 17B:
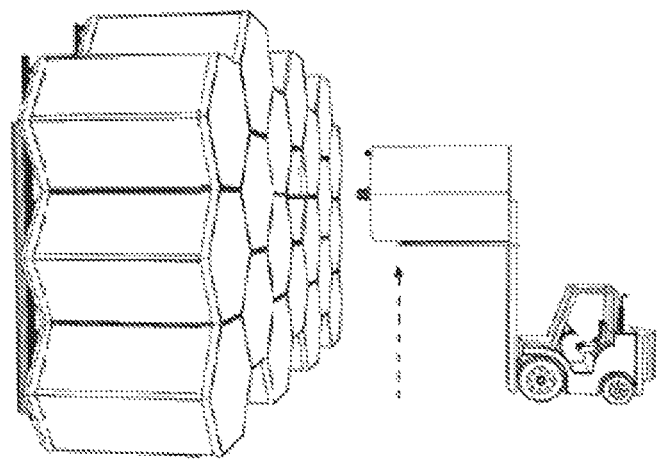
FIG. 17B depicts the mechanical lifter lifting a vessel into place.
Figure 17C:
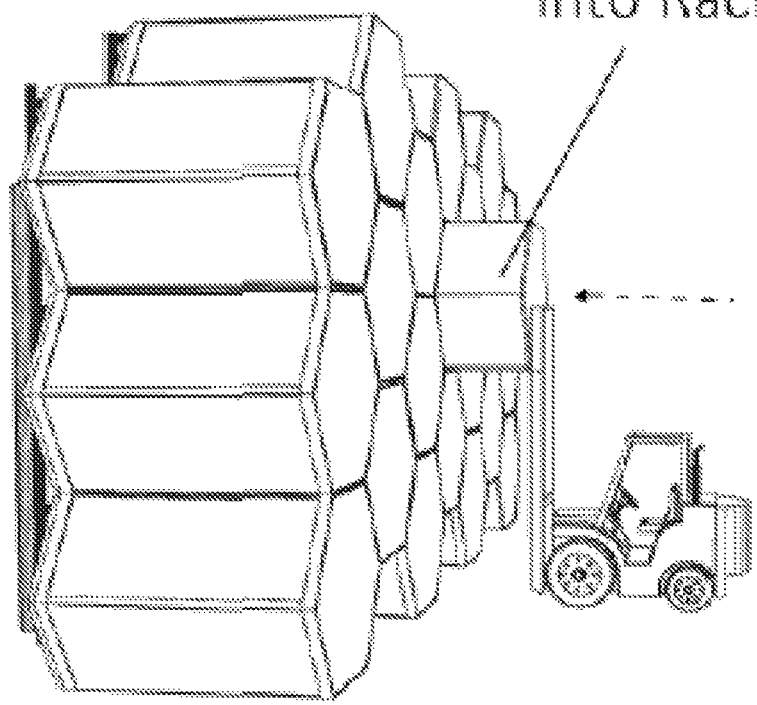
FIG. 17C depicts the mechanical lifter sliding a vessel into its spot on the rack.
Figure 17D:
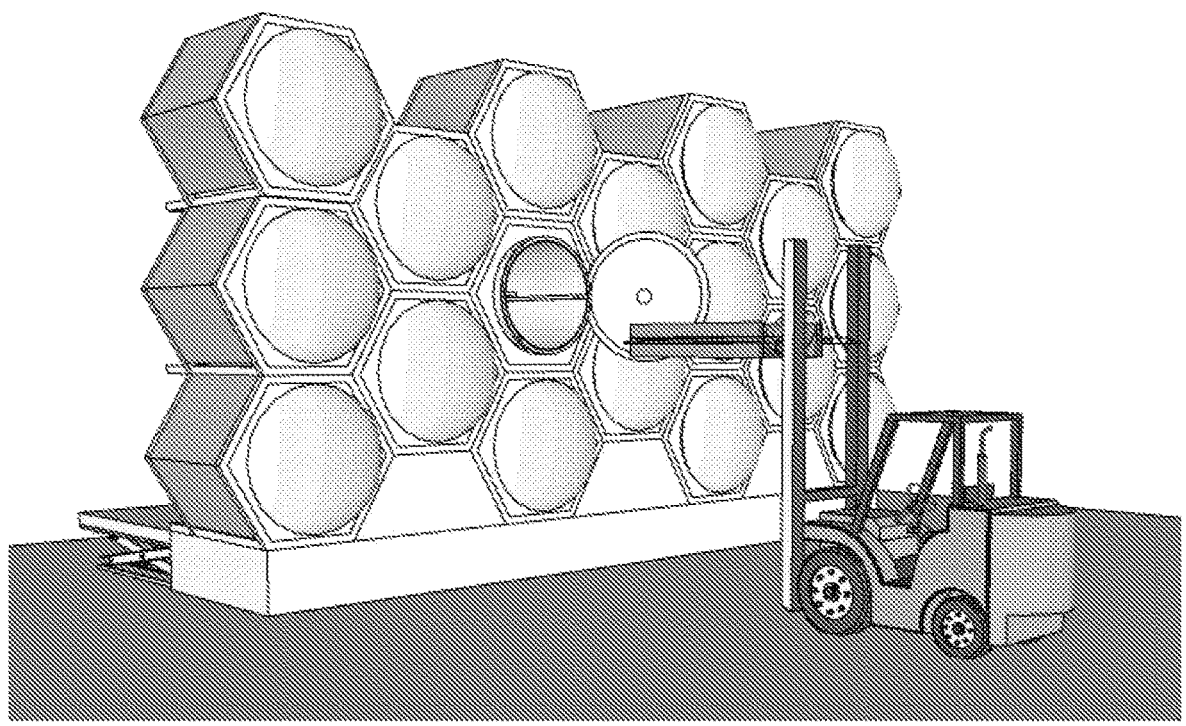
FIG. 17D depicts the mechanical lifter sliding a unit into a vessel.
Figure 18A:
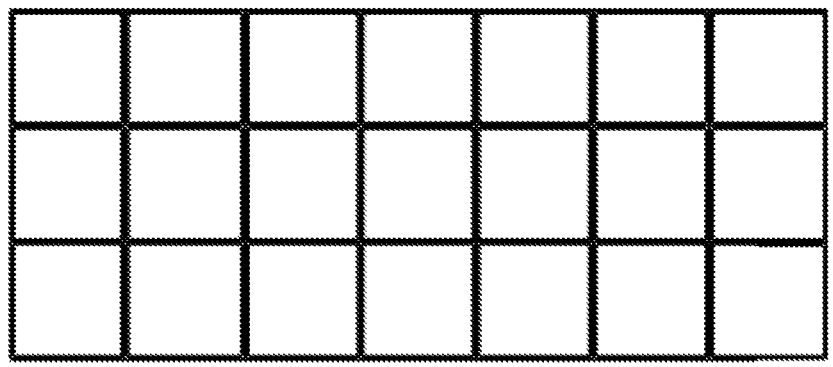
FIG. 18A depicts a square racking system with square vessels.
Figure 18B:
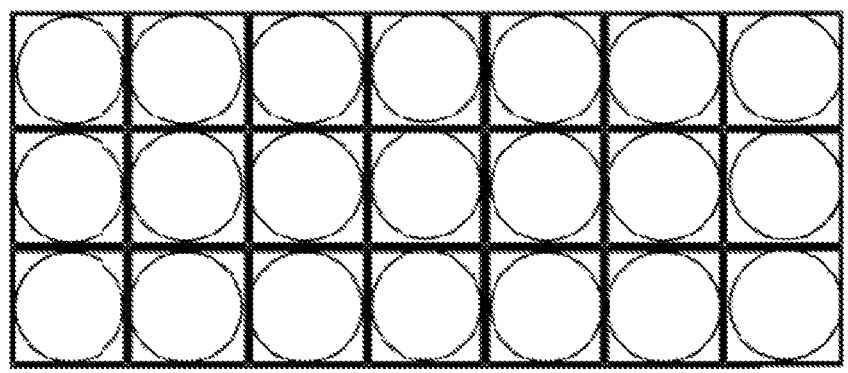
FIG. 18B depicts a square racking system with cylindrical vessels.
Figure 18C:
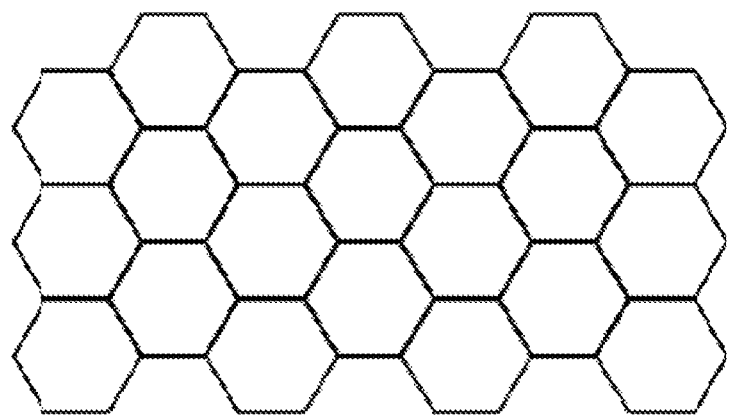
FIG. 18C depicts a hexagonal racking system with hexagonal vessels.
Figure 18D:
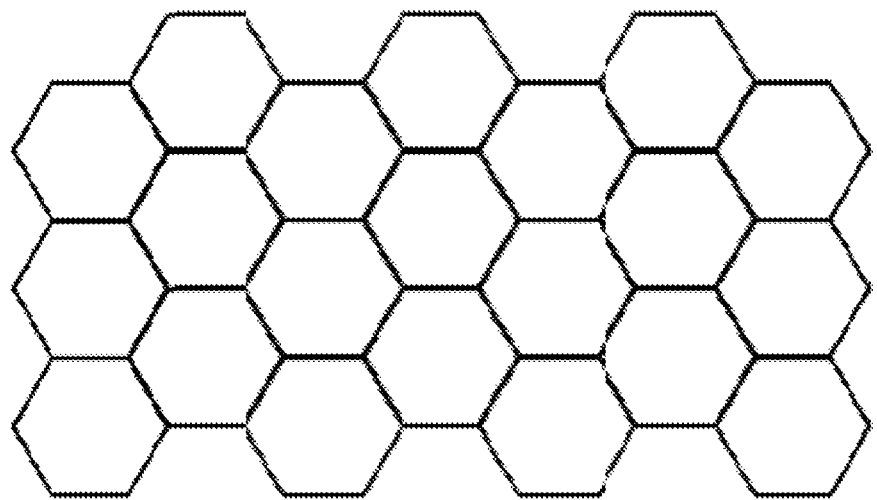
FIG. 18D depicts a large "hive" rack of hexagonal vessels.
Figure 18E:
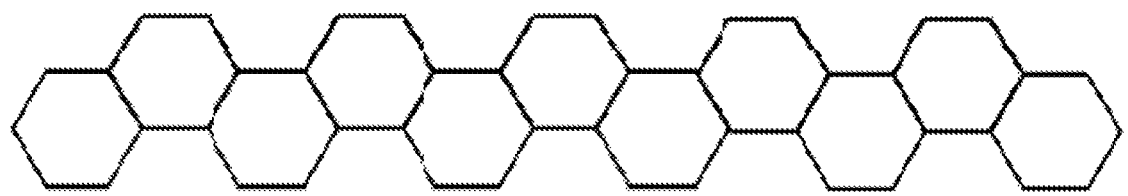
FIG. 18E depicts a long row rack of hexagonal vessels.
Figure 18F:
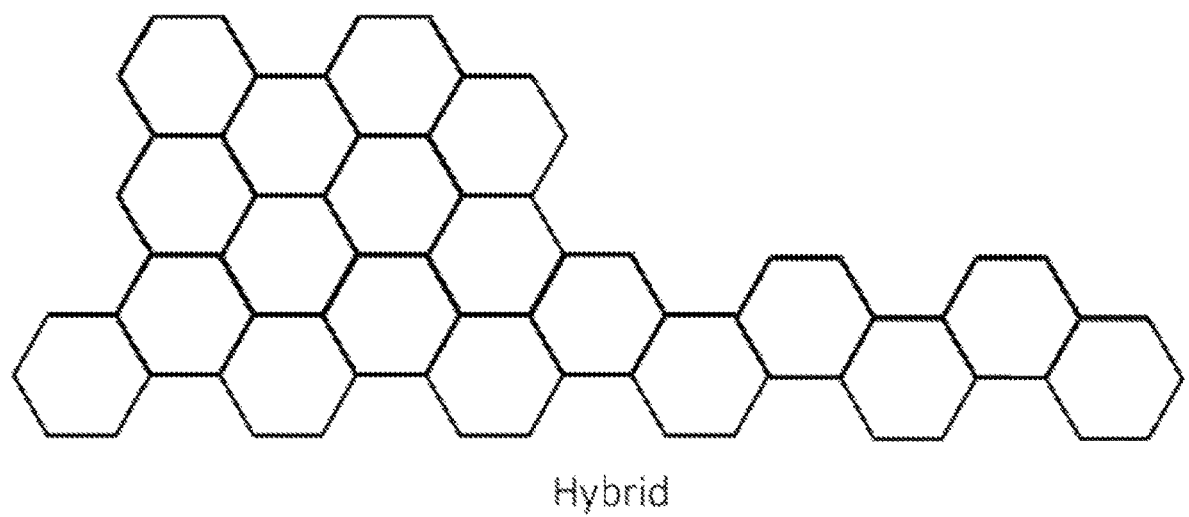
FIG. 18F depicts a hybrid rack, with a long row and a taller hive.

Referring to FIG. 16D, a rack 155 can have a main aeration pipe 152 which supplies aeration to barrel aeration pipes 154 and vessel aeration pipes 153. The aeration system allows for the contents of the vessel to attain optimal decomposition conditions.

Additional Description for Stacking and Racking Concept

Vessels in the rack may be cylindrical, or hexagonal, or they may be another shape. They may open in any of the ways mentioned in this document, or they may open in another way.

FIGS. 17A-17D show a forklift of other mechanical lifter placing vessels into a system or hive configuration, for example, by inserting a vessel into a rack. A body may be loaded into a racked vessel in any of the ways mentioned in this document, or it may be loaded another way. A cylindrical unit can be moved into or out of the system of hive in this manner.

The rack may accommodate material moving into the vessels.

Vessels may be opened and loaded when stacked in the rack or they may be removed from the rack and then opened and loaded.

Vessels may be aerated in the rack, or they may be removed to be aerated.

Vessels may be rotated in the rack, or they may be removed to be rotated.

A forklift or scissor lift or other lifting mechanism may be used to move a vessel into the rack, or there may be ramps leading up to the rack, or another means may be used to load the vessel into the rack.

The rack may rise upwards from the ground or it may be sunken into the ground.

Referring to FIGS. 18A-18F, the stacking of vessels, or racking, to create a variety of shapes that can accommodate a number of different environments. For example, the system can be long and low, or can be a tall stack, or a combination of these shapes.

Hexagonal Vessel Concept

Figure 19A:
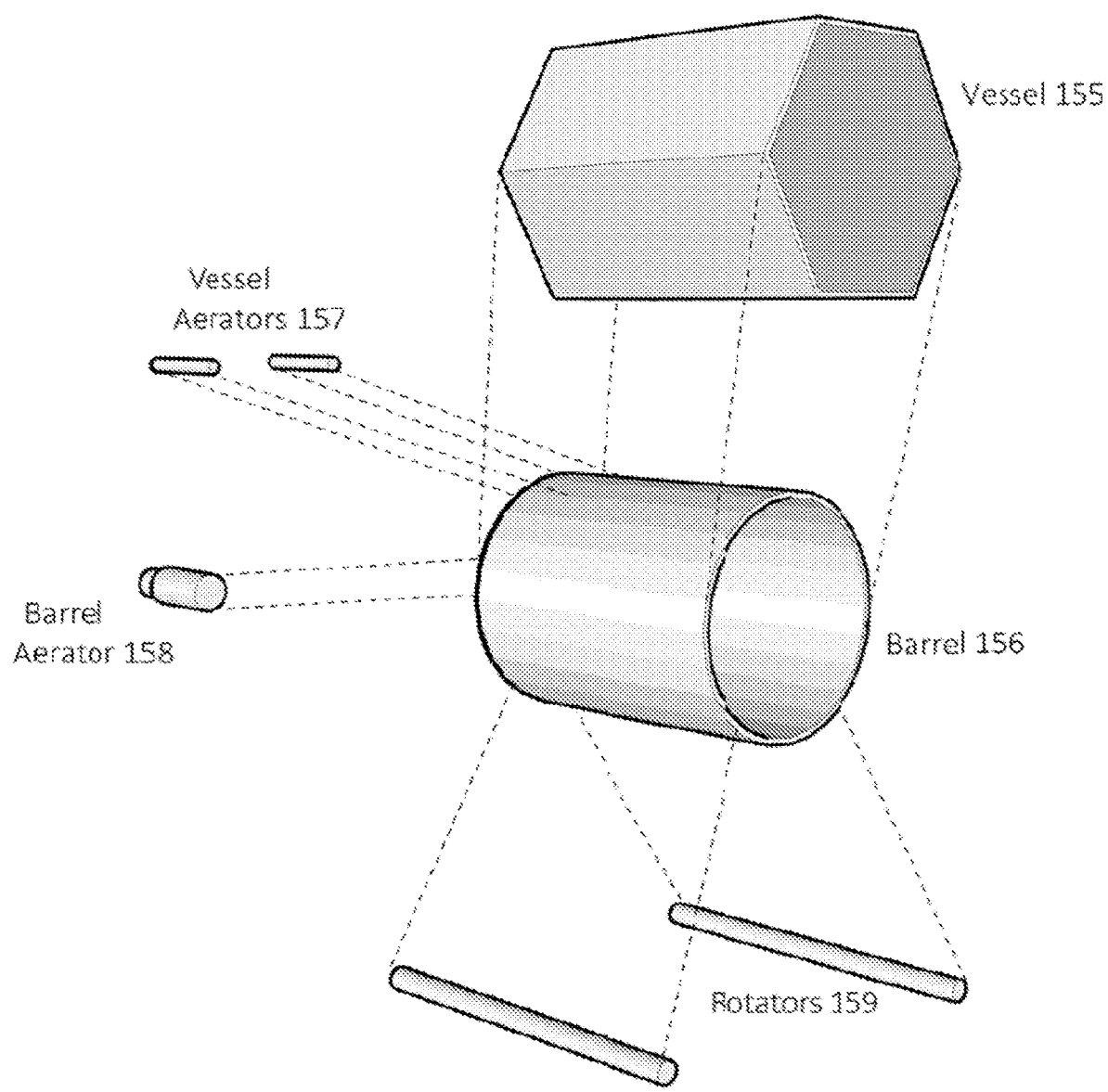
FIG. 19A depicts an exploded view of the hexagonal vessel, with cylindrical barrel, hexagonal vessel, vessel aerators, barrel aerators, and rotators.

Referring to FIG. 19A, a hexagonal vessel 155 can cover a barrel 156. A vessel 155 can be aerated by vessel aerators 157, and a barrel 156 can be aerated by a barrel aerator 158. Inside of a vessel 155, a barrel 156 may be rotated by rotators 159.

Figure 19B:
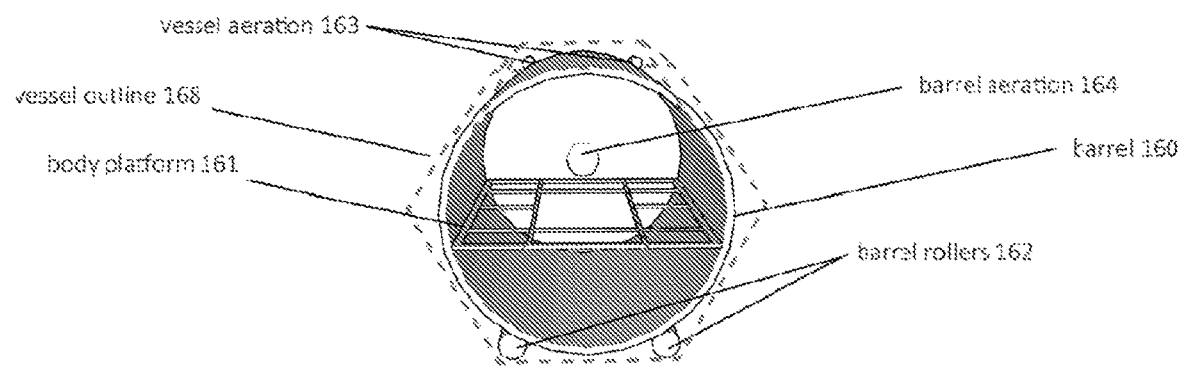
FIG. 19B depicts the inner barrel with body platform.

Referring to FIG. 19B, a barrel 160 can have a body platform 161 inside of it. A barrel 160 can be rotated by barrel rollers 162, and aerated by barrel aeration 164. A barrel 160 can be inside of a vessel, shown here by a vessel outline 168. A vessel can be aerated by vessel aeration 163.

Figure 19C:
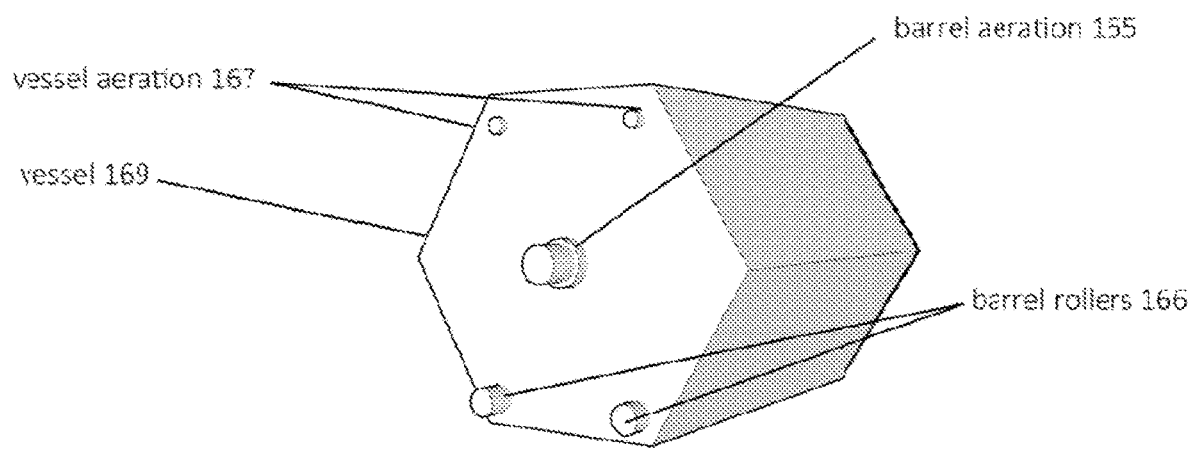
FIG. 19C depicts the outer vessel.
Figure 20D:
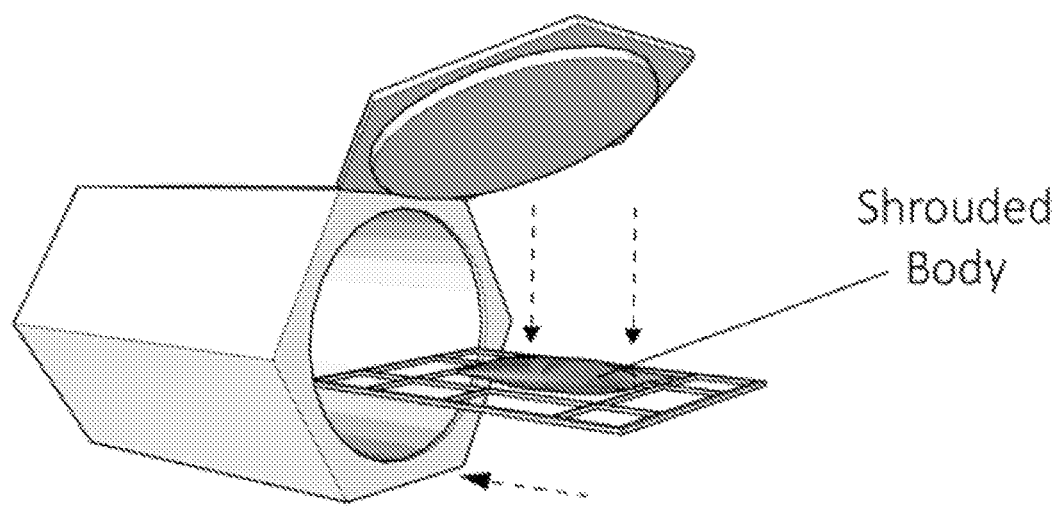
FIG. 20D depicts a shrouded body being laid onto the body tray, which then slides back into the vessel.
Figure 20E:
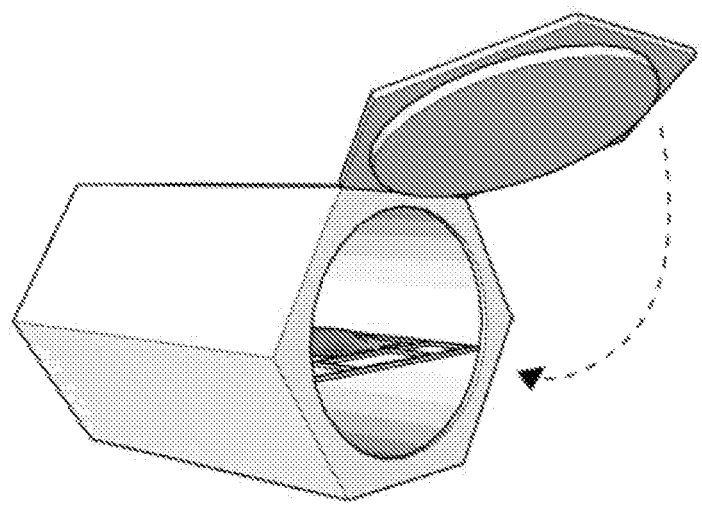
FIG. 20E depicts the vessel hatch closing.
Figure 20F:
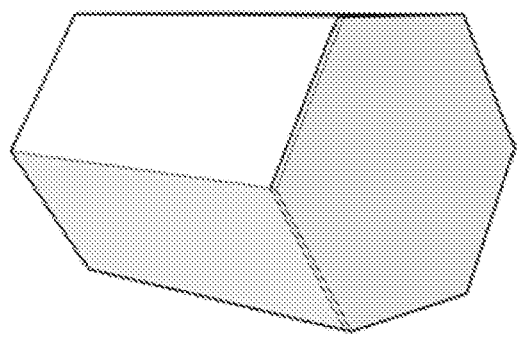
FIG. 20F depicts the closed vessel.

Referring to FIG. 19C, a vessel 169 is shown from the back. A vessel 169 can be aerated by vessel aeration 167. A barrel (not shown) can be inside of a vessel 169, and aerated by barrel aeration 165 and rotated by barrel rollers 166.

Referring to FIGS. 20A-20F, a vessel 170 can open to reveal a body tray 171. A body tray 171 can slide out so that a body that is shrouded or otherwise clothed or unclothed may be put on it. A body tray 171 can then slide back into a vessel 170.

Additional Description for Hexagonal Vessel Concept

The hexagonal vessel may have a circular "barrel" inside of it, or it may not.

The vessel may be aerated, or only the barrel may be aerated.

The hexagonal vessel may have a body platform or other type of body support, or it may not.

The hexagonal vessel may be loaded from the end, or it may be loaded from the top, or it may be loaded from the side.

Extracting Materials Concept

Figure 21A:
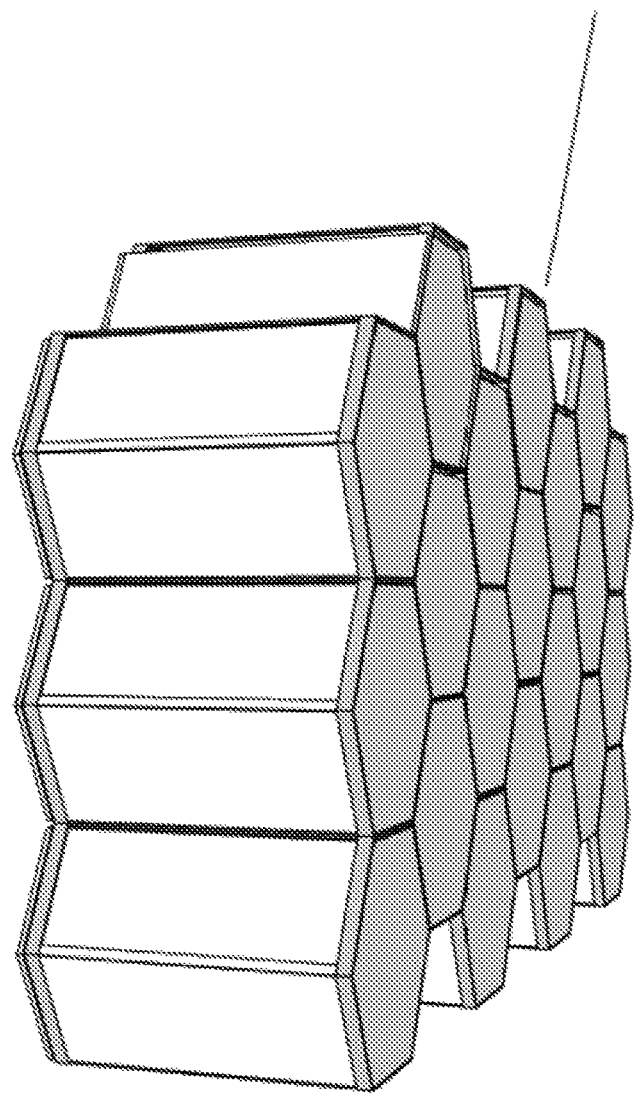
FIG. 21A depicts a rack of vessels.
Figure 21B:
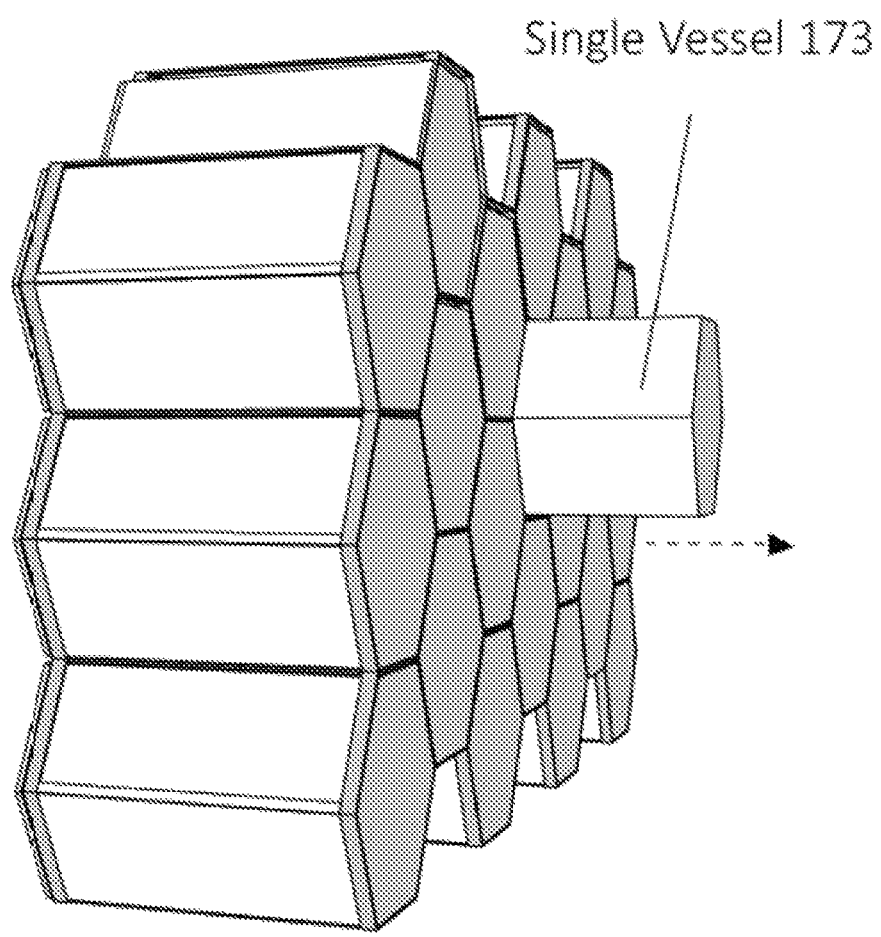
FIG. 21B depicts a single vessel pulled partway out of the rack.
Figure 21C:
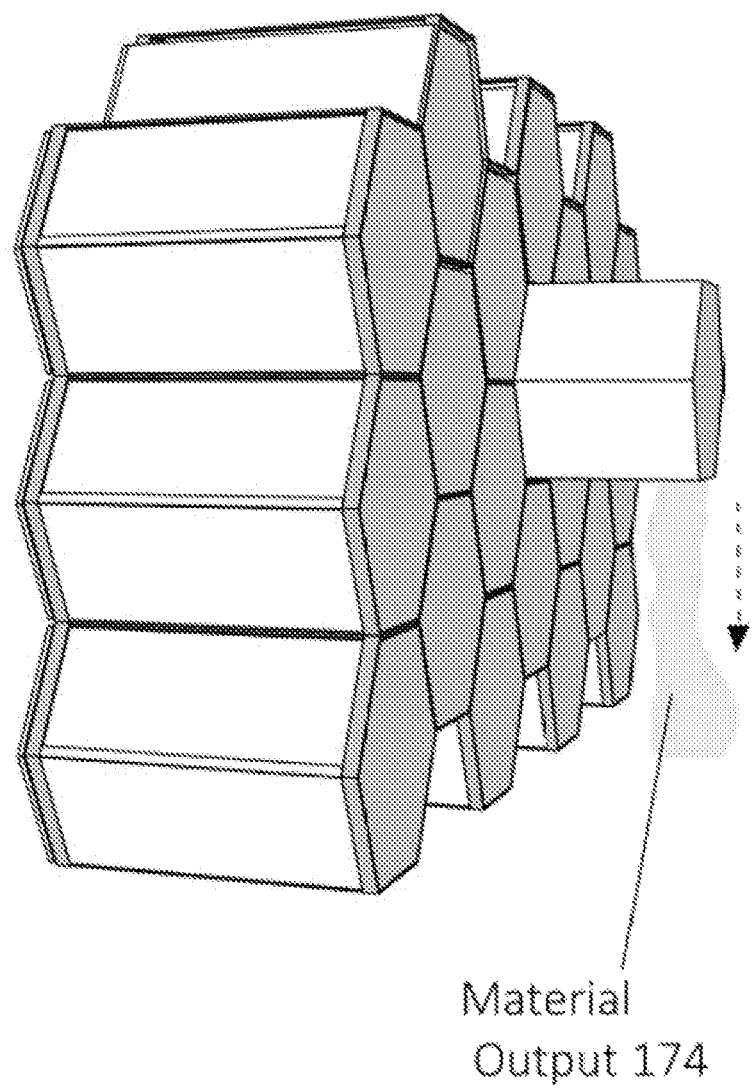
FIG. 21C depicts the material flowing out of the bottom of the vessel.

Referring to FIGS. 21A-21C, a single vessel 173 can pull partway out of a rack of vessels 172. Material can flow from a single vessel 173 via a material output 174.

Referring to FIG. 22A, a feedstock input 176 can be at the top of a vessel 175. A vessel 175 can then rotate so that a feedstock input 176 becomes a material output 177.

Referring to FIG. 22B, a feedstock input 179 can be on the side of a vessel 178. A vessel 178 can then rotate so that a feedstock input 179 becomes a material output 180.

Figure 22C:
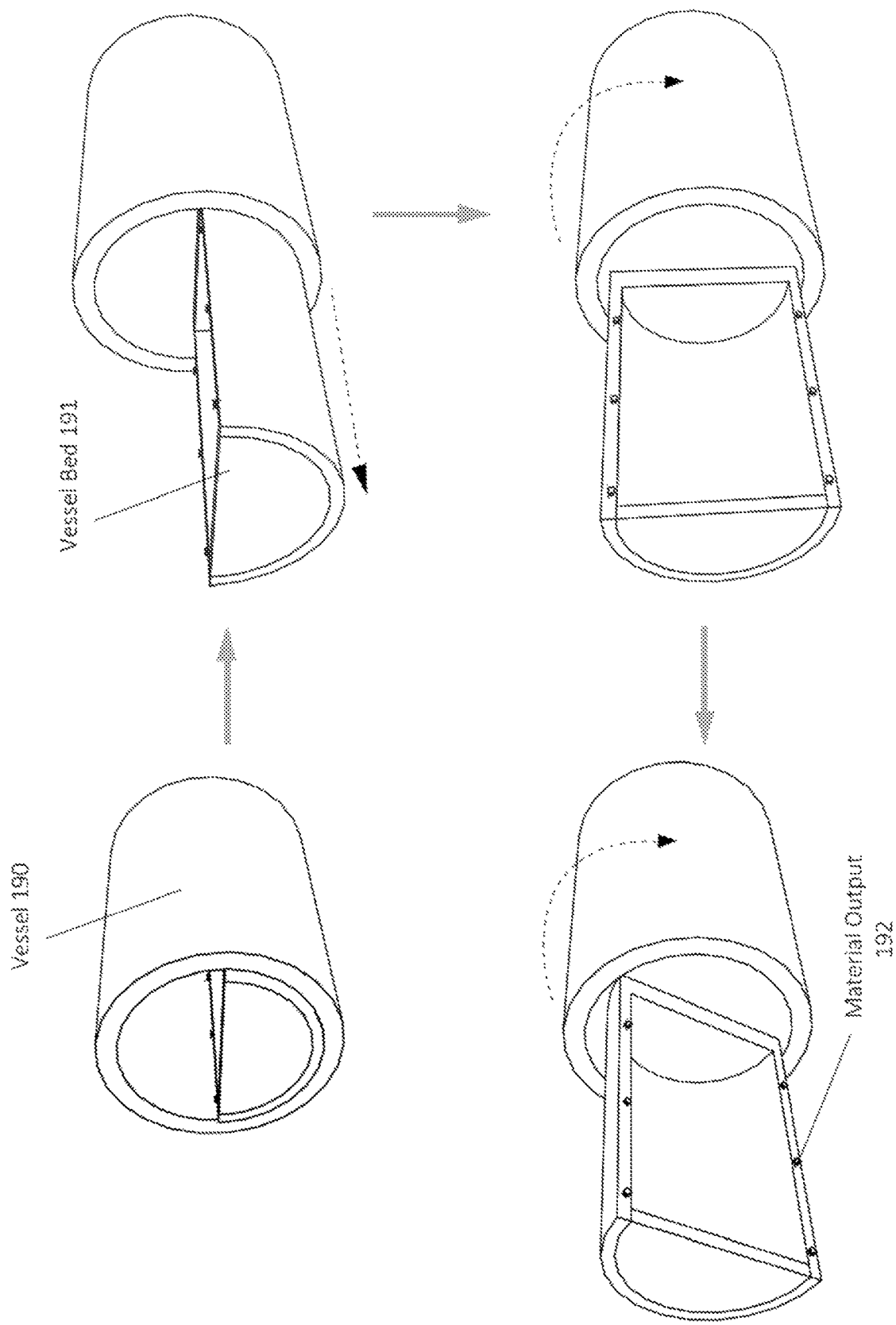
FIG. 22C depicts a vessel with a vessel "bed". The bed is pulled out and then rotated for material output.

Referring to FIG. 22C, a vessel bed 191 can slide out of a vessel 190. Either a vessel 190 can rotate or just a vessel bed 191 can rotate, so that a vessel bed 191 becomes a material output 192.

Figure 22D:
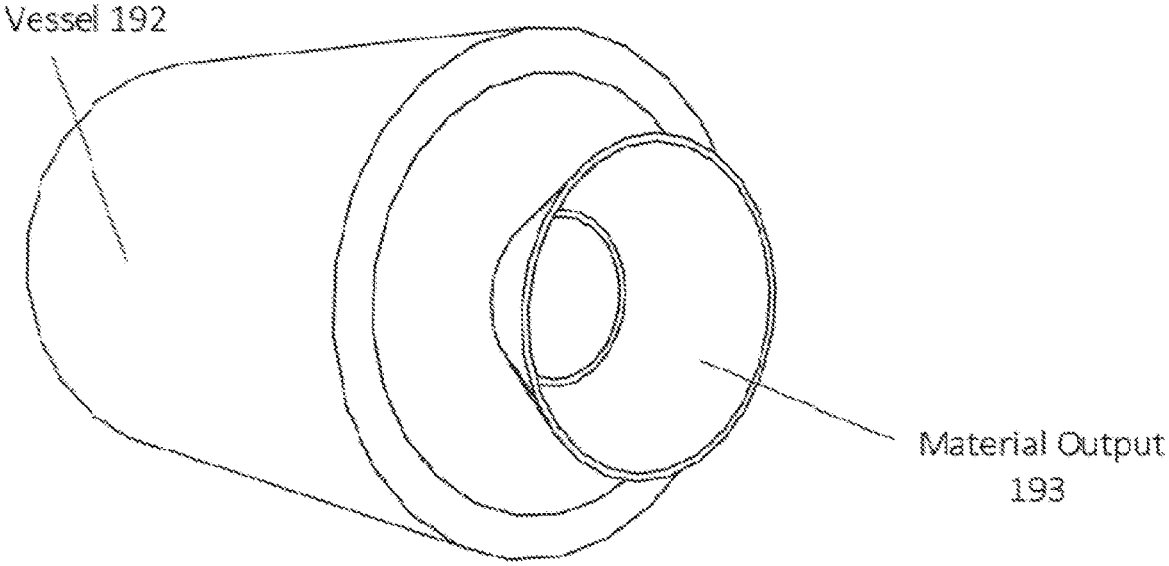
FIG. 22D depicts a cylindrical vessel with cone shaped material output system.
Figure 22E:
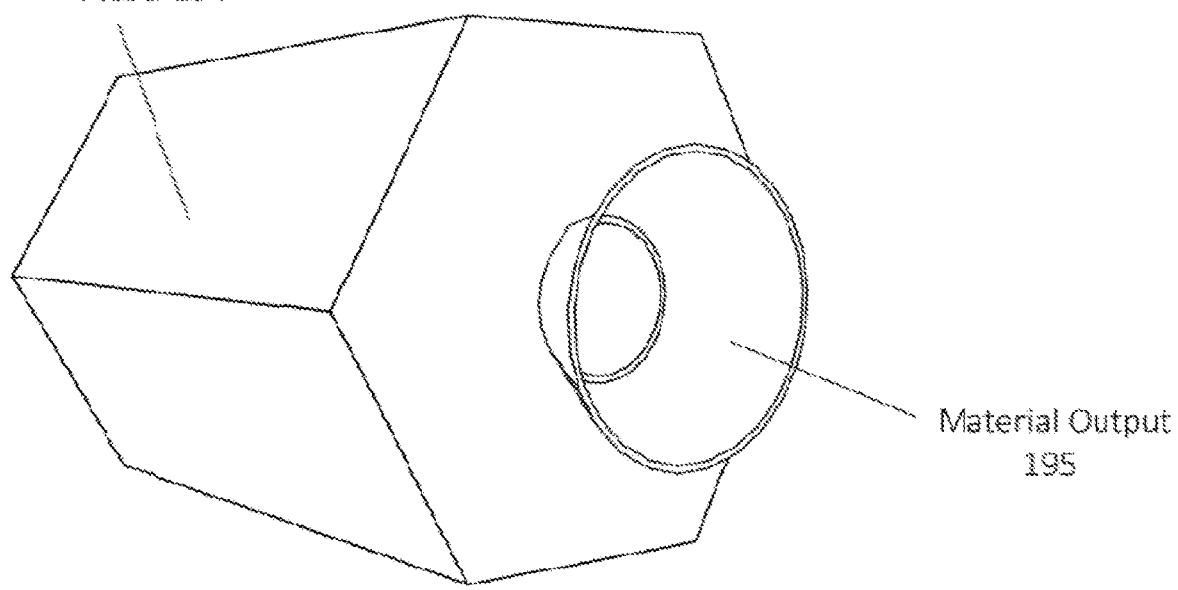
FIG. 22E depicts a hexagonal vessel with cone shaped material output system.

Referring to FIGS. 22D and 22E, a vessel 192 or a vessel 194 may have a material output 193 or material output 193.

Additional Description for Extracting Material Concept

Material may be extracted manually or mechanically.

Material may be screened for non-organics before it is extracted from the vessel or after.

Material may be extracted when it has fully decomposed, or it may be extracted some time before full decomposition.

Material may be extracted in any method with a cylindrical vessel or a hexagonal vessel.

Figure 23A:
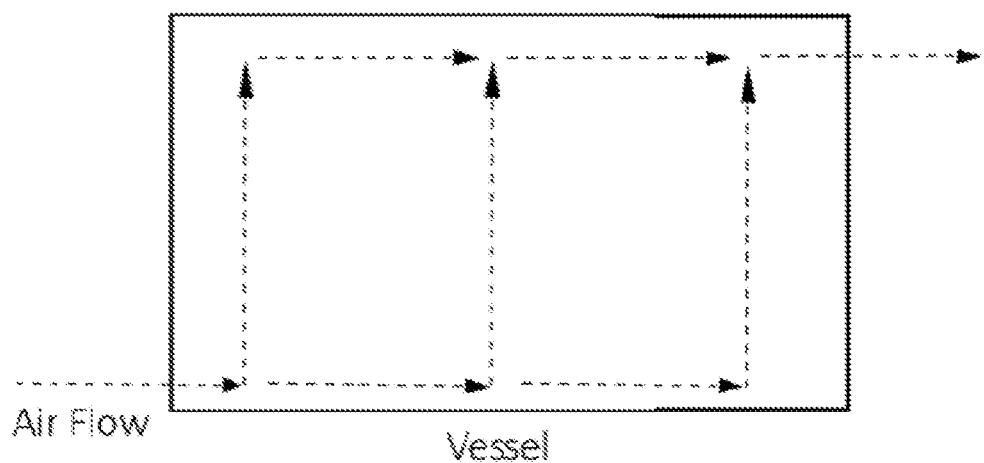
FIG. 23A depicts a flow diagram showing the flow of air through a vessel.
Figure 23B:
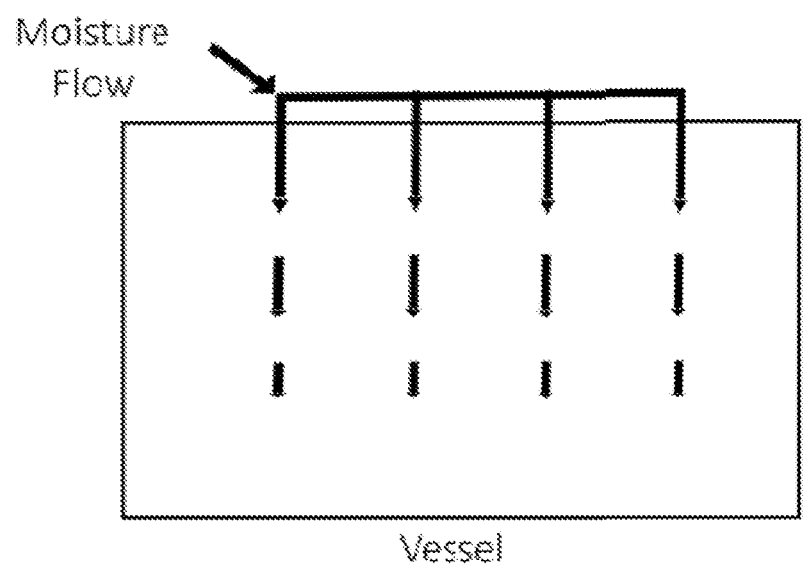
FIG. 23B depicts a flow diagram showing the flow of moisture through a vessel.
Figure 23C:
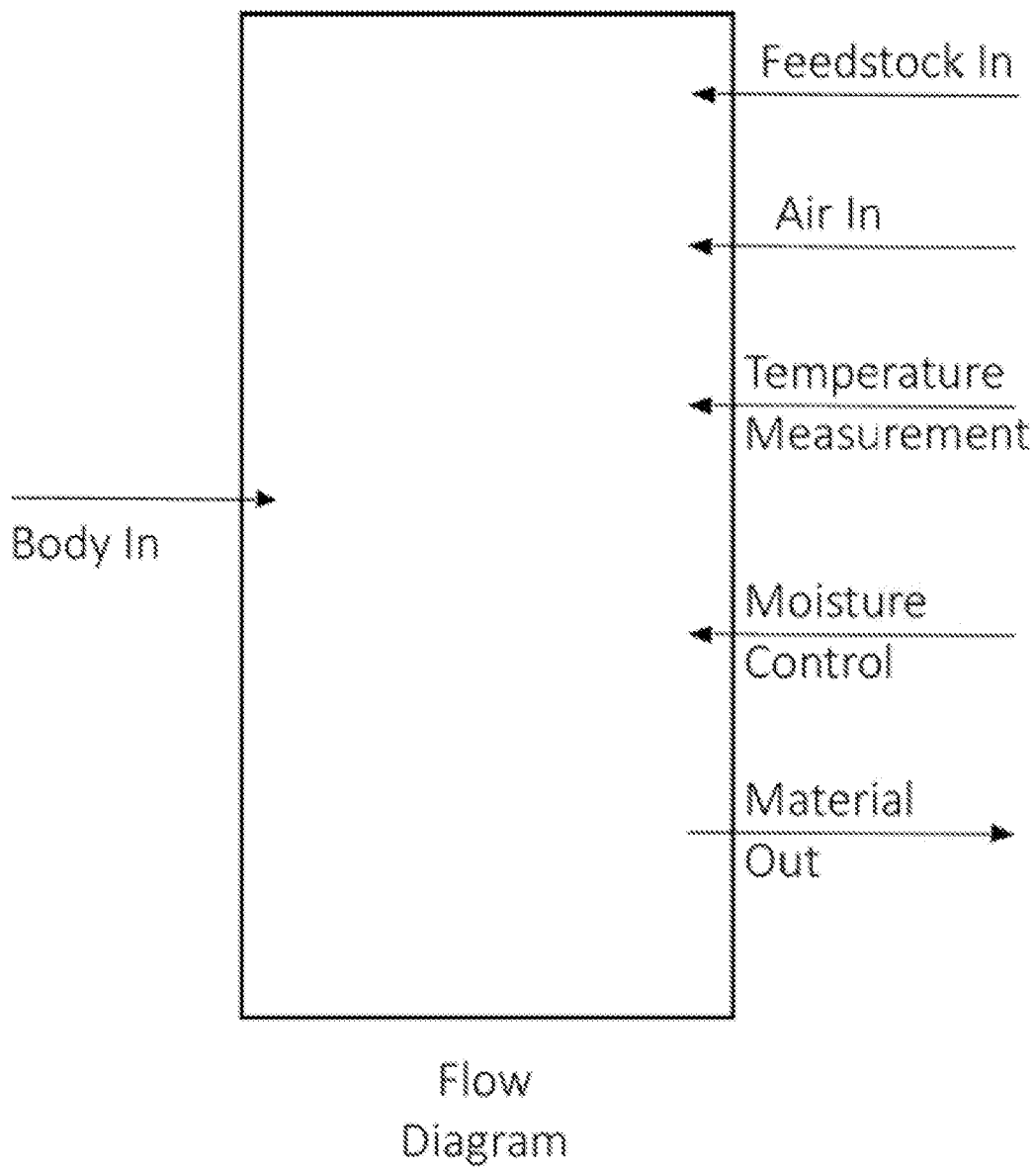
FIG. 23C depicts the front side of a vessel or a rack of vessels. It shows that a body is loaded from the front side. It shows air and moisture and feedstock being added from the back side. It also shows temperature measurement.

Referring to FIG. 23A, airflow can be directed through the vessel from a front end to a back end of the vessel, so that all of the contents of the vessel receive contact with the air. Referring to FIG. 23B, a moisture flow system can introduce, as needed, water or other sources of moisture into the vessel, for example, from the edges or sides of the vessel. Referring to FIG. 23C, a flow diagram indicates the parameters that can be controlled to optimize the recomposition process. For example, a body is added to the vessel, together with feedstock that aids with the decomposition process. Air can be added in a controlled manner, together with moisture, and the temperature monitored to achieve and maintain composting conditions. When the process is complete, the final composted material can be retrieved from the vessel.

Additional Concepts

Figure 24A:
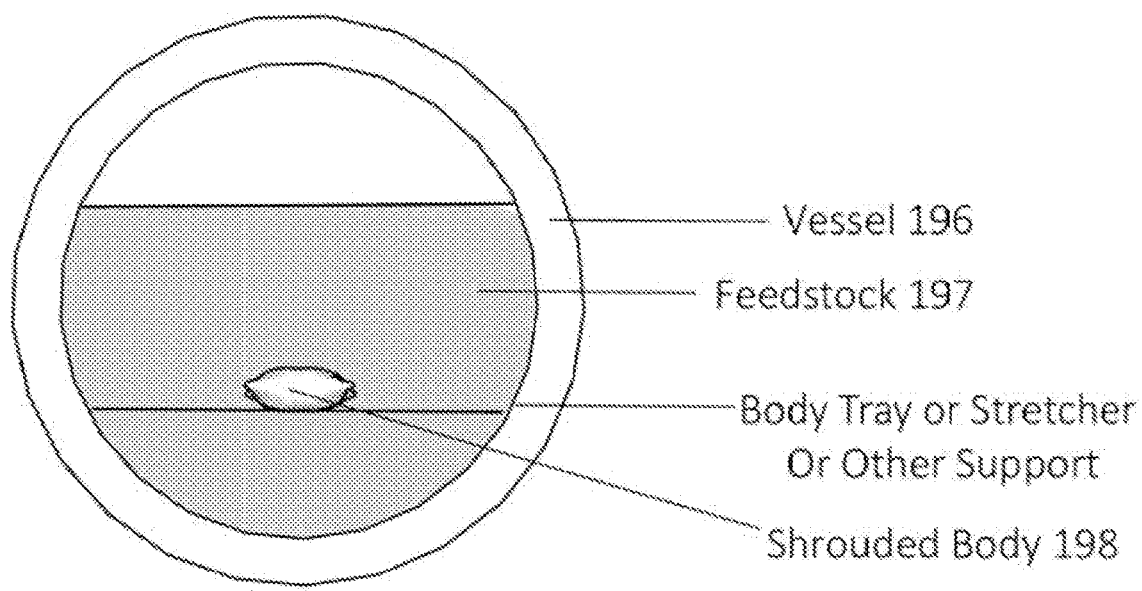
FIG. 24A depicts a section view of a vessel and shows that placement of a body tray may not be in the center of the vessel.
Figure 24B:
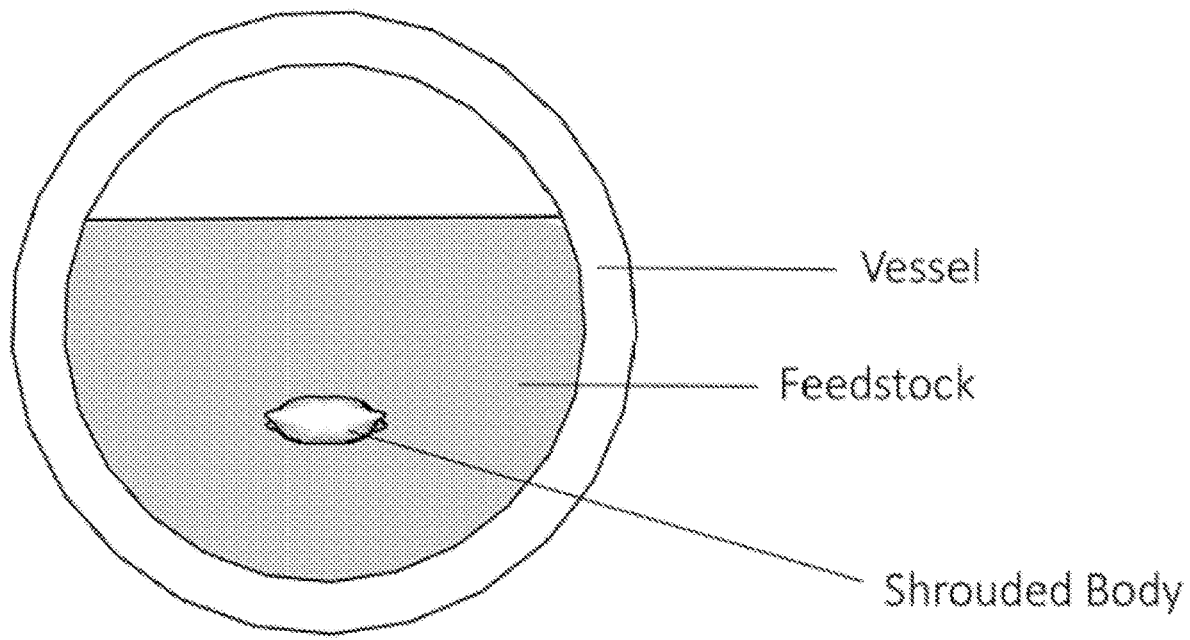
FIG. 24B depicts a section view of a vessel and shows that placement of a body without a body tray may not be in the center of the vessel.
Figure 24C:
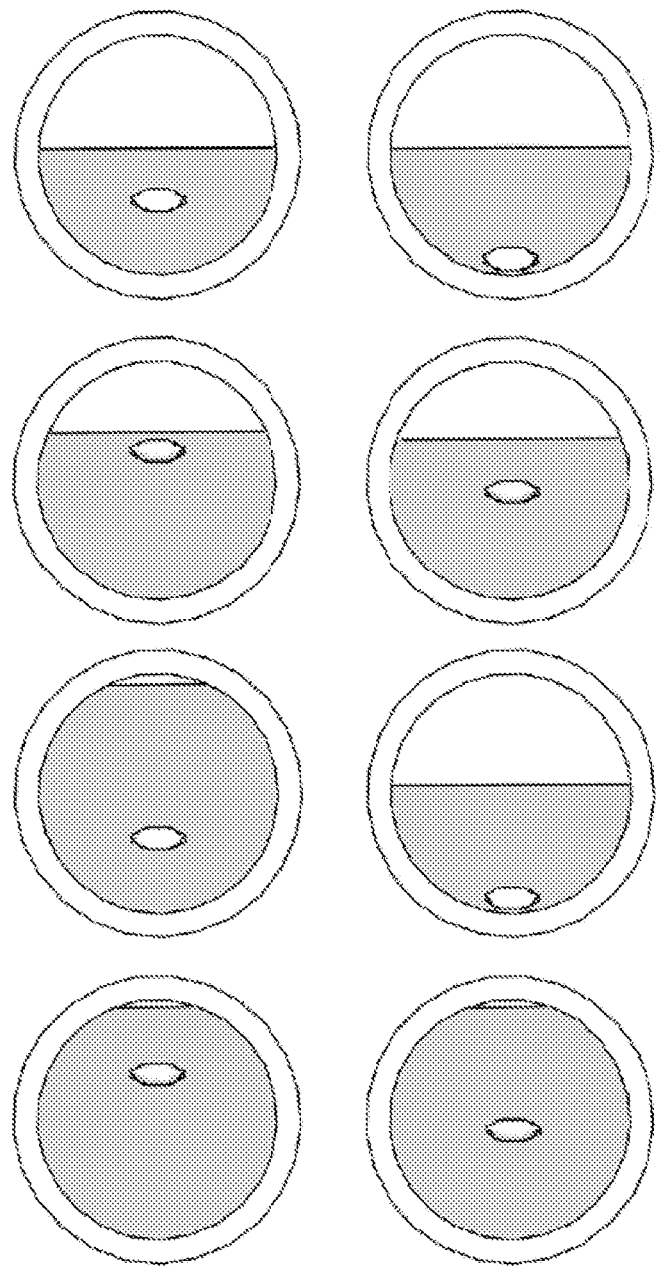
FIG. 24C depicts some of the amounts that a vessel may be filled with feedstock, and it depicts some of the placements of a body within a vessel. There are other placements of the body in a vessel, and other amounts that a vessel may be filled with feedstock.

Referring to FIGS. 24A-24C, a vessel 196 can contain feedstock 197 and a shrouded or otherwise clothed or unclothed body 198 in infinite combinations and placements.

Figure 24D:
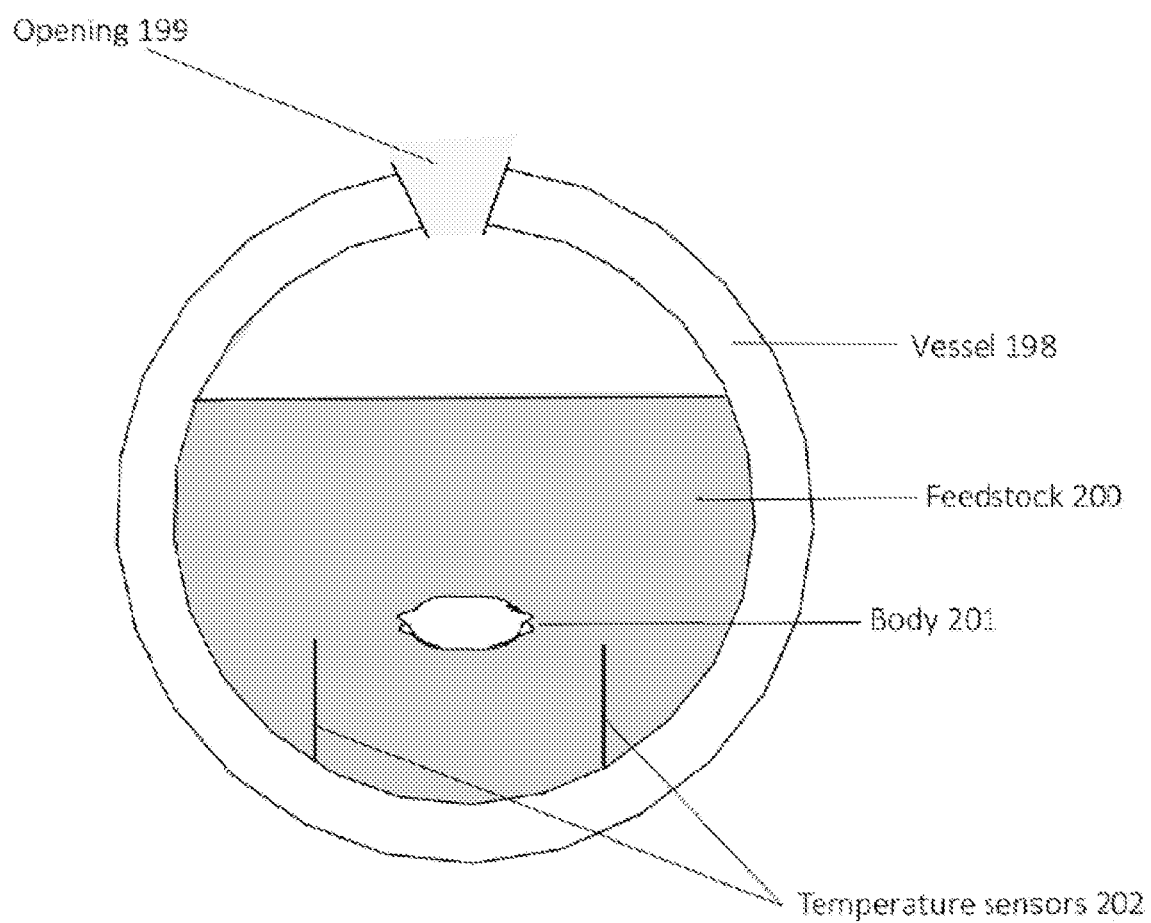
FIG. 24D depicts a vessel with an opening to allow for the addition of more feedstock at some point during the process. It also depicts temperature sensors.

Referring to FIG. 24D, a vessel 198 can have an opening 199 and can have temperature sensors 202. A vessel 198 can contain a body 201 and feedstock 200. Over a span of time, a body 201 and feedstock 200 will decompose (i.e. "recompose") and transform into soil amendment.

Referring to FIG. 25A, material created by a vessel 203 can be screened/sorted by a screening/sorting system 204 within it.

Referring to FIG. 25B, material created by a vessel 205 can be screened/sorted with a separate screening/sorting system 206.

Additional Description for Additional Concepts

Feedstock material may be added to the vessel at any point during the 1-90 day process.

Moisture will be controlled within the vessel. It may be controlled by adding water to incoming air flow.

Temperatures will be recorded in the vessel. They may be recorded manually or by temperature sensors that are wireless or wired.

Temperature sensors may be embedded into the vessel, or floating in the feedstock, or woven into the shroud, or incorporated into a body tray or another body support.

The heat produced by the process of recomposing may be used in various ways. The heat may be used to warm a wall or another symbolic entity, to warm a building, to warm the floors of a building, or to pre-heat the process inside the vessel, or it may be used for other applications.

Material created by the vessel will be screened and/or sorted for non-organic material either mechanically or manually or with a combination of the two.

The screened/sorted material may be given to families of the deceased or it may not be given back. It may be used to grow memorial gardens or groves of trees, or it may be given to conservation land or municipal parks or gardens.

Figures 26A, 26B:
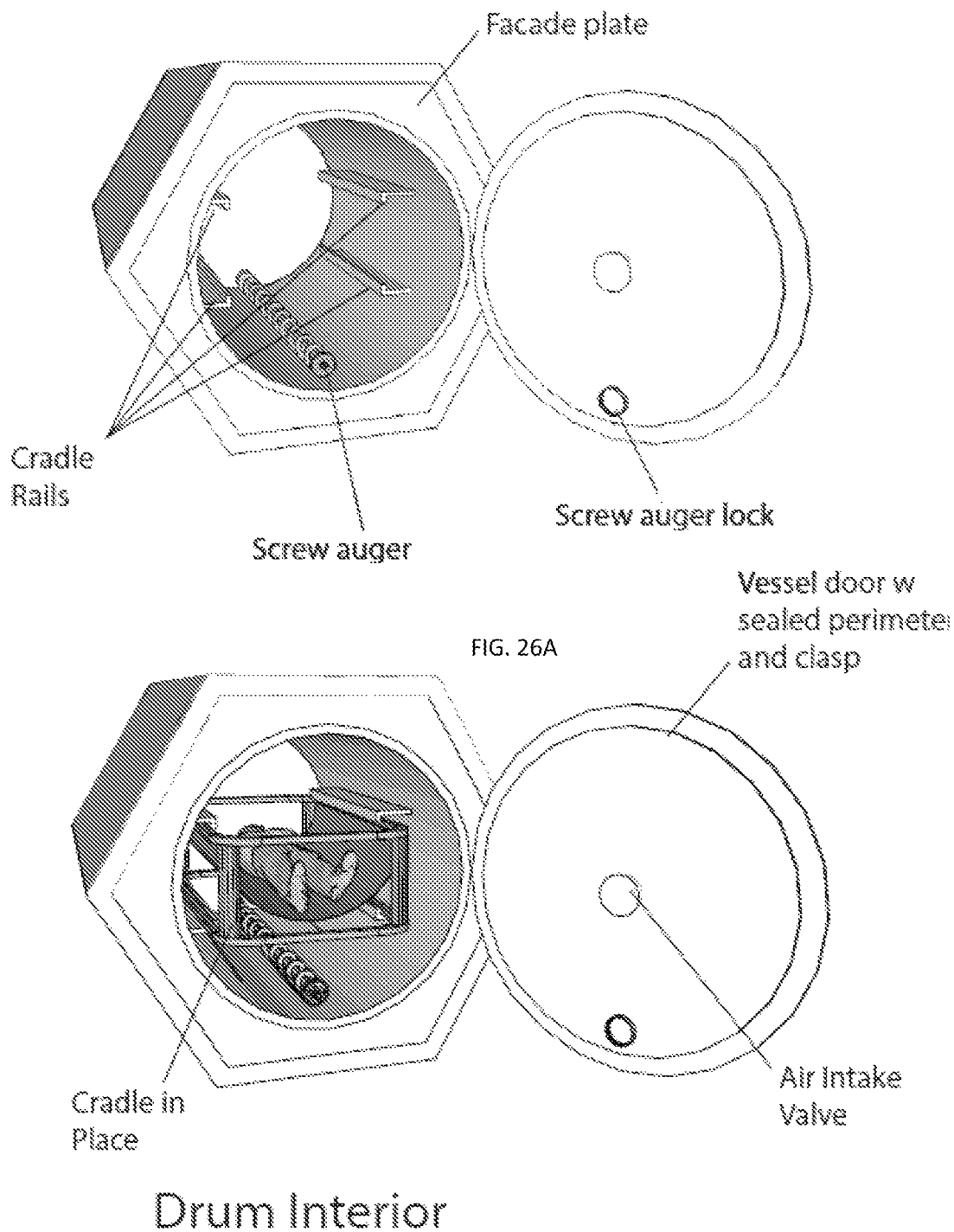
FIGS. 26A-26E depict views of a vessel.

Referring to FIG. 26A, the vessel can include a façade plate. The internal portion of the vessel can include a screw auger. The door can include a screw auger lock for holding the screw auger in place. The door can form a seal with the barrel when closed. The door can include an air intake valve to permit air to access the vessel in a controlled manner to facilitate decomposition of the contents. The screw auger can be used to provide additional mechanical forces to the content of the vessel to break up solid materials to expedite the composting process. For example, the auger can break up bones more rapidly, increasing their surface area and accelerating decomposition. The vessel can also include cradle rails that hold the cradle in place once inserted into the vessel, in particular, the drum, as shown in FIG. 26B.

Figure 26C:
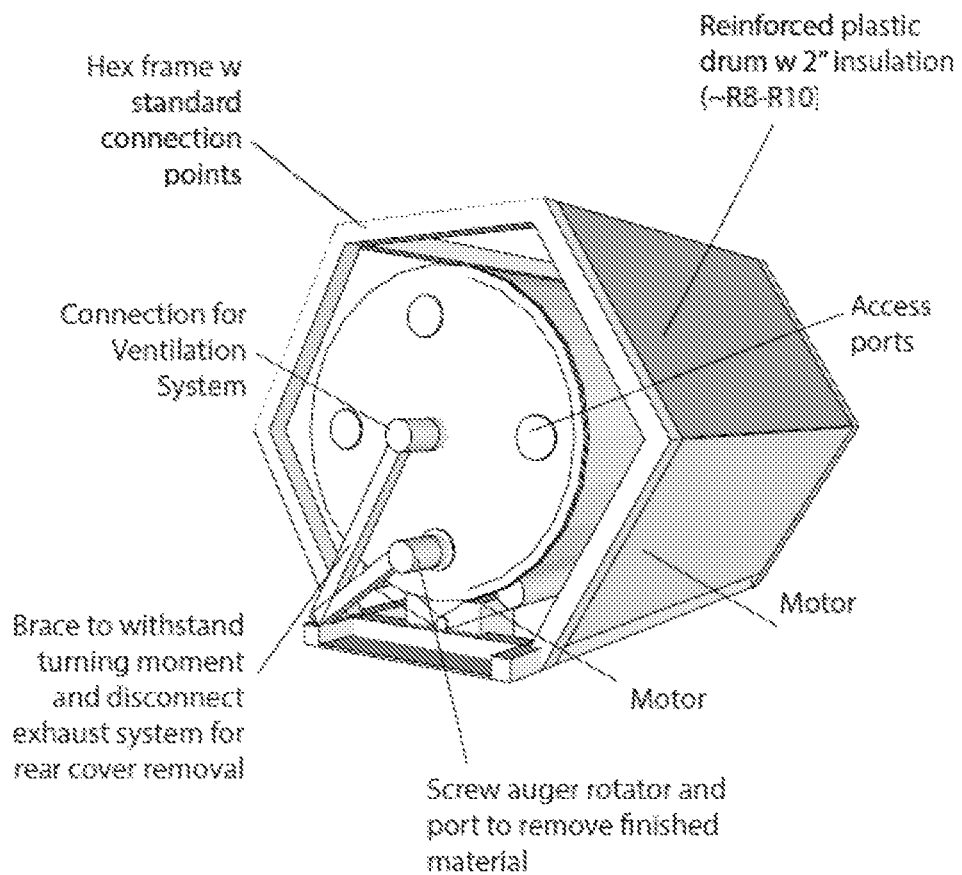

Referring to FIG. 26C, the back side of the vessel shows access for a screw auger rotator, which can also serve as a port to remove finished material from the vessel. The back portion of the vessel also includes a brace that can withstand a turning moment of the rotating drum or barrel. The brace can include a disconnect for a gas exhaust system. Motors in the hexagonal frame can rotate the barrel at a controlled rate. The back of the vessel can also include access ports. The vessel can be insulated to manage the thermal conditions of the vessel.

Figure 26D:
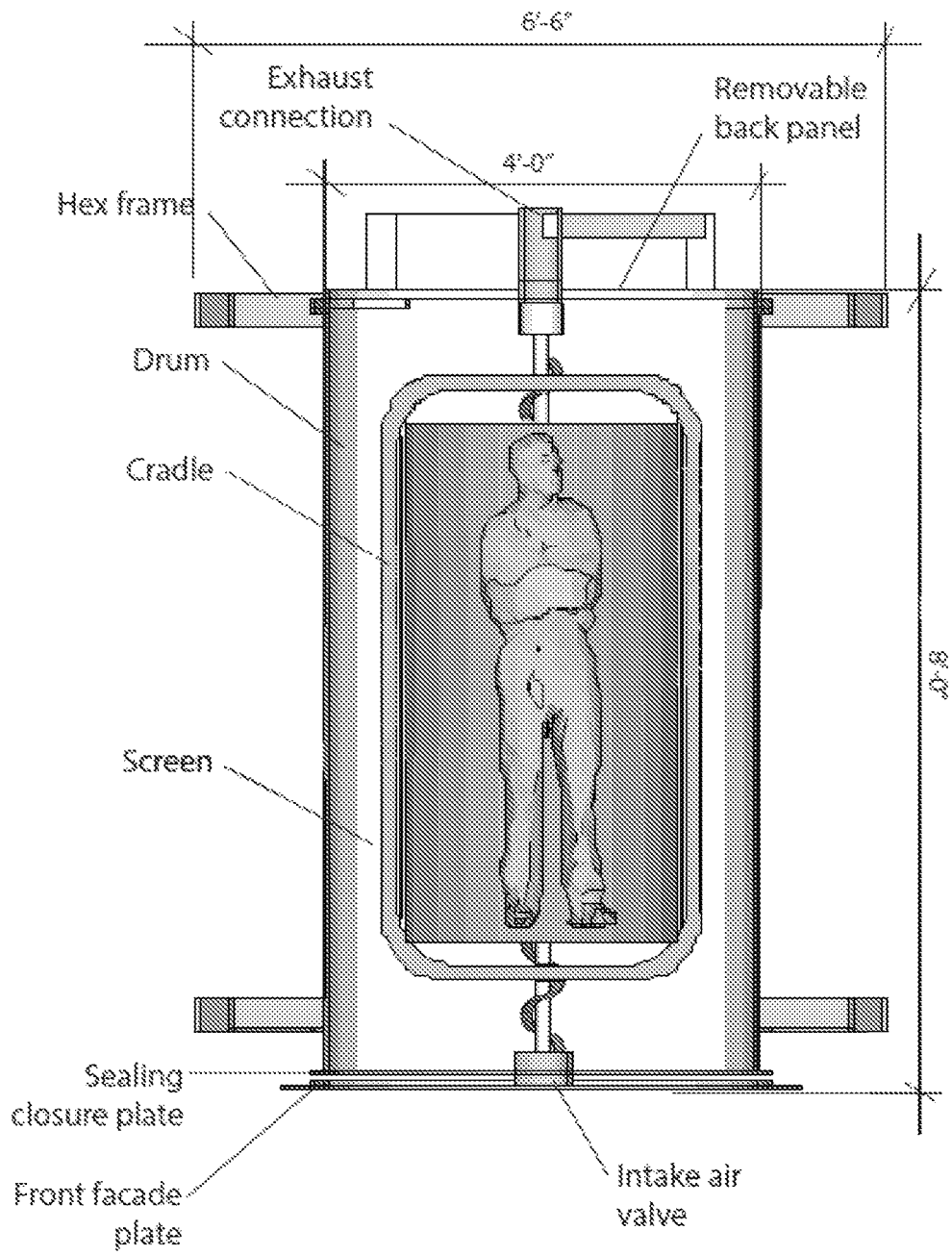

Referring to FIG. 26D, a cut-away view of the vessel depicts the drum within the hexagonal frame. A cradle is held within the drum. The drum content is confined by sealing closure plate adjacent to a front façade plate and a removable back panel. The back panel includes an exhaust connection. The sealing closure plate includes an intake air valve.

Figure 26E:
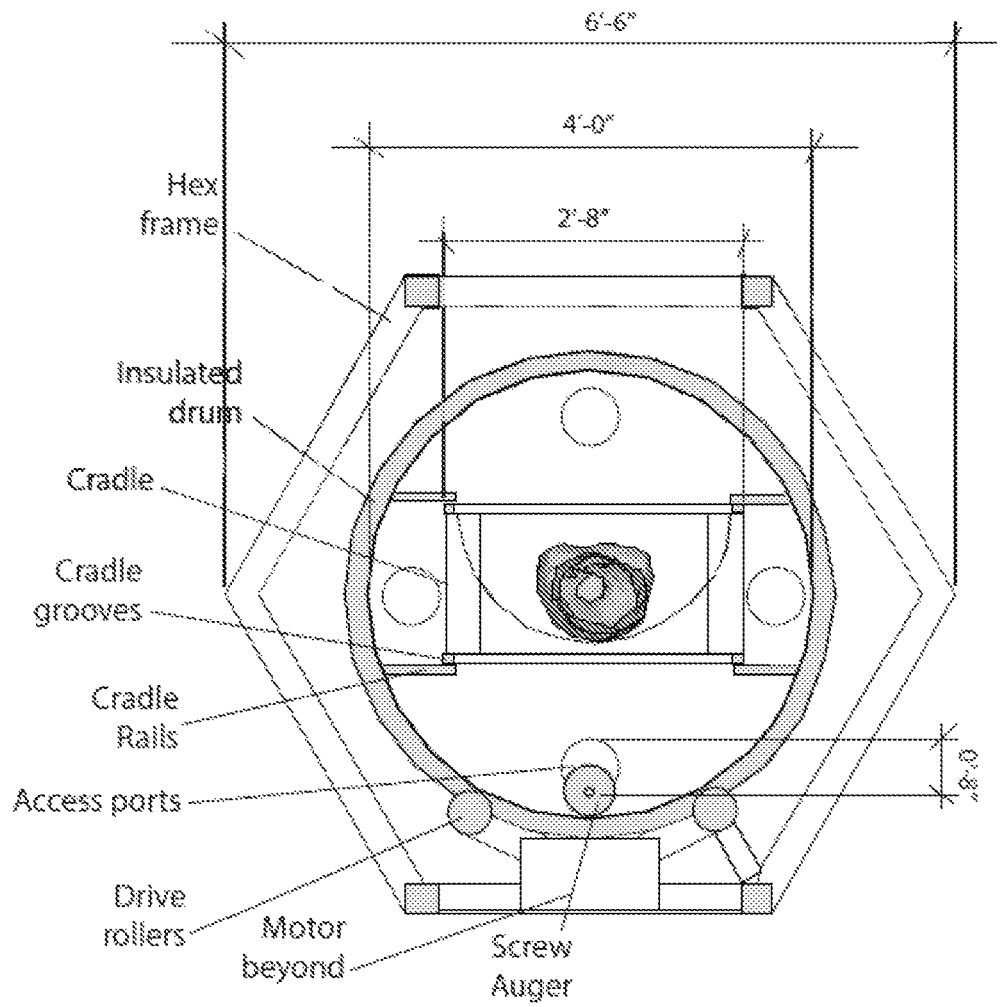

Referring to FIG. 26E, drive rollers can rotate the drum within the hexagonal frame. Cradle rails hold the cradle within grooves in the insulated drum. Screw auger is located near the bottom of the drum.

Figure 27A:
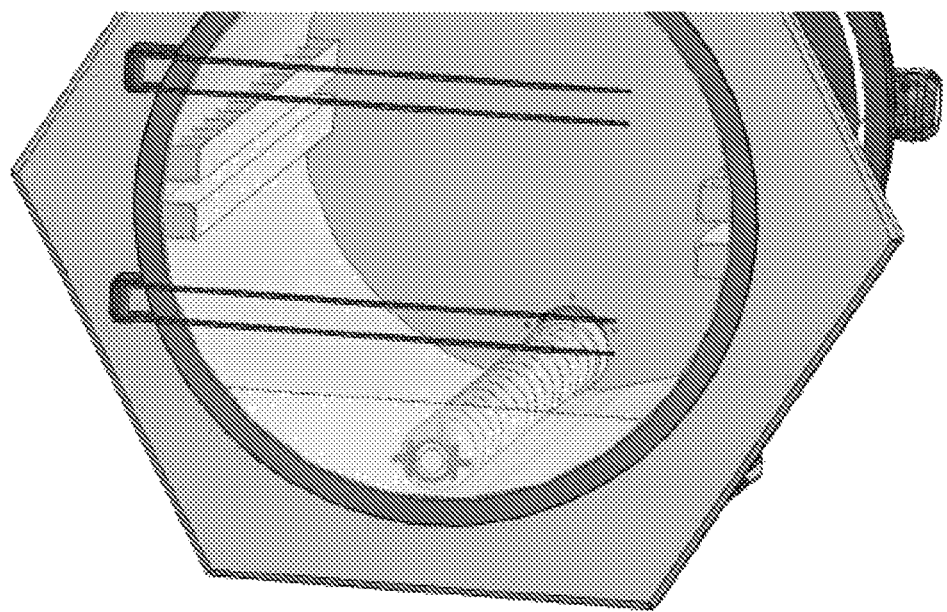
Figure 27B:
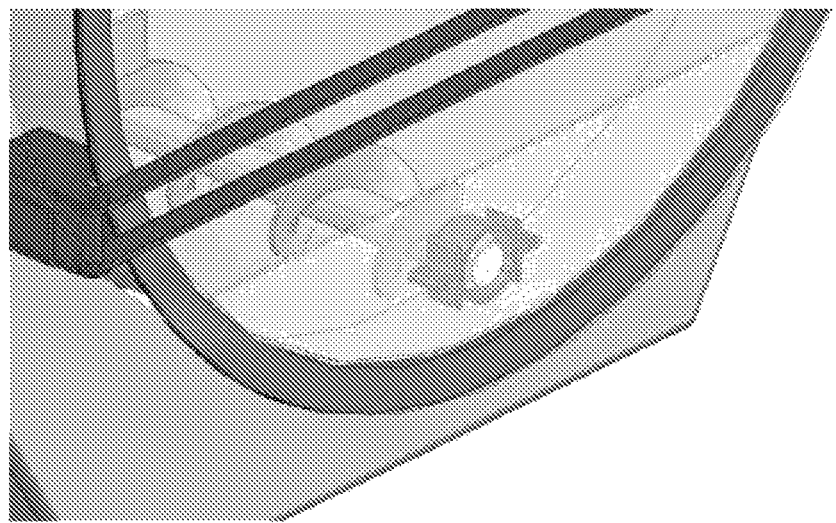
Figure 27C:
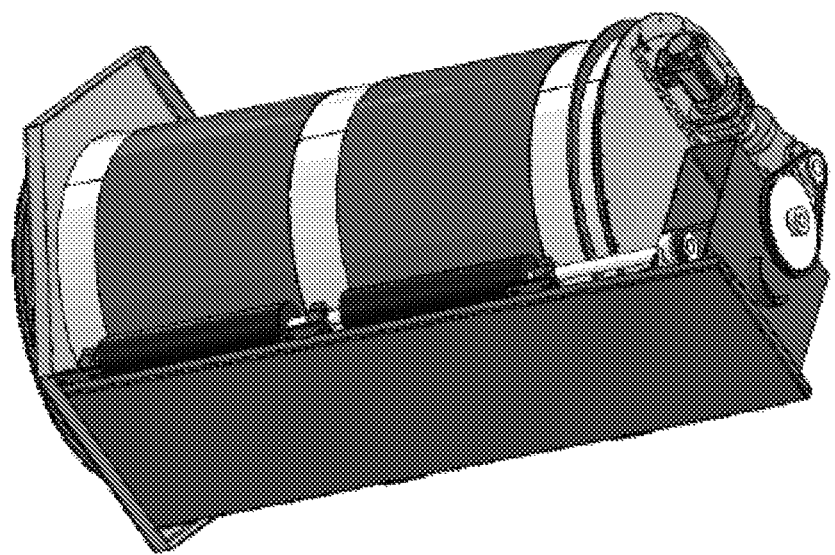

Referring to FIG. 27A, front view of the vessel shows a door latch, a bone grinding auger, and cradle (or body tray) rails within the drum. Referring to FIG. 27B, an auger stabilizer can be present to hold the auger in position within the drum. Referring to FIG. 27C, a drip pan can be present under the drum to handle any liquid waste.

Figure 27D:
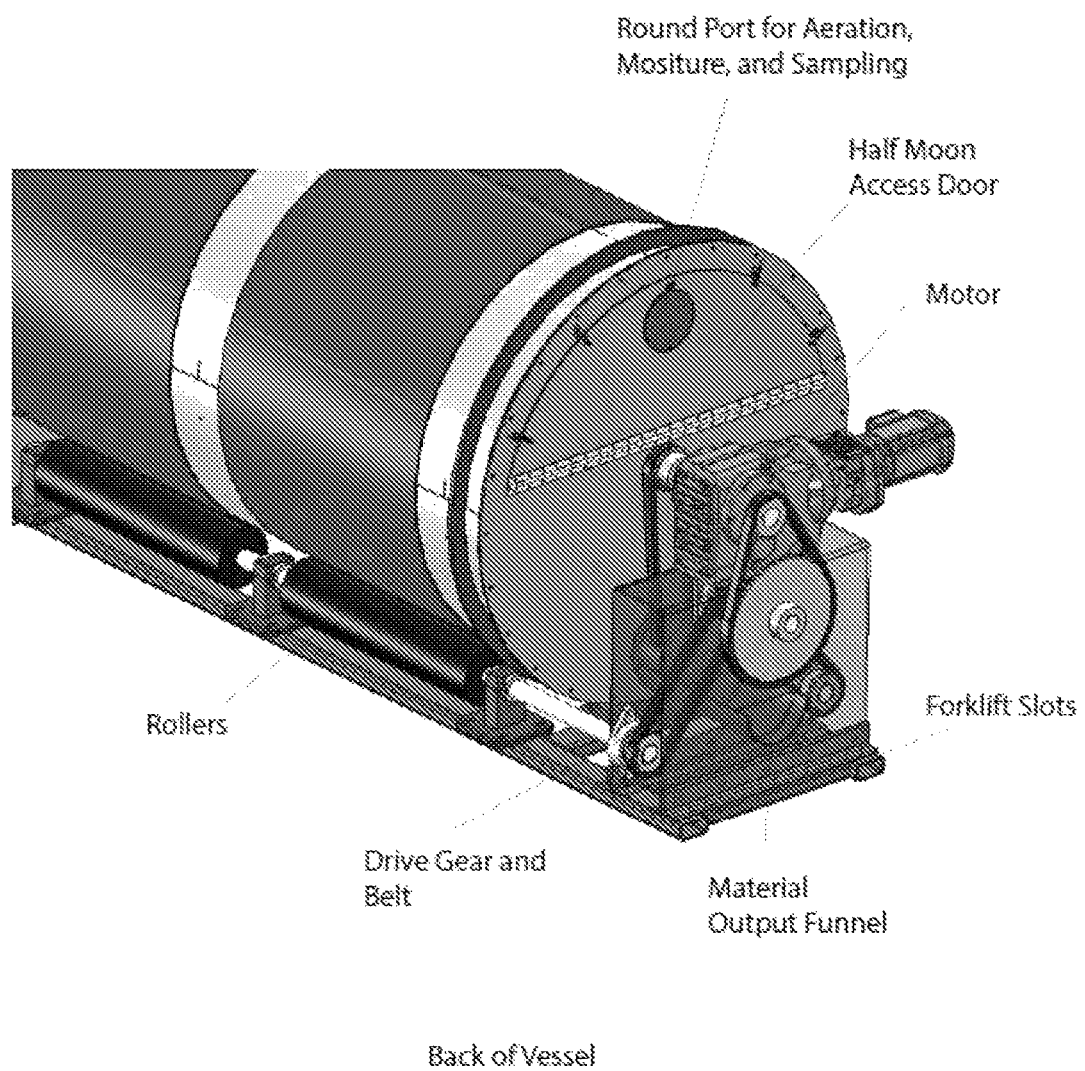
Figure 27E:
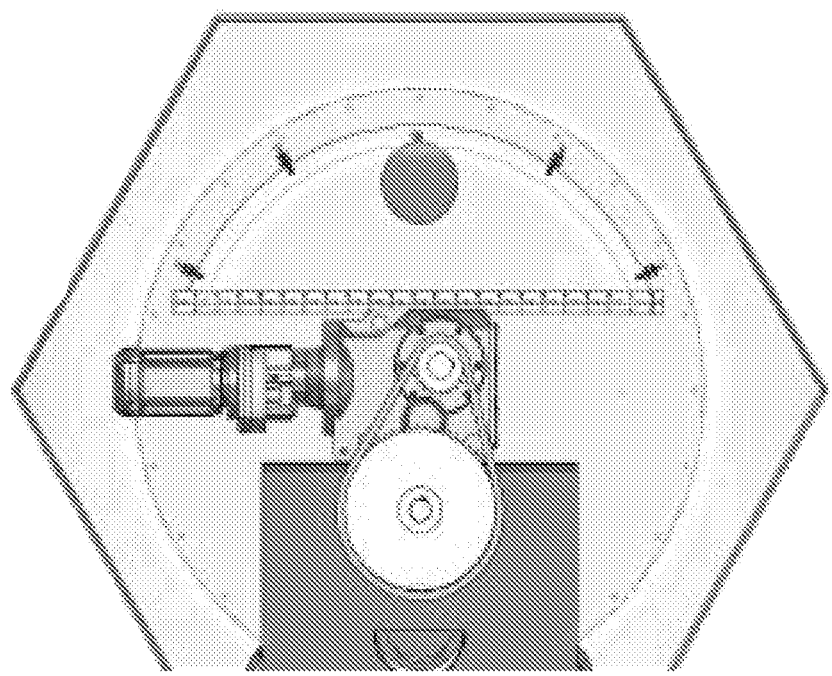
Figure 27F:
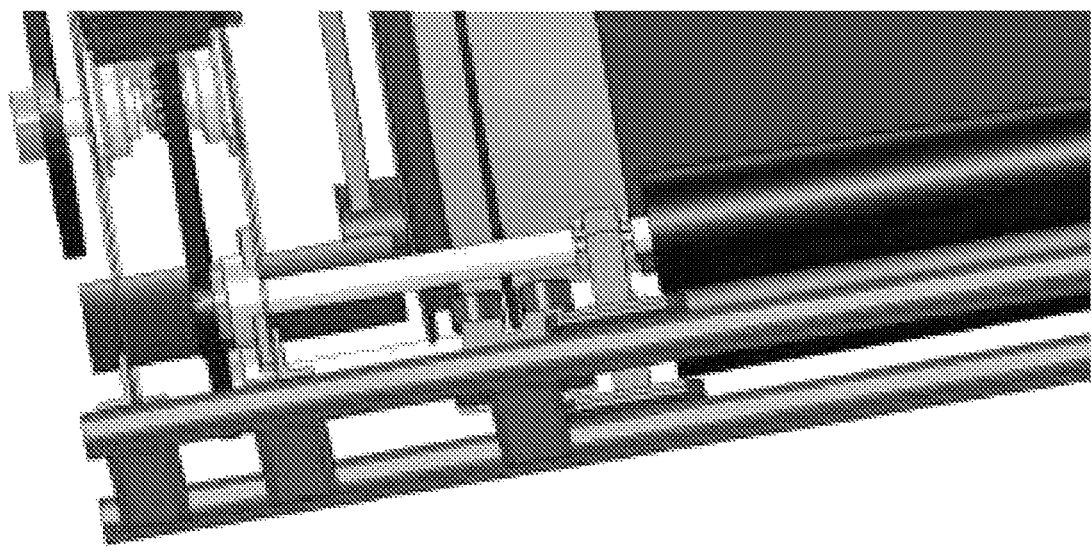
Figure 27G:
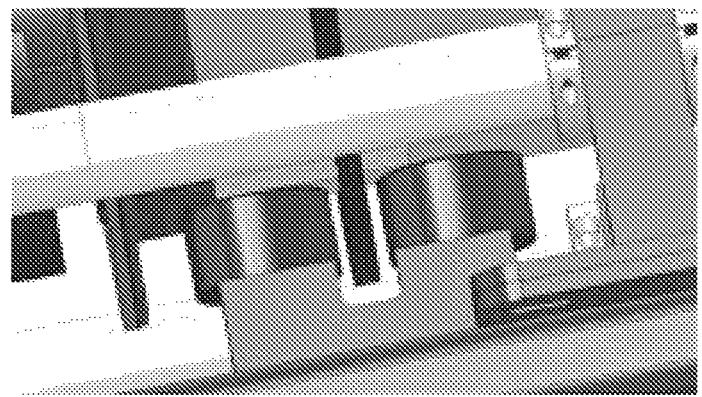

Referring to FIGS. 27D and 27E, an end of the vessel can include a round port for aeration, adding moisture and a half-moon door for larger access. A motor can drive rollers to rotate the drum. A material output funnel can release the contents of the drum. The base of the drum can include forklift slots to manipulate the vessel into the system or hive. Referring to FIGS. 27F and 27G, a drive belt can turn the vessel rollers. Stabilizer rollers at one of (at least) of the drum can maintain the position of the drum along the axis of rotation.

Figure 27H:
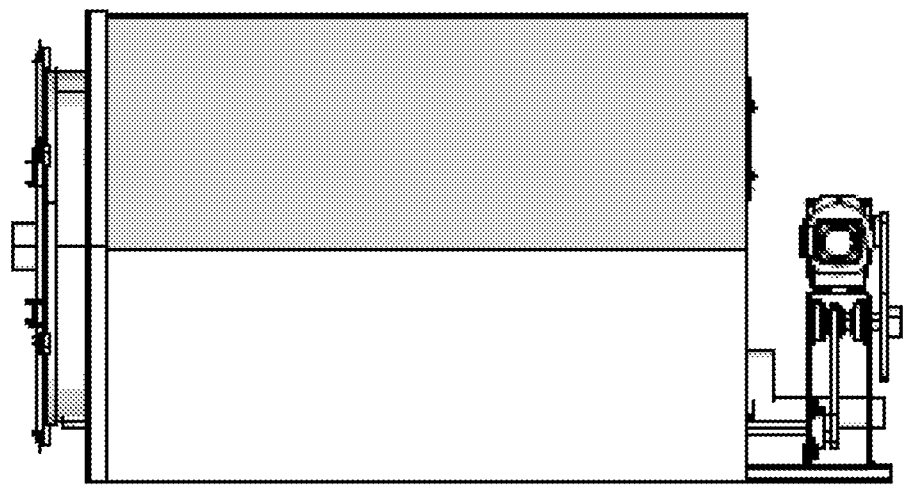
Figure 271:
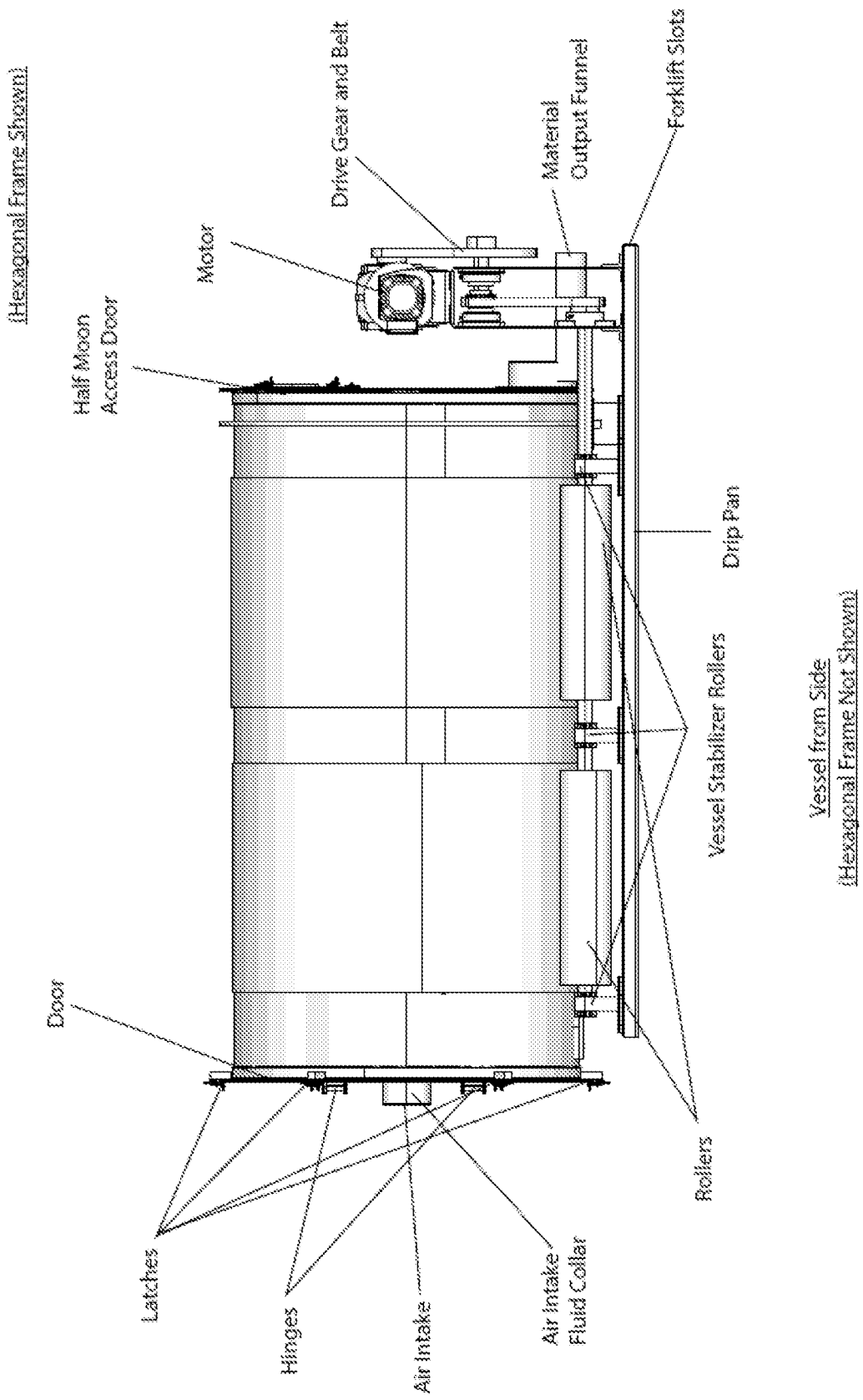
Figure 27J:
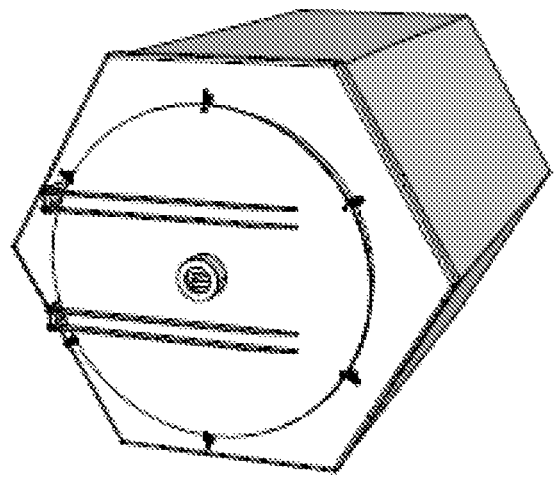
Figure 27L:
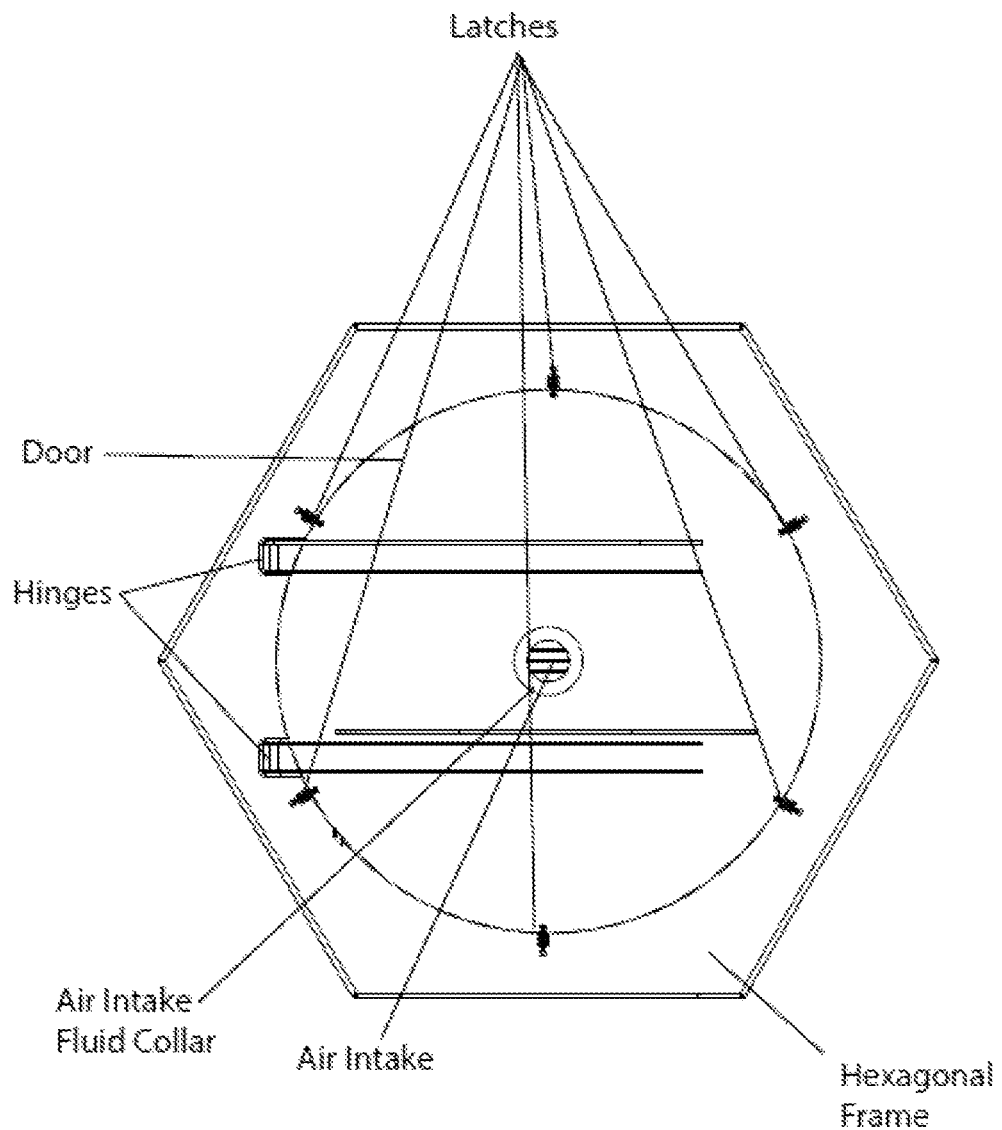
Figure 27M:
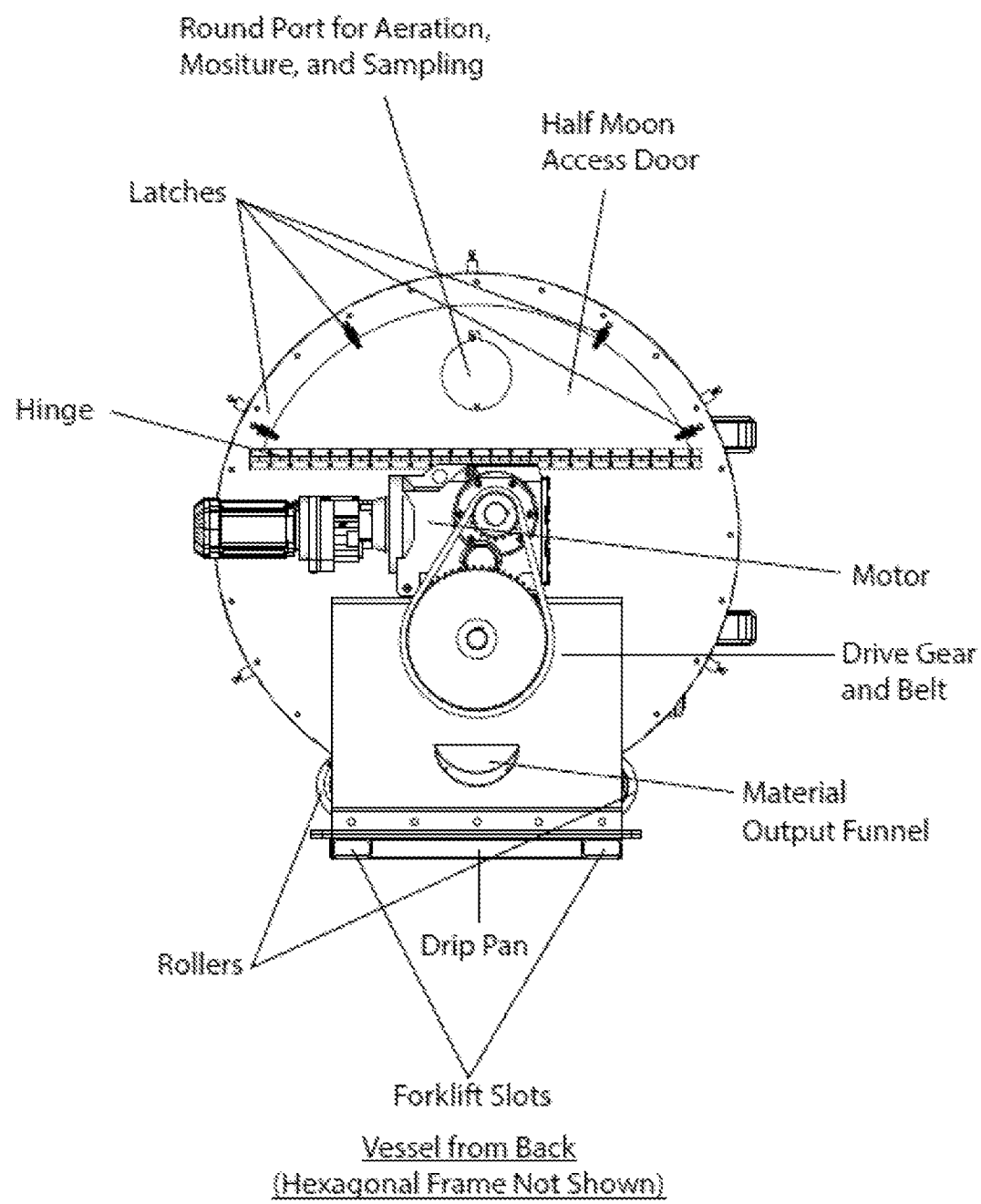

Referring to FIGS. 27H and 27I, the motor can be on an end of the vessel opposite the access door, external to the hexagonal housing. Referring to FIGS. 27H, 27L and 27M, details of the vessel including the drip pan, motor, drive gear and belt, material output funnel, forklift slots, door, hinges, latches, rollers, stabilizer rollers, air intake fluid collar, and air intake are shown. Referring to FIG. 27J, the door is shown on the hexagonal frame. Referring to FIG. 27K, the vessel can include a drum in which the body tray rails are on the inner wall, and the bone grinding auger is at the lower end of the drum. Half moon access door is in the back of the drum, opposite the door with hinges, air intake and latches. The forklift slots are on the bottom of the vessel.

Figure 28A:
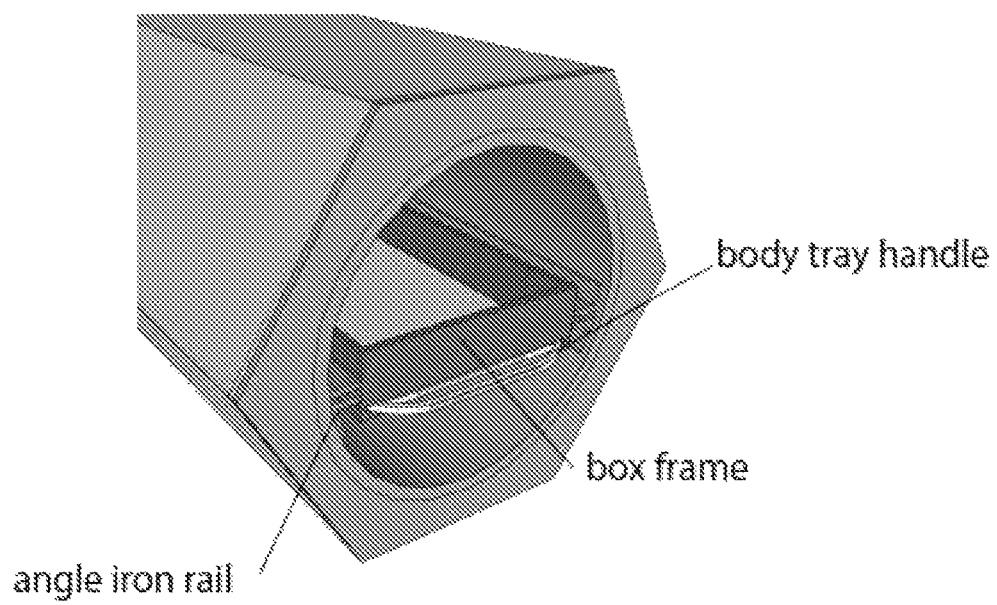
FIGS. 28A-28G depict a body tray.
Figure 28B:
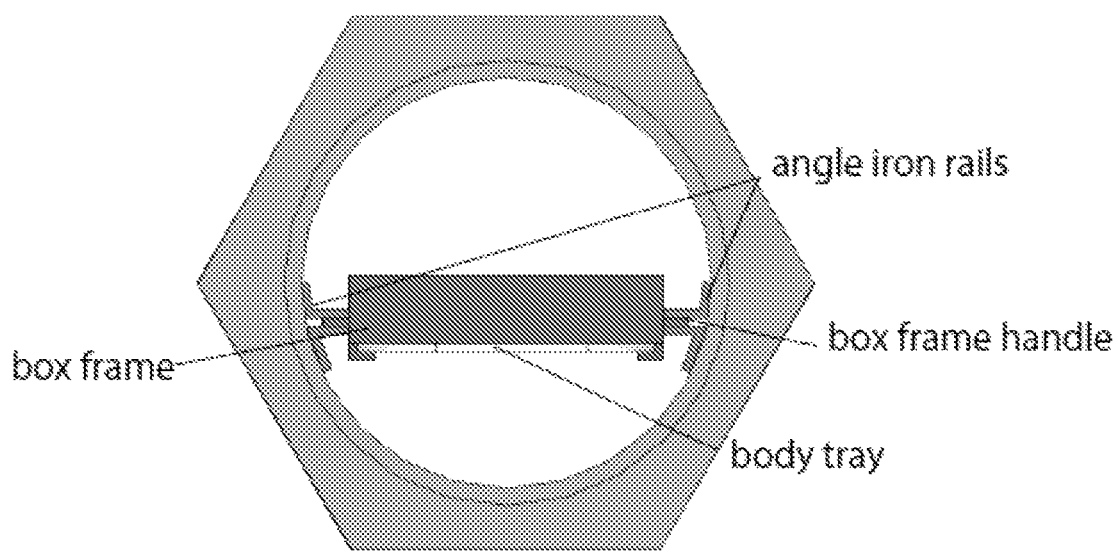
Figure 28C:
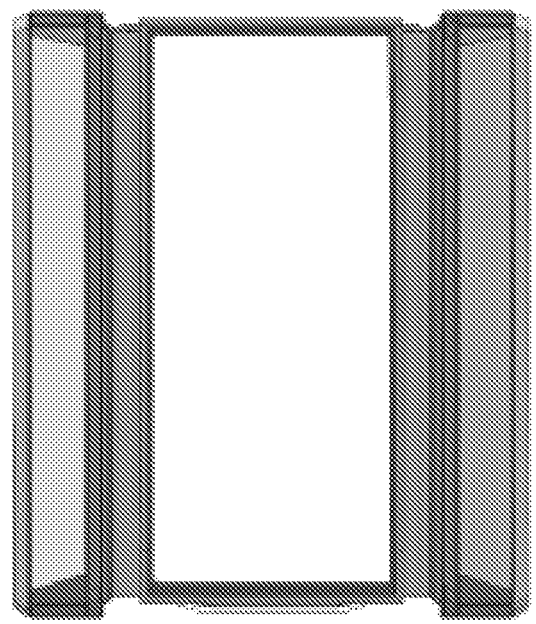
Figure 28D:
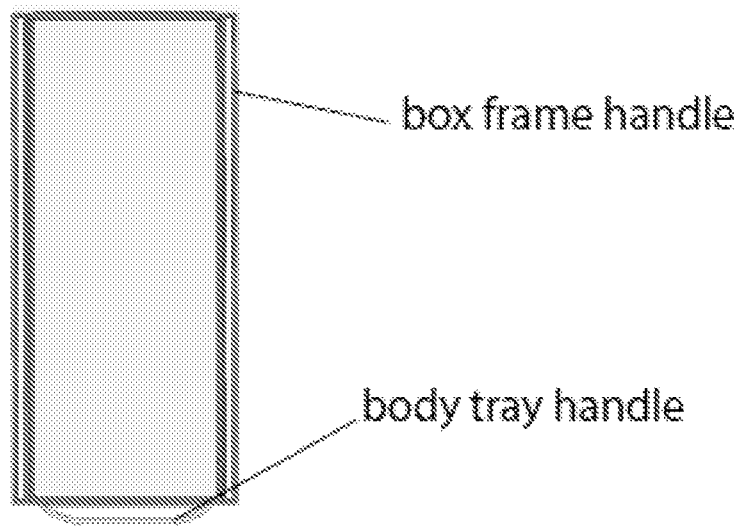
Figure 28E:
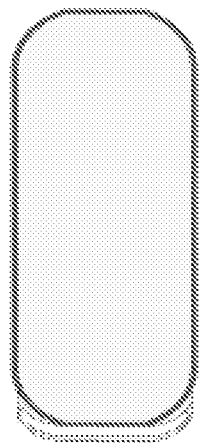
Figure 28F:
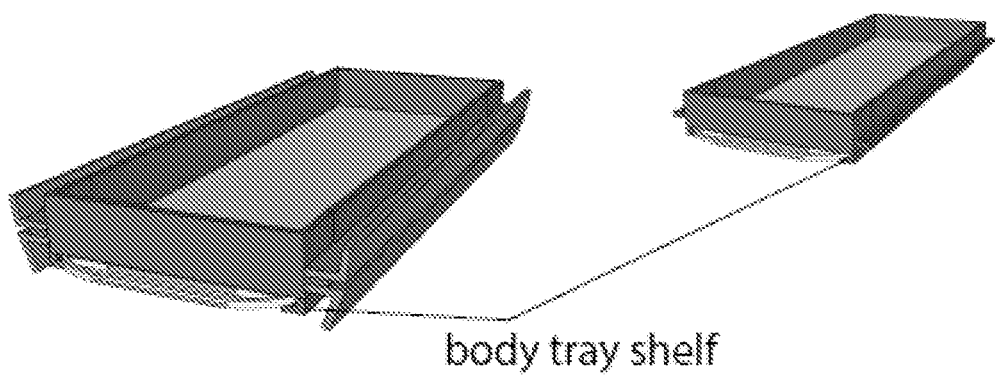
Figure 28G:
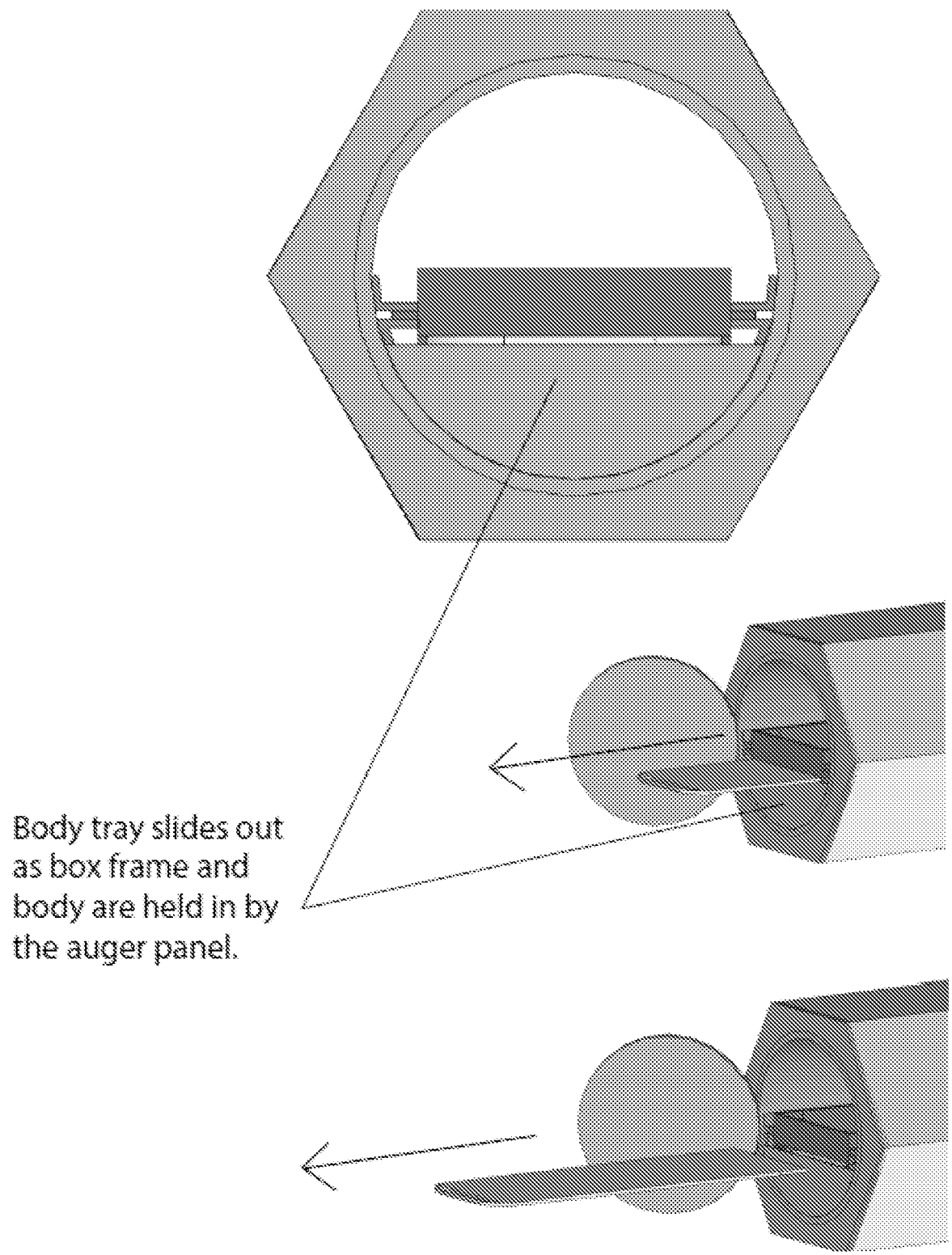

Referring to FIGS. 28A-28C, a body tray can be held in the vessel with a frame handle, and angle iron rails. Referring to FIG. 28D, body tray and body tray handle are shown. Referring to FIG. 28E, the body tray can have radiused edges. In certain embodiments, square edges are acceptable. Referring to FIG. 28F, the frame of the body tray can include a body tray shelf. Referring to FIG. 28G, the body tray can slide out of the frame. The body can be held in the barrel by the auger panel covering a lower portion of the drum.

Other embodiments are within the scope of the following claims.

What is claimed is:

1. A human remains processing center comprising:
a plurality of vessels for placement of human remains therein;
an interconnected resource element that connects the vessels when assembled in the processing center; and
a rack structure configured to removably pack a portion of the plurality of vessels in a hexagonal structure in an interior space of a building while providing access to the interconnected resource element,
wherein the interconnected resource element provides one or more of the following resource features to the plurality of vessels: aeration, hydration control, material feed and extraction, or time condition measurement.

2. The human remains processing center of claim 1, wherein the plurality of vessels includes 3 to 500 vessels.

3. The human remains processing center of claim 1, wherein the rack structure is configured to removably pack a portion of the plurality of vessels in a vertical dimension.

4. The human remains processing center of claim 1, wherein the rack system includes a modular system that packs a desired configuration of the plurality of vessels in the interior space of the building while providing access to the interconnected resource element.

5. The human remains processing center of claim 1, wherein at least one of the plurality of vessels includes a housing and a rotation system.

6. A human remains processing center comprising:
a plurality of vessels, at least one of the vessels including a housing and a rotation system;
an interconnected resource element that connects the vessels when assembled in the processing center;
a rack structure configured to removably pack a portion of the plurality of vessels in a hexagonal structure in an interior space of a building while providing access to the interconnected resource element; and
a loader configured to move into and out of the housing and place shrouded human remains within the housing and allows for controlled placement of the shrouded human remains in a specific location within the vessel without constraining the human remains,
wherein the interconnected resource element provides one or more of the following resource features to the plurality of vessels: aeration, hydration control, material feed and extraction, or time condition measurement.

* * * * *